US009948934B2

(12) United States Patent
Chou

(10) Patent No.: US 9,948,934 B2
(45) Date of Patent: Apr. 17, 2018

(54) ESTIMATING RATE COSTS IN VIDEO ENCODING OPERATIONS USING ENTROPY ENCODING STATISTICS

(71) Applicant: Apple Inc., Cupertino, CA (US)

(72) Inventor: Jim C. Chou, San Jose, CA (US)

(73) Assignee: Apple Inc., Cupertino, CA (US)

( * ) Notice: Subject to any disclaimer, the term of this patent is extended or adjusted under 35 U.S.C. 154(b) by 912 days.

(21) Appl. No.: 14/322,720

(22) Filed: Jul. 2, 2014

(65) Prior Publication Data

US 2016/0007046 A1    Jan. 7, 2016

(51) Int. Cl.
| | |
|---|---|
| *H04N 19/176* | (2014.01) |
| *H04N 19/182* | (2014.01) |
| *H04N 19/46* | (2014.01) |
| *H04N 19/513* | (2014.01) |
| *H04N 19/70* | (2014.01) |
| *H04N 19/13* | (2014.01) |
| *H04N 19/149* | (2014.01) |
| *H04N 19/103* | (2014.01) |
| *H04N 19/169* | (2014.01) |

(52) U.S. Cl.
CPC ........... *H04N 19/13* (2014.11); *H04N 19/103* (2014.11); *H04N 19/149* (2014.11); *H04N 19/1887* (2014.11)

(58) Field of Classification Search
CPC .... H04N 19/13; H04N 19/103; H04N 19/149; H04N 19/1887
USPC ..................................................... 375/240.02
See application file for complete search history.

(56) References Cited

U.S. PATENT DOCUMENTS

| | | | | |
|---|---|---|---|---|
| 8,150,172 B2* | 4/2012 | Subramania | ......... | H04N 19/176 382/232 |
| 2009/0175332 A1* | 7/2009 | Karczewicz | ......... | H04N 19/176 375/240.03 |
| 2009/0278715 A1* | 11/2009 | Fenney | ............... | H03M 7/4006 341/51 |

(Continued)

OTHER PUBLICATIONS

En-Hui Yang and Xiang Yu. Rate Distortion Optimization for H.264 Interframe Coding: A General Framework and Algorithms. IEEE Transactions on Image Processing, vol. 16, No. 7, Jul. 2007. pp. 1774-1784.

(Continued)

*Primary Examiner* — Deirdre Beasley
(74) *Attorney, Agent, or Firm* — Robert C. Kowert; Meyertons, Hood, Kivlin, Kowert & Goetzel, P.C.

(57) ABSTRACT

A component of an entropy encoding stage of a block processing pipeline (e.g., a CABAC encoder) may, for a block of pixels in a video frame, accumulate counts indicating the number of times each of two possible symbols is used in encoding a syntax element bin. An empirical probability for each symbol, an estimated entropy, and an estimated rate cost for encoding the bin may be computed, dependent on the symbol counts. A pipeline stage that precedes the entropy encoding stage may, upon receiving another block of pixels for the video frame, calculate and use the estimated rate cost when making encoding decisions for the other block of pixels based on a cost function that includes a rate cost term. The symbol counts or empirical probabilities may be passed to the earlier pipeline stage or written to a shared memory, from which components of the earlier stage may obtain them.

20 Claims, 26 Drawing Sheets

(56) References Cited

U.S. PATENT DOCUMENTS

| | | | | |
|---|---|---|---|---|
| 2010/0127904 A1* | 5/2010 | Oxman | ............... | H03M 7/40 341/107 |
| 2011/0001643 A1* | 1/2011 | Sze | ............... | H03M 7/4006 341/87 |
| 2011/0032983 A1* | 2/2011 | Sezer | ............... | H04N 19/147 375/240.02 |
| 2012/0022861 A1* | 1/2012 | Imthurn | ............... | H03M 7/30 704/229 |
| 2012/0057637 A1* | 3/2012 | Flachs | ............... | H04N 19/13 375/240.25 |
| 2012/0250765 A1* | 10/2012 | Wu | ............... | H04N 19/46 375/240.12 |
| 2012/0293343 A1* | 11/2012 | Lee | ............... | H04N 19/436 341/51 |
| 2012/0314760 A1* | 12/2012 | He | ............... | H03M 7/3079 375/240.02 |
| 2013/0114671 A1* | 5/2013 | Chien | ............... | H03M 7/4018 375/240.02 |
| 2013/0177069 A1* | 7/2013 | Sze | ............... | H04N 19/13 375/240.02 |
| 2015/0092833 A1* | 4/2015 | Ku | ............... | H04N 19/176 375/240.02 |
| 2017/0041616 A1* | 2/2017 | Ramamurthy | ............... | H04N 19/176 |

OTHER PUBLICATIONS

U.S. Appl. No. 14/331,091, filed Jul. 14, 2014, Guy Cote.
U.S. Appl. No. 14/037,316, filed Sep. 25, 2013, Craig M. Okruhlica.
U.S. Appl. No. 14/039,820, filed Sep. 27, 2013, Guy Cote.
U.S. Appl. No. 14/039,764, filed Sep. 27, 2013, Timothy John Millet.
U.S. Appl. No. 14/037,313, filed Sep. 25, 2013, Joseph J. Cheng.
U.S. Appl. No. 14/039,729, filed Sep. 27, 2013, James E. Orr.
U.S. Appl. No. 14/037,310, filed Sep. 25, 2013, Guy Cote.
U.S. Appl. No. 14/039,880, filed Sep. 27, 2013, Weichun Ku.
U.S. Appl. No. 14/039,900, filed Sep. 27, 2013, Guy Cote.

* cited by examiner

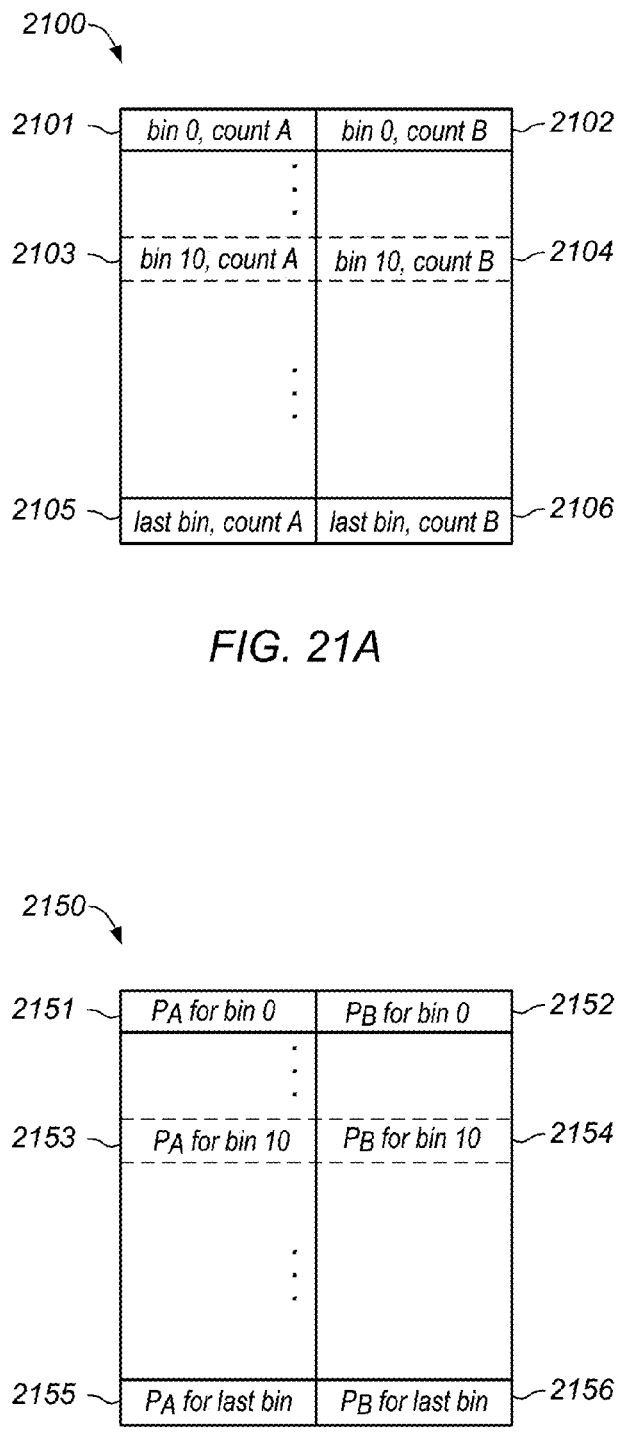

2100

| 2101 — bin 0, count A | bin 0, count B — 2102 |
|---|---|
| 2103 — bin 10, count A | bin 10, count B — 2104 |
| 2105 — last bin, count A | last bin, count B — 2106 |

| 2151 — $P_A$ for bin 0 | $P_B$ for bin 0 — 2152 |
|---|---|
| 2153 — $P_A$ for bin 10 | $P_B$ for bin 10 — 2154 |
| 2155 — $P_A$ for last bin | $P_B$ for last bin — 2156 |

FIG. 21B

ESTIMATING RATE COSTS IN VIDEO ENCODING OPERATIONS USING ENTROPY ENCODING STATISTICS

BACKGROUND

Technical Field

This disclosure relates generally to video or image processing, and more specifically to methods and apparatus for processing digital video frames in block processing pipelines.

Description of the Related Art

Various devices including but not limited to personal computer systems, desktop computer systems, laptop and notebook computers, tablet or pad devices, digital cameras, digital video recorders, and mobile phones or smart phones may include software and/or hardware that may implement a video processing method. For example, a device may include an apparatus (e.g., an integrated circuit (IC), such as a system-on-a-chip (SOC), or a subsystem of an IC), that may receive and process digital video input from one or more sources and output the processed video frames according to one or more video processing methods. As another example, a software program may be implemented on a device that may receive and process digital video input from one or more sources and output the processed video frames according to one or more video processing methods. As an example, a video encoder 110 as shown in FIG. 1 represents an apparatus, or alternatively a software program, in which digital video input (input frames 120) is encoded or converted into another format (output frames 130), for example a compressed video format such as H.264/Advanced Video Coding (AVC) format (also referred to as MPEG 4 Part 10), or H.265 High Efficiency Video Encoding (HEVC) format, according to a video encoding method. An apparatus or software program such as a video encoder 110 may include multiple functional components or units, as well as external interfaces to, for example, video input sources and external memory.

In some video processing methods, to perform the processing, each input video frame 120 is divided into rows and columns of blocks of pixels (e.g., 16×16 pixel blocks), for example as illustrated in FIG. 2 which shows an example 192×192 pixel frame 120 divided into 144 16×16 pixel blocks (illustrated in FIG. 2 as blocks 220). Each block of an input video frame 120 is processed separately, and when done the processed blocks are combined to form the output video frame 130. This may be referred to as a block processing method. Conventionally, the blocks are processed by the block processing method in scan order as shown in FIG. 2, beginning at the first block of the first row of the frame (shown as block 0), sequentially processing the blocks across the row, and continuing at the first block of the next row when a row is complete.

A block processing method may include multiple processing steps or operations that are applied sequentially to each block in a video frame. To implement such a block processing method, an apparatus or software program such as a video encoder 110 may include or implement a block processing pipeline 140. A block processing pipeline 140 may include two or more stages, with each stage implementing one or more of the steps or operations of the block processing method. FIG. 1 shows an example video encoder 110 that implements an example block processing pipeline 140 that includes at least stages 142A through 142C. A block is input to a stage 142A of the pipeline 140, processed according to the operation(s) implemented by the stage 142A, and results are output to the next stage 142B (or as final output by the last stage 142). The next stage 142B processes the block, while a next block is input to the previous stage 142A for processing. Thus, blocks move down the pipeline from stage to stage, with each stage processing one block at a time and multiple stages concurrently processing different blocks. Conventionally, the blocks are input to and processed by the block processing pipeline 140 in scan order as shown in FIG. 2. For example, in FIG. 1, the first block of the first row of the frame shown in FIG. 2 (block 0) is at stage 142C, the second block (block 1) is at stage 142B, and the third block (block 2) is at stage 142A. The next block to be input to the block processing pipeline 140 will be the fourth block in the first row.

H.264/Advanced Video Coding (AVC)

H.264/AVC (formally referred to as ITU-T Recommendation H.264, and also referred to as MPEG-4 Part 10) is a block-oriented motion-compensation-based codec standard developed by the ITU-T (International Telecommunications Union-Telecommunication Standardization Sector) Video Coding Experts Group (VCEG) together with the ISO/IEC JTC1 Moving Picture Experts Group (MPEG). The H.264/AVC standard is published by ITU-T in a document titled "ITU-T Recommendation H.264: Advanced video coding for generic audiovisual services". This document may also be referred to as the H.264 Recommendation. The H.264 recommendation includes a definition for context-adaptive binary arithmetic coding (CABAC) entropy encoding.

Generally, context-adaptive coding components must read from and write to a context lookup table, which is typically implemented in external memory. The context lookup table is sometimes implemented as a dual-port memory (including a read port and a separate write port) to increase performance, but this approach can be prohibitively expensive.

SUMMARY OF EMBODIMENTS

Embodiments of block processing methods and apparatus are described in which a block processing pipeline includes multiple pipeline components. In some embodiments, a component of an entropy encoding stage of a block processing pipeline (e.g., a CABAC encoder) may, for a block of pixels in a video frame, accumulate counts indicating the number of times each of two possible symbols is used in encoding a syntax element bin for the block of pixels. The accumulated symbols may be written to a shared memory from which a component in another pipeline stage (e.g., a pipeline stage that precedes the entropy encoding stage) can retrieve them, or may be passed to another pipeline stage directly (e.g., through a FIFO or using another mechanism). In various embodiments, the syntax elements for which symbol counts are accumulated may include transform coefficients, motion vector differences, and/or other syntax elements that are included in input data received at the entropy encoding stage and that characterize or otherwise represent a block of pixels of a video frame.

In some embodiments, a component of the entropy encoding stage (or of another pipeline stage) may compute an estimated probability (e.g., an empirical probability) for each symbol, dependent on the accumulated symbol counts. These estimated probabilities may also be written to a shared memory from which a component in another pipeline stage can retrieve them, or may be passed directly to another pipeline stage, in different embodiments. In some embodiments, an estimated entropy (e.g., an estimated compression limit) may be calculated (e.g., at the entropy encoding stage or at another pipeline stage), dependent on the estimated probabilities, and an estimated rate cost for encoding the syntax element bin (e.g., an estimate of the amount of data needed to encode the syntax element bin) may be computed (e.g., at the entropy encoding stage or at another pipeline stage), dependent on the estimated entropy.

In various embodiments, the estimated probability, estimated entropy, and/or the estimated rate cost may be calculated and/or used by a component in a pipeline stage that precedes the entropy encoding stage. For example, they may be used in place of a rate term in a cost function for selecting an encoding mode (e.g., in an intra estimation stage or mode decision stage) or for selecting a motion vector (e.g., in a motion estimation stage) when processing a block of pixels in the same video frame (or slice thereof) as one or more blocks of pixels from which the CABAC statistics (e.g., the accumulated symbol counts and/or estimated probabilities) were computed, without having to replicate the functionality of an entropy encoder in those stages.

In some embodiments, the symbol counts, estimated probability, estimated entropy, and/or the estimated rate cost may be reset (e.g., they may be returned to an initial or default value) when the CABAC engine is reset (e.g., on slice boundaries or in response to mid-frame context switches). In other embodiments, the symbol counts, estimated probability, estimated entropy, and/or the estimated rate cost may be reset after processing a pre-determined number of blocks of pixels.

In some embodiments, the block processing pipelines described herein may include both a hardware pipeline and a software pipeline. In such embodiments, various ones of the operations described herein for estimating rate costs in video encoding operations using entropy encoding statistics may be performed by hardware pipeline components and/or by software pipeline components at different stages of the block processing pipeline. For example, CABAC statistics (e.g., symbol counts) may be accumulated in the entropy encoding stage using hardware, while estimated probabilities, estimated entropies, and/or estimated rate costs may be computed by hardware or by software pipeline components in the entropy encoding stage or in a preceding pipeline stage, in different embodiments.

BRIEF DESCRIPTION OF THE DRAWINGS

FIG. 21A illustrates a data structure configured to store a respective count value indicating the number of times that a syntax element bin was encoded using each of two possible symbols, according to one embodiment.

FIG. 21B illustrates a data structure configured to store a respective probability value indicating an empirical probability that the bin will be encoded using each of two possible symbols, according to one embodiment.

Figure 1:
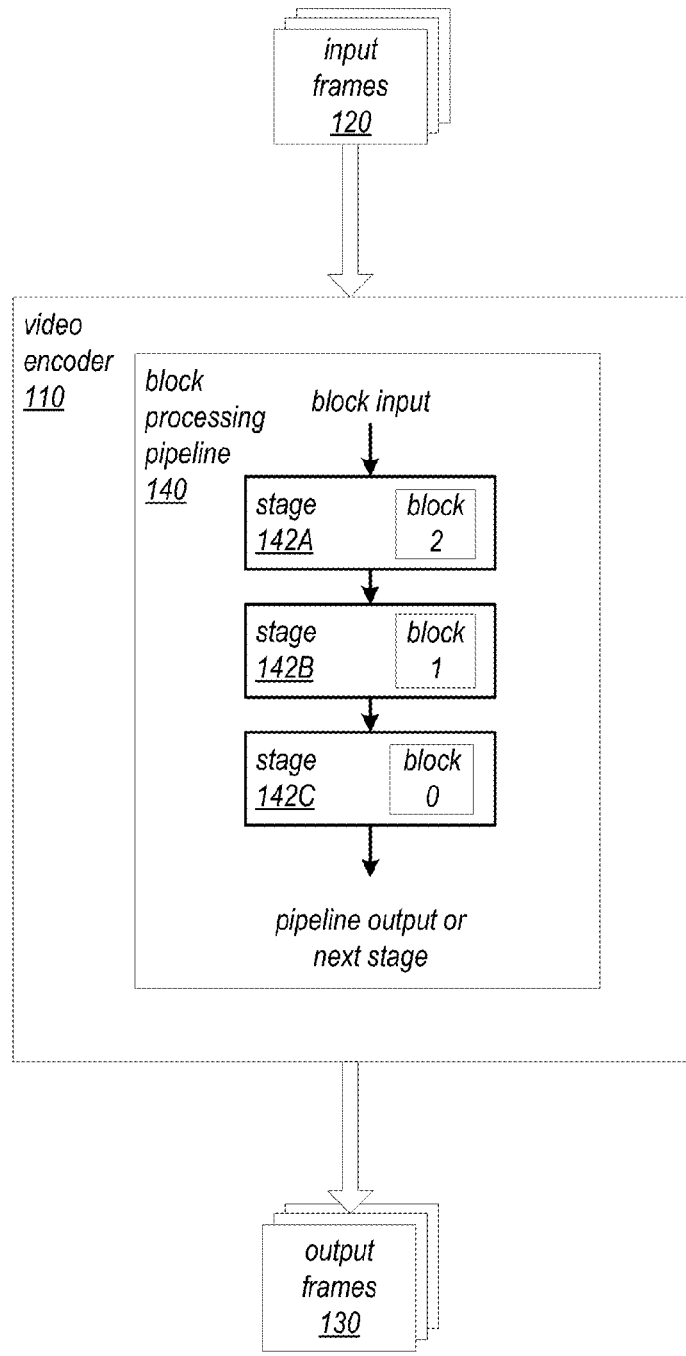
FIG. 1 illustrates an example video encoder including a conventional block processing pipeline that processes blocks from input frames in scan order.
Figure 2:
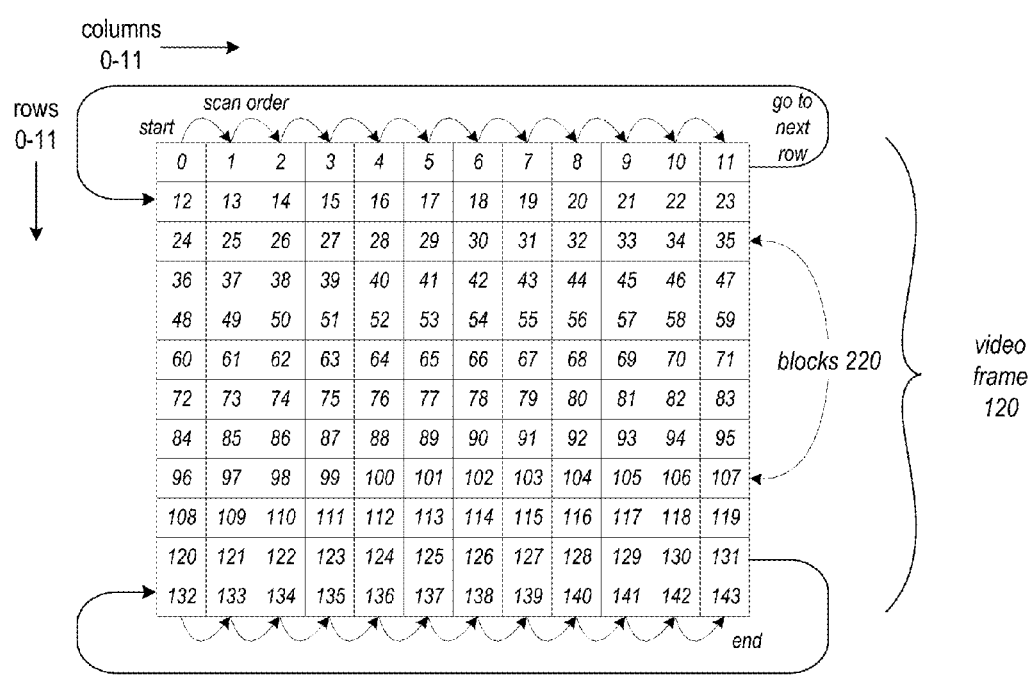
FIG. 2 illustrates conventional scan order processing of blocks from a video frame.

While the embodiments are susceptible to various modifications and alternative forms, specific embodiments thereof are shown by way of example in the drawings and will herein be described in detail. It should be understood, however, that the drawings and detailed description thereto are not intended to limit the disclosure to the particular form disclosed, but on the contrary, the intention is to cover all modifications, equivalents and alternatives falling within the spirit and scope of the present disclosure as defined by the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112(f) interpretation for that unit/circuit/component.

DETAILED DESCRIPTION

In the following description, numerous specific details are set forth to provide a thorough understanding of the disclosed systems and methods. However, one having ordinary skill in the art should recognize that the disclosed techniques might be practiced without these specific details. In some instances, well-known circuits, structures, and techniques have not been shown in detail to avoid obscuring this disclosure.

Figure 16:
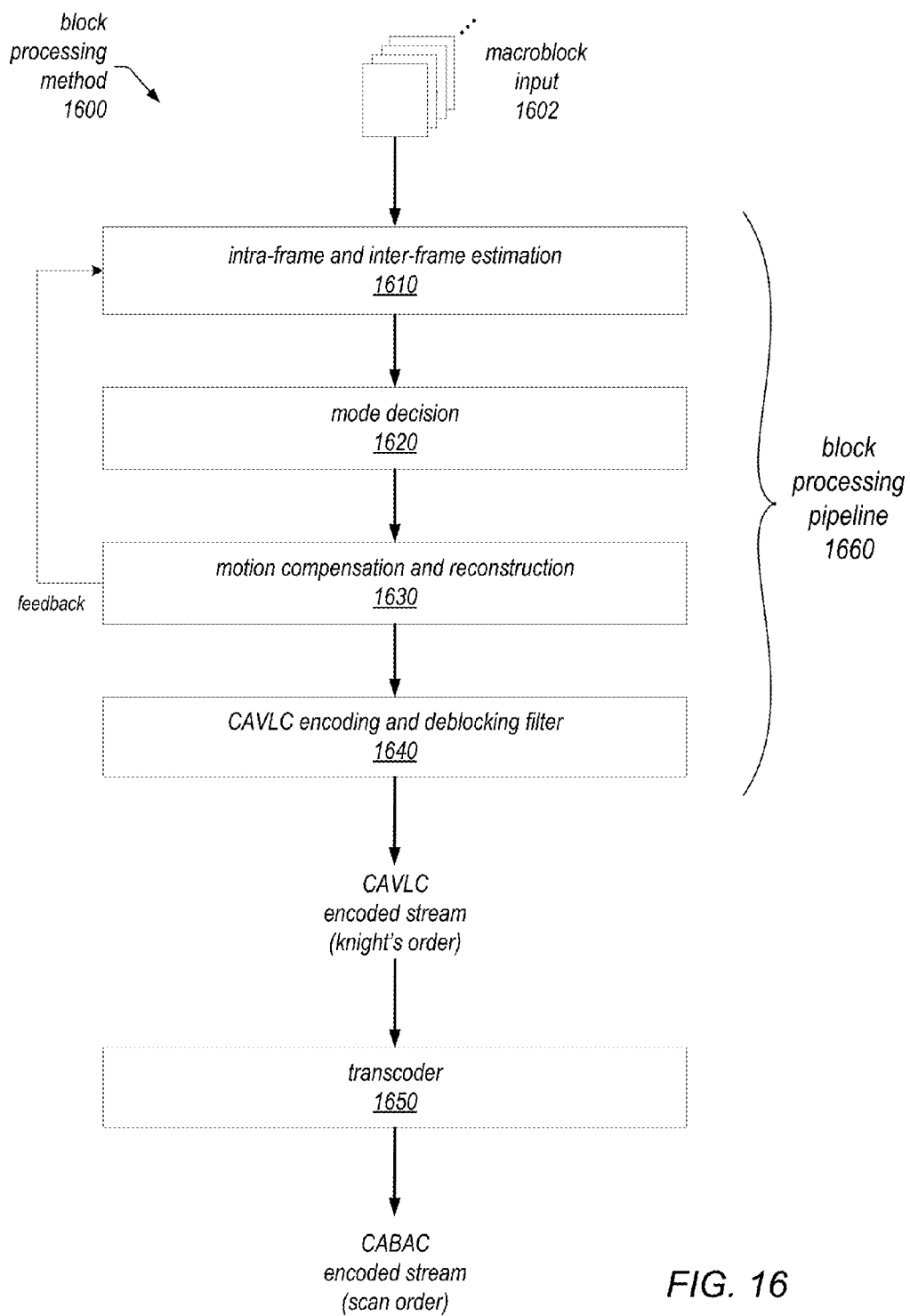
FIG. 16 is a high-level block diagram of general operations in an example block processing method that may be implemented by a block processing pipeline that implements one or more of the block processing methods and apparatus described herein, according to at least some embodiments.

Various embodiments of methods and apparatus for processing digital video frames in block processing pipelines are described. Embodiments of block processing methods and apparatus are generally described herein in the context of video processing in which input video frames are subdivided into and processed according to blocks of elements (e.g., 16×16, 32×32, or 64×64 pixel blocks). Embodiments of an example H.264 video encoder that includes a block processing pipeline and that may implement one or more of the block processing methods and apparatus are described herein. The H.264 video encoder converts input video frames from an input format into H.264/Advanced Video Coding (AVC) format as described in the H.264/AVC standard (the H.264 Recommendation). FIG. 16 illustrates an example block processing pipeline of an example H.264 video encoder, and FIG. 26 illustrates an example H.264 video encoder that includes a block processing pipeline. However, embodiments of the block processing methods and apparatus may be used in encoders for other video encoding formats, for example in block processing pipelines of HEVC (High Efficiency Video Encoding) video encoders that convert input video frames from an input format into HEVC format as described in the HEVC standard. The HEVC standard is published by ITU-T in a document titled "ITU-T Recommendation H.265: High Efficiency Video Encoding". Other video encoders that may use embodiments of the block processing methods and apparatus may include, but are not limited to, H.263, MPEG-2, MPEG-4, and JPEG-2000 video encoders. However, it is to be noted that embodiments of the block processing methods and apparatus may be used in any block processing pipeline, including but not limited to block processing pipelines implemented in various other video encoders and/or decoders (which may be referred to as codecs) in which digital video frames input in one format are encoded or converted into another format. Further note that the block processing methods and apparatus may be used in software and/or hardware implementations of video encoders. In addition to video encoders/decoders, the block processing methods and apparatus described herein may be used in various other applications in which blocks from a video frame or still digital image are processed, for example in pipelines that process still digital images in various image processing applications. Thus, it is to be understood that the term frame or video frame as used herein may also be taken to refer to any digital image.

Embodiments of the block processing methods and apparatus as described herein may be implemented in two or more parallel block processing pipelines. For example, 2, 4, 8, or more pipelines may be configured to run in parallel, with each pipeline processing a quadrow from an input video frame, for example with blocks input according to knight's order.

Embodiments of the block processing methods and apparatus are generally described herein in the context of video processing in which input frames are subdivided into and processed according to blocks of picture elements (referred to as pixels, or pels), specifically 16×16 pixel blocks referred to as macroblocks that are used, for example, in H.264 encoding. However, embodiments may be applied in pipelines in which blocks of other sizes and geometries, or of other elements, are processed. For example, HEVC encoding uses blocks referred to as Coding Tree Units (CTUs) that may vary within the range of 16×16 pixel to 64×64 pixel. In some implementations such as H.264 encoders, the blocks input to the pipeline may be referred to as macroblocks, each macroblock including two or more blocks or partitions that may be processed separately at stages of the pipeline. For example, for input video frames encoded in YUV (e.g., YUV420 format) or YCbCr (e.g., YCbCr 4:2:0, 4:2:2 or 4:4:4 formats) color space, a macroblock may be composed of separate blocks of chroma and luma elements that may be processed separately at stages in a pipeline. In addition to applications that process frames in a pipeline according to blocks of elements (e.g., blocks of pixels), the block processing methods and apparatus may be applied in applications in which digital images (e.g., video frames or still images) are processed by single elements (e.g., single pixels).

Parallel Hardware and Software Block Processing Pipelines

Embodiments of block processing methods and apparatus are described in which a block processing pipeline includes a software pipeline and a hardware pipeline that run in parallel. However, the software pipeline runs one block ahead of the hardware pipeline. The stages of the pipeline may each include a hardware pipeline component (e.g., a circuit) that performs one or more operations on a current block at the stage. At least one stage of the pipeline may also include a software pipeline component that determines a configuration for the hardware component at the stage of the pipeline for processing a next block while the hardware component is processing the current block. The software pipeline component may include at least a processor. In at least some embodiments, the software pipeline component at a stage may determine the configuration for processing the next block at the stage according to information related to the next block obtained from an upstream stage of the pipeline. In at least some embodiments, the software pipeline component may also obtain and use information related to a block that was previously processed at the stage in determining the configuration for processing the next block. In at least some embodiments, the software pipeline may also "look ahead" (upstream) one or more blocks to obtain information from upcoming blocks that may be used in determining the configurations for processing the next blocks at the stages. The software pipeline components may generate statistics on one or more blocks that are used in determining the configurations.

The block information obtained by a software pipeline component at a stage and used to determine a configuration for processing a next block at the stage may, for example, include various statistics related to the block and/or to one or more other blocks. The following provides some examples of block statistics that may be used in some embodiments, and is not intended to be limiting:

Sum of pixels (s).
Sum of pixels squared (s2).
Block variance (may be estimated from s and s2, e.g. var=s2−(s)^2).
Horizontal and vertical gradients (Gx and Gy).
Gradient histograms for Gx and Gy.

The operations performed by the hardware pipeline components at the various stages may vary, and thus the configuration for the hardware pipeline components at the stages may vary. Thus, the software pipeline components at the stages may determine and set particular configuration parameters according to the respective hardware pipeline components at the stages. However, a general example of configuration parameters that may be determined and set at a stage by the software pipeline component based on an analysis of the information is given below, and is not intended to be limiting.

One or more stages of a pipeline may perform operations to determine a best mode for processing pixels in a given block. At a particular stage, the hardware pipeline component may receive information from one or more upstream stages (and possibly feedback from one or more downstream stages) and use this information to select a particular one of multiple modes. The software pipeline component at the stage may receive, generate, and analyze statistics related to the block (e.g., block variance) and set one or more configuration parameters according to the analysis to, for example, cause the hardware pipeline component to try multiple modes if the block variance is high, or to bias the hardware component towards a particular mode or modes if the block variance is low.

In at least some embodiments, a block processing pipeline that implements parallel software and hardware pipelines may input blocks to and process blocks in the pipelines according to knight's order, as described in the section titled Knight's order processing. However, other block input and processing orders may be used in some embodiments. In at least some embodiments, at least one stage of a block processing pipeline that implements parallel software and hardware pipelines may implement one or more local buffers for caching data for neighbor blocks at the stage, as described in the section titled Caching neighbor data.

Figure 3:
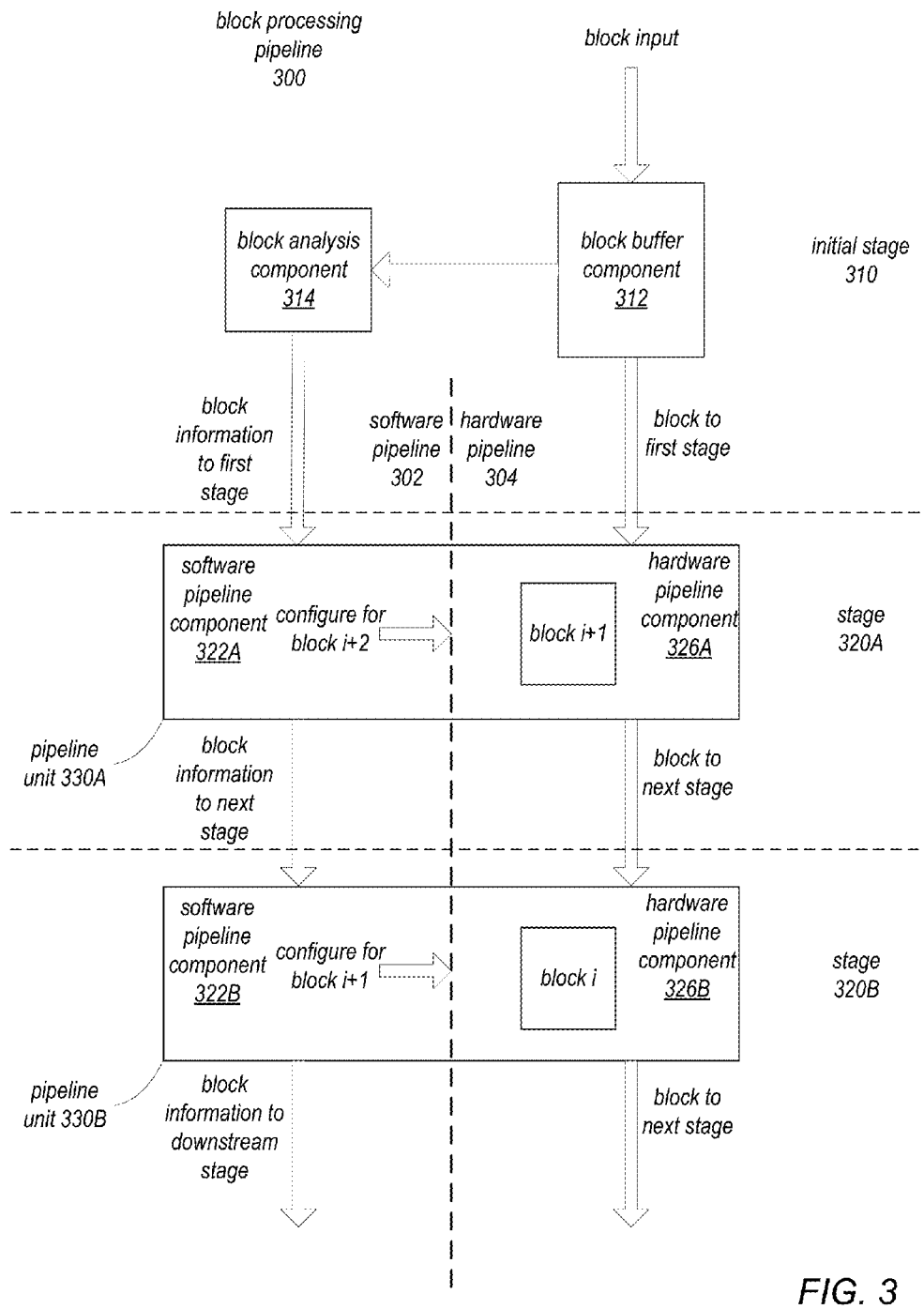
FIG. 3 is a high-level block diagram of an example block processing pipeline that implements a software pipeline and a hardware pipeline, according to at least some embodiments.

FIG. 3 is a high-level block diagram of an example block processing pipeline 300 that implements a software pipeline 302 and a hardware pipeline 304, according to at least some embodiments. The software pipeline 302 and the hardware pipeline 304 process blocks from a frame in parallel, with the software pipeline 302 one block ahead of the hardware pipeline 304. The pipeline 300 may include multiple stages 320, each stage configured to perform one or more operations on a block of pixels from a frame (e.g., a video frame). At least some of the stages (stages 320A and 320B in FIG. 3) may each include at least one pipeline unit 330 that includes a software pipeline component 322 and a hardware pipeline component 326. The hardware pipeline component 326 of each pipeline unit 330 may perform one or more particular operations of a block processing method on a block currently at the stage 320 in the hardware pipeline 304. While the hardware pipeline component 326 of a given pipeline unit 330 is working on the current block at the stage 320, the software pipeline component 322 of the pipeline unit 330 at the stage 320 may preconfigure the hardware pipeline component 326 for processing a next block. Thus, the software pipeline 302 operates one block ahead of the hardware pipeline 304.

For example, as shown in FIG. 3, at stage 320B hardware pipeline component 326B is currently processing block i while software pipeline component 326B is configuring the hardware pipeline component 326B to process block i+1, and at stage 320A hardware pipeline component 326A is currently processing block i+1 while software pipeline component 326A is configuring the hardware pipeline component 326A to process block i+2.

The software pipeline component 322 of a pipeline unit 330 at a stage 320 may determine a configuration for processing a next block at the hardware pipeline component 326 of the respective pipeline unit 330 according to information for the block. The information for the block may include at least block information received from an upstream stage. In at least some embodiments, the information may also include feedback information from one or more blocks previously processed at the stage 320. The software pipeline component 322 may preconfigure the hardware pipeline component 326 of the pipeline unit 330 at the stage 320 for processing the block according to the determined configuration, for example by setting one or more configuration values in a set of registers or other memory coupled to the hardware pipeline component 326. Once the configuration for processing the block at the hardware pipeline component 326 of the pipeline unit 330 is ready, the software pipeline component 322 may signal the hardware pipeline component 326 of the pipeline unit 330. Assuming that the hardware pipeline component 326 has completed the processing of a previous block and that the next block is available to the hardware pipeline component 326 (e.g., ready to be read from its input buffer), the hardware pipeline component 326 of the pipeline unit 330 may then begin processing the next block according to the configuration for the block that was determined and preconfigured by the software pipeline component 322 of the pipeline unit 330.

In at least some embodiments, an initial stage 310 of the pipeline may input block information to the software pipeline 302 and blocks to the hardware pipeline 304. The initial stage 310 may obtain block input, for example from an external memory via direct memory access (DMA), and buffer the blocks in a block buffer component 312. Block buffer component 312 may have the capacity to hold one, two, or more blocks. For example, in some embodiments, block buffer component 312 may be able to buffer 16 blocks. In at least some embodiments, block buffer component 312 may buffer one, two or more blocks for input to the hardware pipeline 304 before initial stage 310 begins input of blocks to the hardware pipeline 304. In at least some embodiments, once the initial stage 310 begins input of blocks to the hardware pipeline 304, the initial stage 310 may write a next block from block buffer component 312 to a buffer memory of the hardware pipeline component 326A of pipeline unit 330A at stage 320A when the pipeline unit 330A is ready to receive the next block. The initial stage 310 may continue to obtain block input for a frame, buffer the blocks to block buffer component 312, and input blocks to the hardware pipeline 304 until all the blocks in the frame are processed.

A block analysis component 314 at initial stage 310 may perform one or more analysis functions on one or more blocks that are currently buffered in block buffer component 312 including a next block to be input to the hardware pipeline 304 to generate block information for the next block. The block information may, for example, include one or more block statistics. Some non-limiting examples of block statistics that may be generated were previously provided. Once the block information is generated for the next block, the initial stage 310 may send the block information to the software pipeline component 322A of the pipeline unit 330A at stage 320A of the pipeline 300. The block analysis component 314 may continue to generate block information and input the block information to the software pipeline 304 until all the blocks in the frame are processed.

In at least some embodiments, the software pipeline component 322 of each pipeline unit 330 may include a memory for buffering block information for one, two, or more upcoming blocks. In at least some embodiments, the hardware pipeline component 326 of each pipeline unit 330 may include a memory for storing one or more blocks to be processed at the stage 320. In at least some embodiments, the memory may be a double buffer so that a previous stage can write a next block to the memory while the hardware pipeline component 326 is reading a current block from the memory.

In at least some embodiments, the software pipeline component 322 of a pipeline unit 330 may push block information for each block to the software pipeline component 322 of a pipeline unit 330 at a downstream stage 320 so that the software pipeline component 322 at the downstream stage 320 can configure the respective hardware pipeline component 326 at the stage. In at least some embodiments, the software pipeline component 322 of a pipeline unit 330 at a stage 320 does not push block information for a block to a downstream stage 320 until after completing the preconfiguration for processing the block at the stage 320. In at least some embodiments, the block information for a block may be updated according to information that is available at a stage 320 before pushing the block information to the downstream stage 320.

Once a hardware pipeline component 326 at a stage 320 has completed processing of a block, the processed block may be sent to a hardware pipeline component 326 at the next stage 320 for processing. The hardware pipeline component 326 at the next stage 320 may hold the block in its memory until the hardware pipeline component 326 has completed processing of a current block and has received a signal from the software pipeline component 322 of the pipeline unit 330 at the stage 320 that the configuration for processing the block is ready. Note that a processed block may instead be written to a memory external to the pipeline 300 by a last stage 320 of the pipeline 300.

Figure 4A:
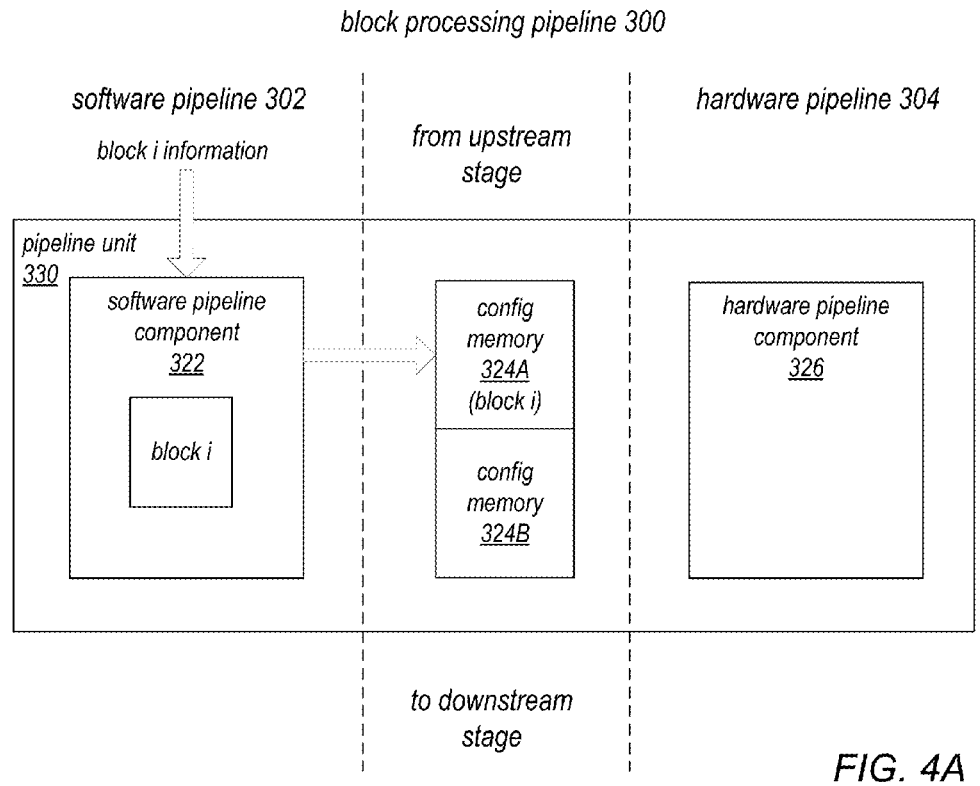
FIGS. 4A through 4C illustrate processing blocks at a stage in an example block processing pipeline that implements a software pipeline and a hardware pipeline, according to at least some embodiments.
Figure 4B:
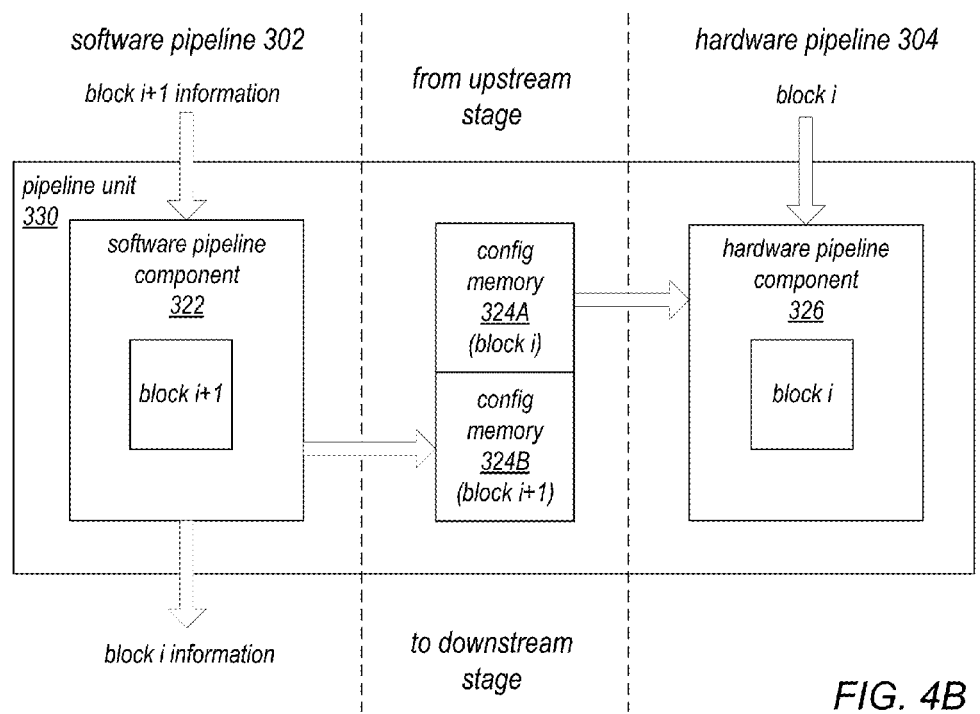
Figure 4C:
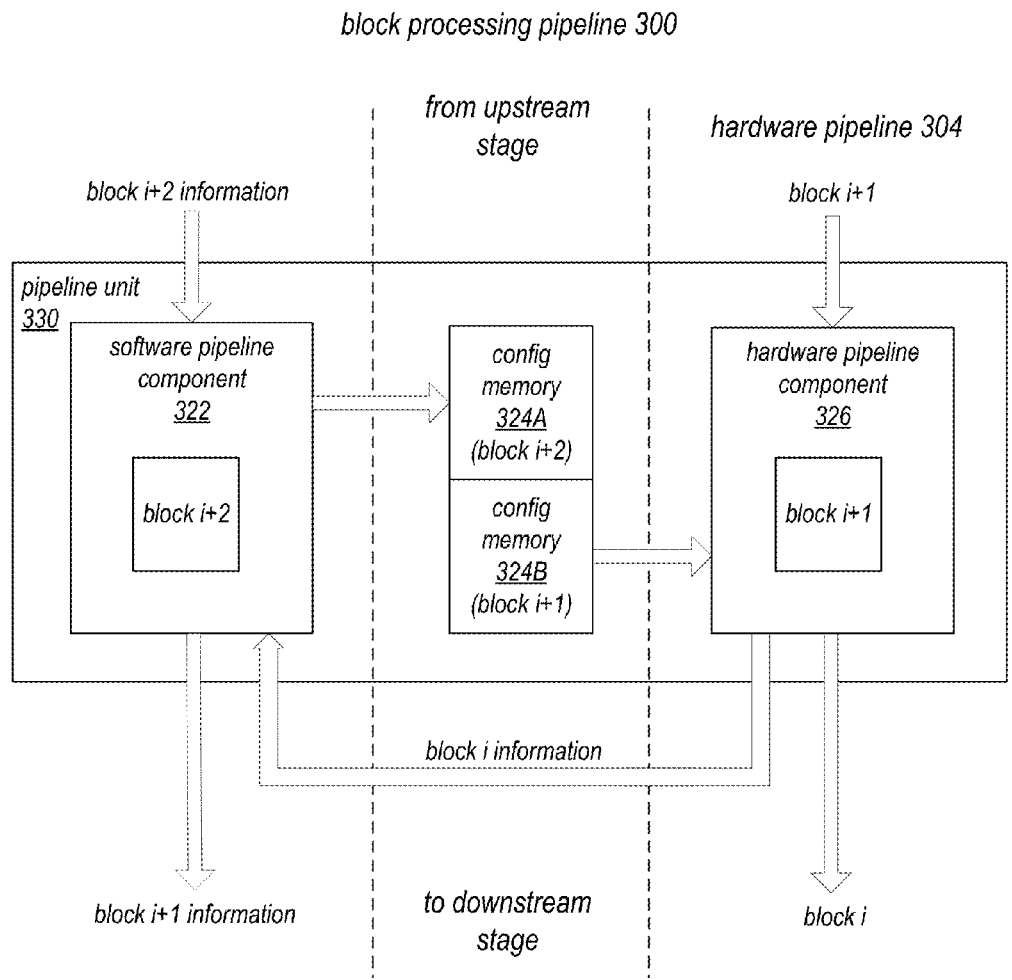

FIGS. 4A through 4C illustrate processing blocks at a pipeline unit of a stage in an example block processing pipeline that implements a software pipeline and a hardware pipeline, according to at least some embodiments. FIGS. 4A through 4C show a pipeline unit 330 that may be used at a stage in a block processing pipeline that includes a software pipeline component 322 and a hardware pipeline component 326. The hardware pipeline component 326 of the pipeline unit 330 may perform one or more particular operations of a block processing method on a block currently at the stage in the hardware pipeline 304. While the hardware pipeline component 326 is working on the current block, the software pipeline component 322 of pipeline unit 330 may preconfigure the hardware pipeline component 326 for processing a next block. Thus, the software pipeline component 322 of a pipeline unit 330 operates one block ahead of the hardware pipeline component 326 of the pipeline unit 330.

The pipeline unit 330 may also include a configuration memory (shown as config memory 324A and 324B in FIGS. 4A through 4C). The configuration memory may, for example, be a set of hardware registers. As shown in FIGS. 4A through 4C, in at least some embodiments, the configuration memory may be partitioned into two memories (config memory 324A and 324B) so that the software pipeline component 322 of pipeline unit 330 can write to one memory while the hardware pipeline component 326 is reading from the other memory. The configuration memory may, for example, be a set of registers that are partitioned into a subset of active registers to which the software pipeline component 322 writes the configuration for a next block and a subset of shadow registers from which the hardware pipeline component 326 reads the configuration for a current block. In at least some embodiments, the software pipeline component 322 may write to either of the config memories 324A and 324B, and the hardware pipeline component 326 may read from either of the config memories 324A and 324B; the two components may both toggle between the memories 324, with the software pipeline component 322 writing to one while the hardware pipeline component 326 is reading from the other. Alternatively, in some embodiments, the software pipeline component 322 may write to only one of the config memories 324 (e.g., config memory 324A), and the hardware pipeline component 326 may read from only the other config memory 324 (e.g., config memory 324B); when the hardware pipeline component 326 is ready for a new configuration and the configuration is ready, the configuration may be copied from the config memory 324A to the config memory 324B. Note that embodiments may also be implemented in which only a single configuration memory is used, or in which more than two configuration memories are used.

FIG. 4A show a pipeline unit 330 of a stage at an initial state. Software pipeline component 322 receives, from an upstream stage, block information for a first block (block i) from a frame to be processed at the stage. Hardware pipeline component 326 is not currently processing a block. Software pipeline component 322 determines a configuration for processing block i according to the received block information and writes the configuration to config memory 324A. Software pipeline component 322 signals hardware pipeline component 326 of pipeline unit 330 that the configuration for block i is ready, for example by setting a go bit or flag.

FIG. 4B show the pipeline unit 330 at the next cycle. Software pipeline component 322 pushes block information for block i to a downstream stage. Hardware pipeline component 326 receives block i and processes block i according to the configuration in config memory 324A. Software pipeline component 322 receives block information for a next block (block i+1) to be processed at the stage. Software pipeline component 322 determines a configuration for processing block i+1 according to the received block information and writes the configuration to config memory 324B. Software pipeline component 322 signals hardware pipeline component 326 that the configuration for block i+1 is ready, for example by setting a go bit or flag.

FIG. 4C shows the pipeline unit 330 at the next cycle. Software pipeline component 322 pushes block information for block i+1 to a downstream stage. Hardware pipeline component 326 receives block i+1 and processes block i+1 according to the configuration in config memory 324B. Software pipeline component 322 receives block information for a next block (block i+2) to be processed at the stage. Software pipeline component 322 determines a configuration for processing block i+2 according to the received block information and writes the configuration to config memory 324A. Software pipeline component 322 signals hardware pipeline component 326 that the configuration for block i+2 is ready, for example by setting a go bit or flag.

FIG. 4C also shows that information from a previously processed block at a stage may be obtained by the software pipeline component 322 at the stage and used in determining a configuration for a next block to be processed by the hardware pipeline component 326 at the stage. Hardware pipeline component 326 finished processing block i at a previous cycle, as shown in FIG. 4B, and is now processing block i+1 at FIG. 4C. Thus, information from the processing of block i at the stage is available, and may be fed back to the software pipeline component 322 of the pipeline unit 330 at the stage. This information from the processing of block i at the stage may be used in combination with the block information for block i+2 received from an upstream stage to determine the configuration for block i+2. Thus, feedback of information from the processing of blocks at a stage may be for a block that is two ahead of the block for which a configuration is being generated.

Figure 5:
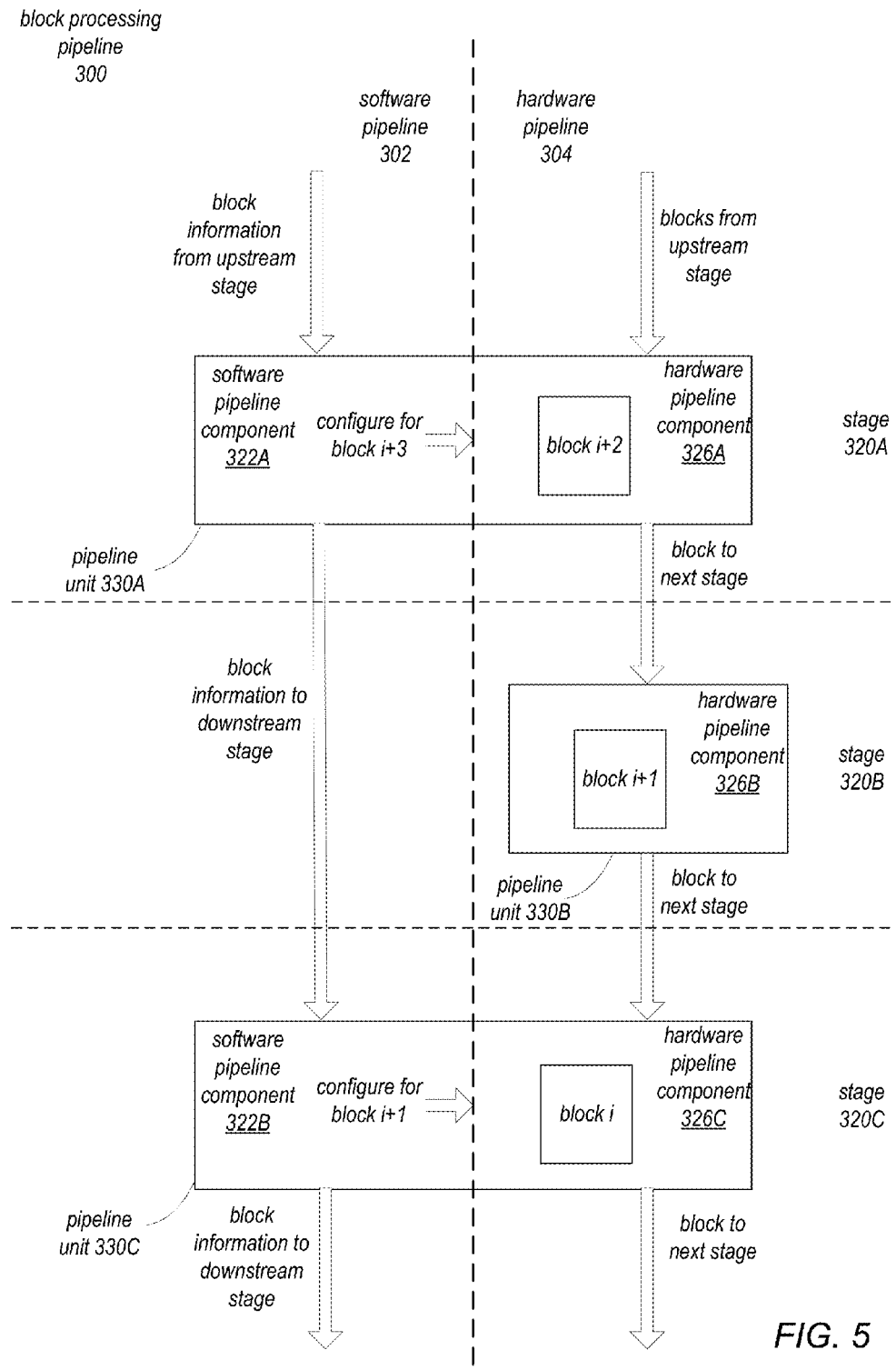
FIG. 5 illustrates an example block processing pipeline that implements a software pipeline and a hardware pipeline in which at least one stage is skipped by the software pipeline, according to at least some embodiments.

Alternatively, in some implementations, the software pipeline component 322 may wait for completion of the processing of a current block by the hardware pipeline component 326 at the stage, and use this information to determine a configuration for the next block. In this case, feedback of information from the processing of blocks at a stage may be for a block that is only one ahead of the block for which a configuration is being generated FIG. 5 illustrates an example block processing pipeline 300 that implements a software pipeline and a hardware pipeline in which at least one stage is skipped by the software pipeline, according to at least some embodiments. In some pipeline implementations, one or more pipeline units 330 of the pipeline 300 may include a hardware pipeline component 326 that does not require dynamic configuration. FIG. 5 shows three stages 320A, 320B, and 320C. Stage 320A includes pipeline unit 330A that includes both a software pipeline component 322A and a hardware pipeline component 326A, and stage 320C includes a pipeline unit 330C that includes both a software pipeline component 322B and a hardware pipeline component 326C. However, stage 320B includes a pipeline unit 330B that includes a hardware pipeline component 326B that does not require dynamic configuration, as the operation(s) the component 326 performs on a block are the same for all blocks. Thus, pipeline unit 330B does not utilize a software pipeline component 322.

As shown in FIG. 5, hardware pipeline component 326A at stage 320A is currently processing block i+2, while software pipeline component 322A at stage 320A is determining and setting the configuration for processing the next block (i+3) at stage 320A. Hardware pipeline component 326B at stage 320B is currently processing block i+1. Hardware pipeline component 326C at stage 320C is currently processing block i, while software pipeline component 322B at stage 320C is determining and setting the configuration for processing the next block (i+1) at stage 320A. In at least some embodiments, the block information for block i+2 may be pushed downstream from software pipeline component 322A to software pipeline component 322B once stage 320A completes the configuration for processing block i+2 and buffered at software pipeline component 322B until software pipeline component 322B is ready to configure hardware pipeline component 322C to process block i+2. Alternatively, stage 320B may include buffers to which block information is pushed from stage 320A and from which block information is pushed to stage 320C. As another alternative, stage 320A may buffer block information that it is done with until stage 320C is ready for the information.

Figure 6:
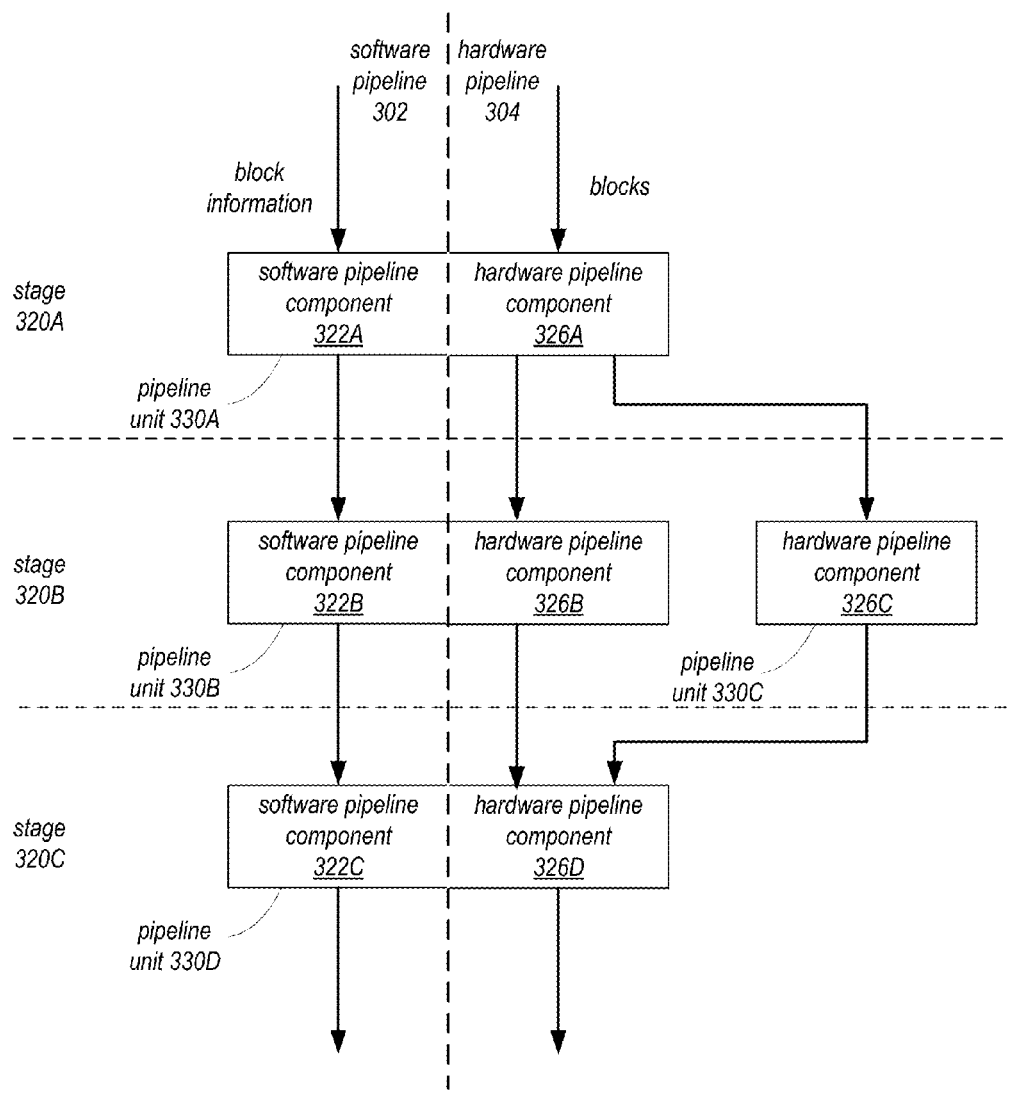
FIG. 6 illustrates an example block processing pipeline that implements a software pipeline and a hardware pipeline in which at least one stage includes multiple pipeline units, according to at least some embodiments.

FIG. 6 illustrates an example block processing pipeline 300 that implements a software pipeline and a hardware pipeline in which at least one stage includes multiple pipeline units, according to at least some embodiments. As shown in FIG. 6, stage 320A includes a single pipeline unit 330A that includes a software pipeline component 322A and a hardware pipeline component 326A, and stage 320C includes a single pipeline unit 330C that includes a software pipeline component 322C and a hardware pipeline component 326D. However, stage 320B include two pipeline units 320B and 320C. Pipeline unit 330B includes a software pipeline component 322B and a hardware pipeline component 326B. Pipeline unit 330C includes only a hardware pipeline component 326C. In hardware pipeline 304, blocks or portions of blocks from pipeline unit 330A at stage 320A pass through both hardware pipeline component 326B and hardware pipeline component 326C of stage 320B, which output processed blocks or portions of blocks to hardware pipeline component 326D of pipeline unit 330D in stage 320C. In software pipeline 302, block information is passed from software pipeline unit 322A at stage 320A to software pipeline unit 322B at stage 320B, and from software pipeline unit 322B at stage 320B to software pipeline unit 322C at stage 320C.

While not shown, in some implementations, a stage may include two or more pipeline units 330 that include both a software pipeline component 322 and a hardware pipeline component 336. In this case, an upstream stage may feed block information to the software pipeline component 322 of each pipeline unit at the stage 320. However, in at least some embodiments, only one of the software pipeline components 322 may push the block information to a software pipeline component 322 of a pipeline unit 330 at a downstream stage 320.

Figure 7:
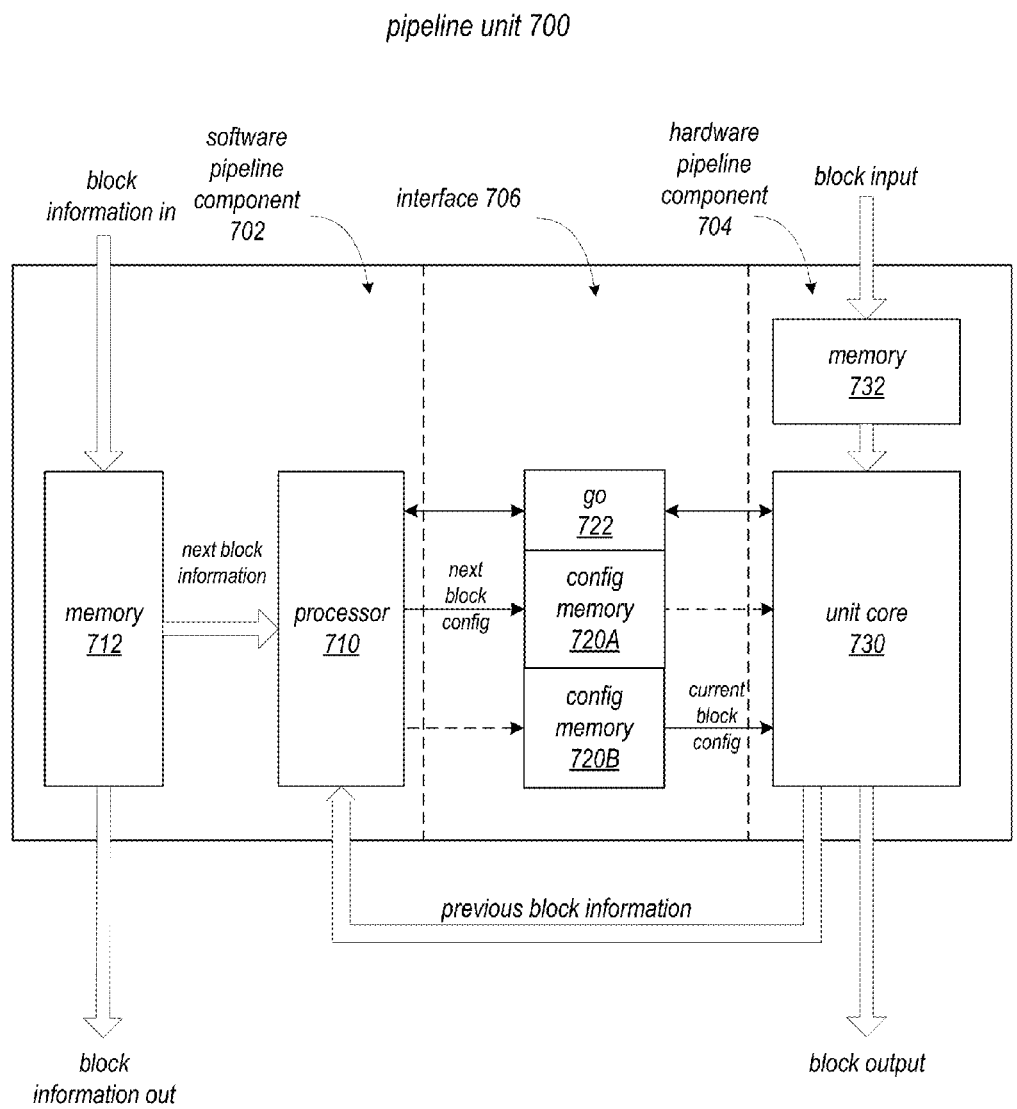
FIG. 7 illustrates components of an example pipeline unit that may be used at a stage of a block processing pipeline that implements a software pipeline and a hardware pipeline, according to at least some embodiments.

FIG. 7 illustrates components of an example pipeline unit that may be used at a stage of a block processing pipeline that implements a software pipeline and a hardware pipeline, according to at least some embodiments. As shown in FIG. 7, the hardware pipeline component 704 of a pipeline unit 700 may include at least a memory 732 and a unit core 730. Unit core 730 may be a component (e.g., a circuit) that is configured to perform a particular operation on or for a block, or a portion of a block, at a particular stage of the block processing pipeline. Memory 732 may, for example, be a double-buffered memory that allows the unit core 730 to read and process data for a block from the memory 732 while data for a next block is being written to the memory 732 from a previous pipeline unit.

As shown in FIG. 7, a pipeline unit 700, in addition to a hardware pipeline component 704 that includes memory 732 and unit core 730, may also include a software pipeline component 702 that includes at least a processor 710 and a memory 712. Processor 710 may, for example, be a mobile or M-class processor. The processors 710 may, for example, be configured to determine and set configurations for a next block to be processed at the hardware pipeline unit 704 according to block information received at the software pipeline component 702. In at least some embodiments, the processor 710 may also be configurable, for example with low-level firmware microcode, to allow flexibility in algorithms that are implemented by the block processing pipeline for various applications.

In at least some embodiments, the software pipeline component 702 may be configured to receive block information from a previous (upstream) stage of the pipeline and send block information to a subsequent (downstream) stage of the pipeline. In addition, a software pipeline component 702 at a last stage of the pipeline may be configured to send feedback data to an upstream stage (e.g. the first stage) of the pipeline. In at least some embodiments, the software pipeline component 702 may also receive information for a block that was previously processed by the hardware pipeline component 704 of the pipeline unit 700.

Software pipeline component 702 may buffer block information received from an upstream stage of the pipeline in memory 712, and push block information from memory 712 to a downstream stage of the pipeline. In at least some embodiments, memory 712 may be a double buffer memory so that an upstream stage can push block information for a next block to the software pipeline component 702 while the processor 710 is accessing block information for a previous block from the memory 712. In some embodiments, memory 712 may be able to buffer more than two sets of block information, for example in cases where the previous stage does not include a software pipeline component as shown by stage 320B in FIG. 5.

The processors 710 may read block information for a next block from memory 712 and determine a configuration for the next block according to the block information. In at least some embodiments, the processor 710 may also receive information for a block that was previously processed by the hardware pipeline component 704 of the pipeline unit 700 and use that information in determining the configuration for the next block.

As shown in FIG. 7, a pipeline unit 700 may also include an interface 706 between software pipeline component 702 and hardware pipeline component 704. In at least some embodiments, the interface 706 may be a set of registers. Note, however, that the interface 706 may be otherwise implemented. In the pipeline unit 700 as shown in FIG. 7, interface 706 includes at least config memory 720A, config memory 720B, and go 722. In at least some embodiments, the processor 710 may write to either of the config memories 720A and 720B, and the unit core 730 may read from either of the config memories 720A and 720B; the processor 710 and unit core 730 may toggle between the two memories 720, with the processor 710 writing to one while the unit core 730 is reading from the other. Alternatively, in some embodiments, the processor 710 may write to only one of the config memories 720 (e.g., config memory 720A), and the unit core 730 may read from only the other config memory 720 (e.g., config memory 720B); when the unit core 730 is ready for a new configuration and the configuration is ready, the configuration may be copied from config memory 720A to config memory 720B. Note that embodiments may also be implemented in which only a single configuration memory is used, or in which more than two configuration memories are used.

Go 722 may, for example, be implemented as one or more bits in a register or other memory, or may be otherwise implemented. In at least some embodiments, when processor 710 completes a configuration for a next block and has set the config memory 720 (e.g., config memory 720A) with the configuration, processor 710 may set go 722 to signal to the unit core 730 that the configuration for the next block is ready in the config memory 720 (e.g., config memory 720A). Unit core 730 may begin to process the next block once go 722 is set for the next block if processing of the current block is complete and the next block is ready in memory 732. Otherwise, unit core 730 may wait until completion of processing of the current block and/or the next block is ready in memory 732. Note that initially (for a first block in the pipeline) no block is being processed at the stage when the processor 710 configures the stage for the first block, and thus unit core 730 may begin to process the first block once go 722 is set for the first block and the first block is ready in memory 732. Once unit core 730 is done with the configuration in a config memory 720, the unit core 730 may clear go 722 to signal to processor 710 that the config memory 720 is available to receive the configuration for a next block.

Figure 8A:
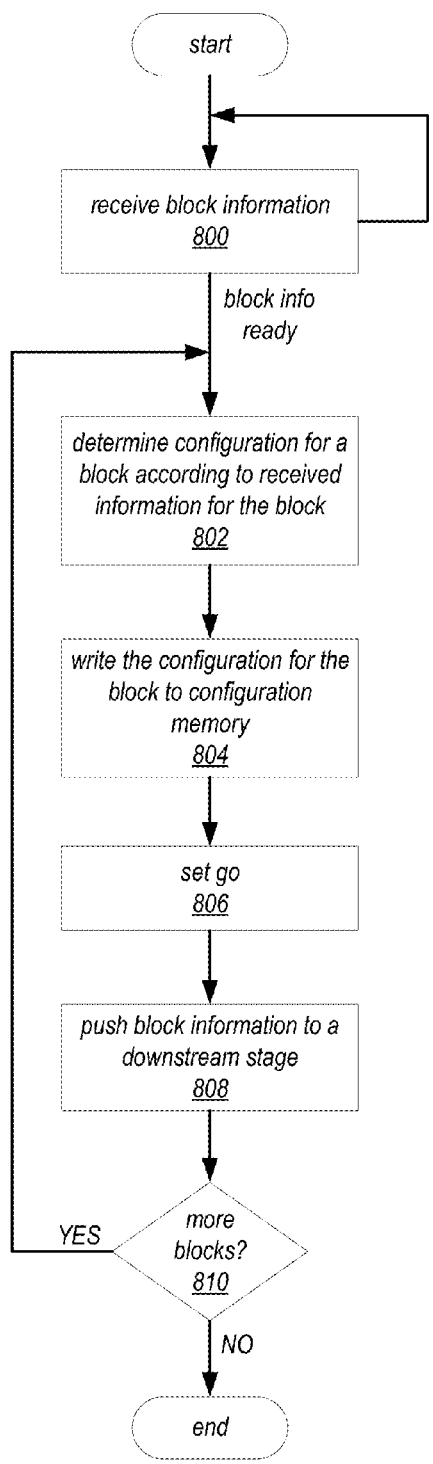
FIGS. 8A and 8B are flow diagrams illustrating methods of operation of a software pipeline and a hardware pipeline that operate in parallel in a block processing pipeline, according to at least some embodiments.
Figure 8B:
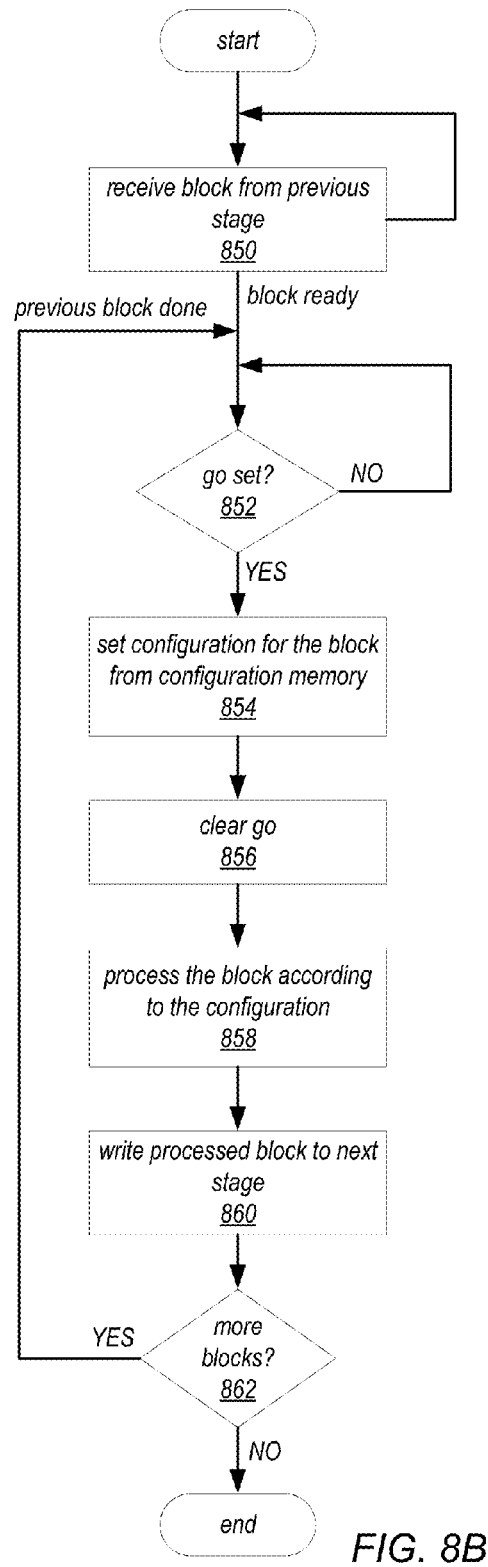

FIGS. 8A and 8B are flowcharts of methods of operation of a software pipeline and a hardware pipeline that operate in parallel in a block processing pipeline to process the blocks from a frame, according to at least some embodiments. FIG. 8A shows operations at a stage for the software pipeline, and FIG. 8B shows operations at the stage for the hardware pipeline. Note that the software pipeline runs one block ahead of the hardware pipeline.

Referring to FIG. 8A, as indicated at 800, a software pipeline component at a stage receives block information. The block information may include block information received from an upstream stage. In at least some embodiments, the software pipeline component may also receive information from a block of the frame that was previously processed at the stage. The block information for one, two, or more blocks may be buffered in a local memory of the software pipeline component. As indicated by the arrow that returns to element 800, element 800 may be iteratively performed as long as there are blocks in the frame to be processed.

As indicated at 802, once the block information for a next block is ready at the stage, the software pipeline component may determine a configuration for the block according to the received information for the block. As indicated at 804, the software pipeline component may write the configuration for the block to a configuration memory of the stage. As indicated at 806, the software pipeline component may set a go bit or otherwise signal to the hardware pipeline component at the stage that the configuration for the next block is ready in the configuration memory. As indicated at 806, the software pipeline component may then push the block information for the block to a downstream stage. At 810, if there are more blocks from the frame to be processed at the stage, the software pipeline method may return to element 802 to begin configuring the hardware pipeline component for a next block. Otherwise, processing of the frame at this stage is done, and the method completes.

Referring to FIG. 8B, a hardware pipeline component at a stage receives blocks to be processed from a previous stage. The block information may be buffered in a local memory of the hardware pipeline component. In at least some embodiments, the local memory may be a double buffer memory so that the previous stage can write a next block to the stage while the hardware pipeline component is processing a current block from the memory. As indicated by the arrow that returns to element 850, element 850 may be iteratively performed as long as there are blocks in the frame to be processed.

At 852, if the hardware pipeline component is not currently processing a block, a next block is ready in the memory, and the software pipeline component has signaled to the hardware pipeline component that a configuration for the next block is ready in the configuration memory (e.g., by setting a go bit or flag), then the hardware pipeline component may begin to process the next block. In at least some embodiments, if any of these three conditions is not met, the hardware pipeline component waits until all three are met. Note, however, that for a first block in the frame to be processed, there will not be a current block being processed at the hardware pipeline component when the first block is received for processing at the hardware pipeline component.

If all necessary conditions are met, then as indicated 854 the hardware pipeline component sets the configuration for processing the next block according to the configuration in the configuration memory. As indicated at 856, the hardware pipeline component clears the go bit or otherwise signals to the software pipeline component that the configuration memory is available. As indicated at 858, the hardware pipeline component processes the block according to the configuration for the block. As indicated at 860, the hardware pipeline component writes the processed block to the next stage. Alternatively, at a last stage, the processed block may be written to a memory, for example to an external memory via direct memory access (DMA). At 862, if there are more blocks from the frame to be processed at the stage, the hardware pipeline method may return to element 852 to begin processing a next block when all conditions are met. Otherwise, processing of the frame at this stage is done, and the method completes.

Note that elements 802 through 808 of FIG. 8A are performed by the software pipeline component at a stage for an initial block in the frame before elements 854 through 860 of FIG. 8B are performed by the hardware pipeline component at the stage. After that, elements 802 through 808 of FIG. 8A may be performed by the software pipeline component at the stage to configure the hardware pipeline component for a next block while elements 854 through 860 of FIG. 8B are performed by the hardware pipeline component to process a current block.

Knight's Order Processing

Embodiments of block processing methods and apparatus are described in which, rather than processing blocks in a pipeline according to scan order as in conventional methods, the blocks are input to and processed in the pipeline according to an order referred to herein as "knight's order." Knight's order is in reference to a move of a chess knight piece in which the knight moves one row down and two columns to the left. Note, however, that "knight's order" as used herein more generally encompasses movements of one row down and p columns to the left, where p may be but is not necessarily 2.

Figure 9:
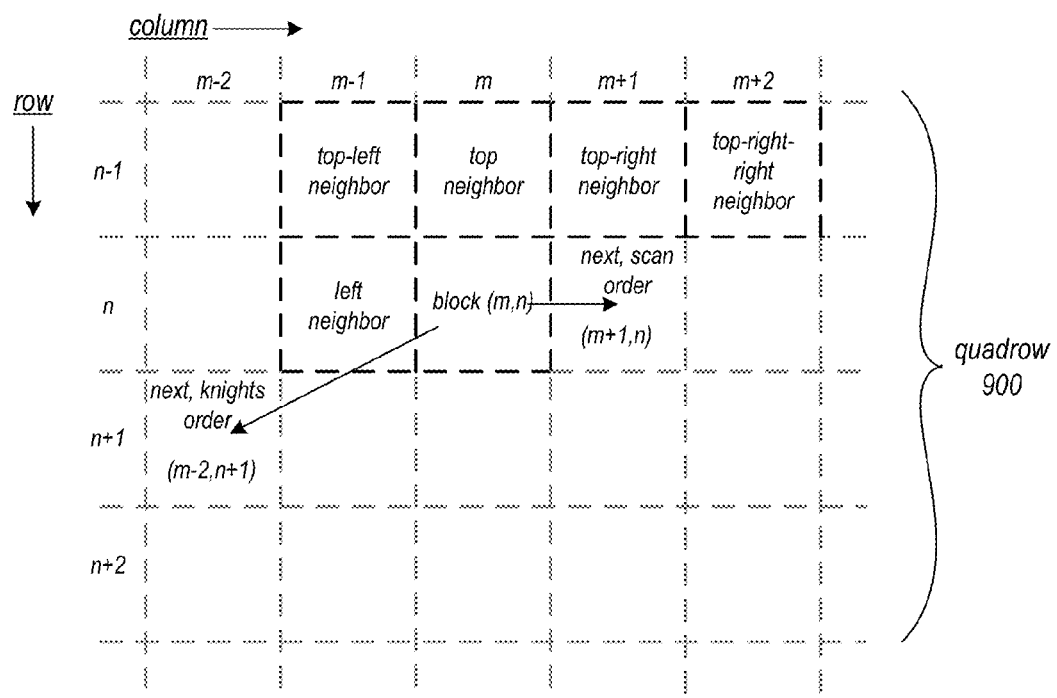
FIG. 9 illustrates neighbor blocks of a current block in a frame, and further illustrates a knight's order processing method for the blocks, according to at least some embodiments.

The knight's order processing method may provide spacing (one or more stages) between adjacent blocks in the pipeline, which, for example, facilitates feedback of data from a downstream stage of the pipeline processing a first block to an upstream stage of the pipeline processing a second block that depends on the data from the first block. One or more stages of a block processing pipeline may require information from one or more other neighbor blocks when processing a given block. FIG. 9 shows neighbors of a current block (m,n) from which information may be required—left (m−1,n); top (m,n−1); top-left (m−1,n−1); top-right (m+1,n−1); and top-right-right (m+2,n−1). These requirements for information from neighbor block(s) may be referred to as dependencies. For example, referring to FIG. 9, information from the left neighbor of block (m,n) may be required to perform a particular operation on the block. In the knight's order processing method, rather than inputting block (m+1, n) into the pipeline immediately after block (m,n), the next block input to the pipeline is block (m−2, n+1). Inputting the blocks into the pipeline in knight's order rather than scan order provides spacing (e.g., one or more stages) between adjacent blocks on a row in the pipeline.

In at least some embodiments of the knight's order processing method, the rows of blocks in the input frame may be divided into sets of four rows, referred to herein as quadrows, with the knight's order processing method constrained by the quadrow boundaries. Referring to FIG. 9 and quadrow 900, when using quadrow boundaries with knight's order processing block (m−1,n) will be four stages downstream when block (m,n) is input to the pipeline, and block (m,n) will be four stages downstream when block (m+1,n) is input to the pipeline. Thus, blocks that are adjacent on a row will be spaced four stages apart in the pipeline. Thus, at stages in which operations are performed on a block that depend on left neighbor information, the information for the left neighbor is more likely to be readily available with less latency than it would be if processing the blocks in scan order. In addition to dependencies on the left neighbor, one or more operations of a block processing method may depend on neighbor blocks from the previous (or above) row such as the top neighbor, top-left neighbor, top-right neighbor, and top-right-right neighbor blocks as shown in FIG. 9. The knight's order processing method with quadrow constraints provides locality of neighbor information that may be leveraged to provide local caching of this neighbor data at each stage in relatively small buffers.

In at least some embodiments, a basic algorithm for determining a next block to input to the pipeline according to the knight's order processing method using quadrow constraints is as follows:

If not on the bottom row of a quadrow:
The next block is two columns left, one row down (−2,+1).
Otherwise, at the bottom row of a quadrow:
The next block is seven columns right, three rows up (+7,−3).

However, the knight's order processing method may also be implemented with other spacing than two blocks left, one block down (−2,+1). For example, instead of two blocks left and one block down, the method may be implemented to go three blocks left and one block down to get the next block. As another example, the method may be implemented to go one block left and one block down (−1,+1) to get the next block. In addition, the knight's order processing method may be implemented with other row constraints than quad-row (four row) constraints. In other words, row groups of at least two rows may be used in embodiments to constrain the knight's order processing method. Assuming r as the number of rows used to constrain the knight's order processing method, the algorithm may be generalized as:

If not on the bottom row of a row group:
    The next block is p columns left, one row down (−p,+1).
Otherwise, at the bottom row of a row group:
    The next block is q columns right, (r−1) rows up (+q,−(r−1)).

Changing the value of p would affect the value of q, would not affect spacing between adjacent blocks from a row in the pipeline, but would affect spacing between a given block and its other neighbor blocks (e.g., its top-left, top, and top-right neighbors). In particular, note that using the spacing (−1,+1) would result in a block and its diagonal (top-right) neighbor block being concurrently processed at adjacent stages of the pipeline. Thus, a spacing of at least two blocks left may be used so that diagonally adjacent blocks are not concurrently processed at adjacent stages of the block processing pipeline. Changing the value of r would affect the value of q, would affect spacing between adjacent blocks from a row in the pipeline, and would affect spacing between the block and its other neighbor blocks (e.g., its top-left, top, and top-right neighbors).

The above algorithm for determining a next block may begin at an initial block. Upon reaching the end of a quadrow that is followed by another quadrow, the algorithm jumps to the first block of the next quadrow and then crosses over between the quadrow and the next quadrow for a few cycles, resulting in the interleaving of some blocks from the end of the quadrow with some blocks from the beginning of the next quadrow. In other words, the knight's order processing method treats the quadrows as if they were arranged end to end. To avoid complications in the algorithm and to maintain consistent spacing of blocks in the pipeline, at least some embodiments may pad the beginning of the first quadrow and the end of the last quadrow with invalid blocks. An invalid block may be defined as a block that is outside the boundary of the frame and that is input to the pipeline but that does not contain valid frame data, and thus is not processed at the stages. The algorithm for determining a next block may thus begin at an initial block, which may be either the first block in the top row of the first quadrow or an invalid block to the left of the first block in the top row of the first quadrow, proceed through all of the quadrows, and at the end of the last quadrow continue until the last block of the last quadrow has been input to the pipeline. There will be bubbles in the pipeline at the beginning and end of the frame, but the spacing of the valid blocks from the frame in the pipeline will remain consistent throughout. In some embodiments, as an alternative to padding the end of the last quadrow of a video frame with invalid blocks, the last quadrow of a video frame may be overlapped with the first row of the next video frame to be processed in the block processing pipeline.

Figures 10A, 10B:
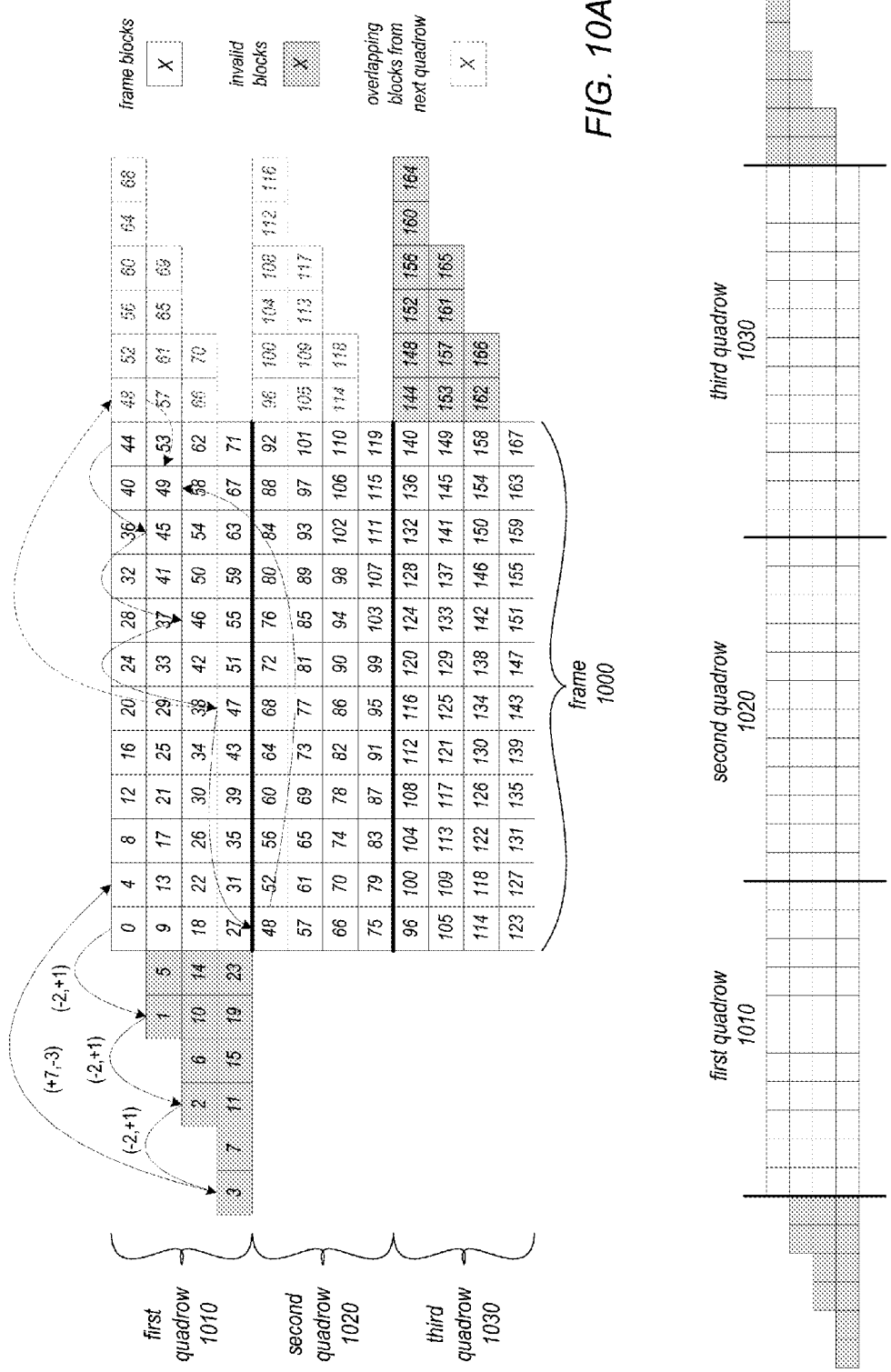
FIGS. 10A and 10B graphically illustrate the knight's order processing method including the algorithm for determining a next block, according to at least some embodiments.

FIGS. 10A and 10B graphically illustrate the knight's order processing method, according to at least some embodiments. For simplicity, these Figures use an example 192× 192 pixel frame 1000 divided into 144 16×16 pixel blocks, with 12 rows and 12 columns of blocks. However, it is to be noted that the knight's order processing method can be applied to input video frames of any dimensions. In FIG. 10A, an example frame is divided into rows and columns of blocks. The rows of blocks are partitioned into three quadrows (1010, 1020, and 1030) including four rows each. The last three rows of the first quadrow (1010) are padded on the left with invalid blocks, and the first three rows of the last (third) quadrow (1030) are padded on the right with invalid blocks. In this example, the numbers in the blocks represent the order in which the blocks are input to the block processing pipeline according to the knight's order processing method, beginning with block 0 (the first block in the top row of the first quadrow). Block 0 is input to the first stage of the pipeline, and when the first stage is ready for another block, the method proceeds by going two columns left, one row down to get the next block for input (block 1, in FIG. 10A). This pattern is repeated until reaching the bottom of the quadrow. At the bottom of the quadrow, the method goes seven columns right, three rows up to get the next block. This continues until all of the blocks in the frame (as well as all of the invalid blocks shown in FIG. 10A) are input into the pipeline. When the end of a quadrow is reached, if there is another quadrow after the quadrow the input algorithm proceeds to the beginning of the next quadrow. In this example, after block 47 is input, the method proceeds to block 48 (the first block in the top row of the second quadrow). As shown by the dashed arrow from block 47 to the dashed rectangle labeled 48 to the right of block 44, the first block of the top row of the second quadrow (block 48) is treated as being immediately to the right of the last block of the top row of the first quadrow (block 44), and thus is reached from block 47 by going seven columns right, three columns up. In other words, the knight's order processing method treats the quadrows 1010, 1020, and 1030 as if they were arranged end to end, with invalid blocks at each end, as shown in FIG. 10B. Thus, the algorithm for determining a next block remains the same across the entire frame 1000.

In some embodiments, each row of the first quadrow may be padded with extra invalid blocks, for example with two extra invalid blocks. Instead of beginning with the first block in the top row of the first quadrow as shown in FIG. 10A, input to the pipeline may begin with the first invalid block to the left of the first block in top row of the first quadrow.

Figure 11A:
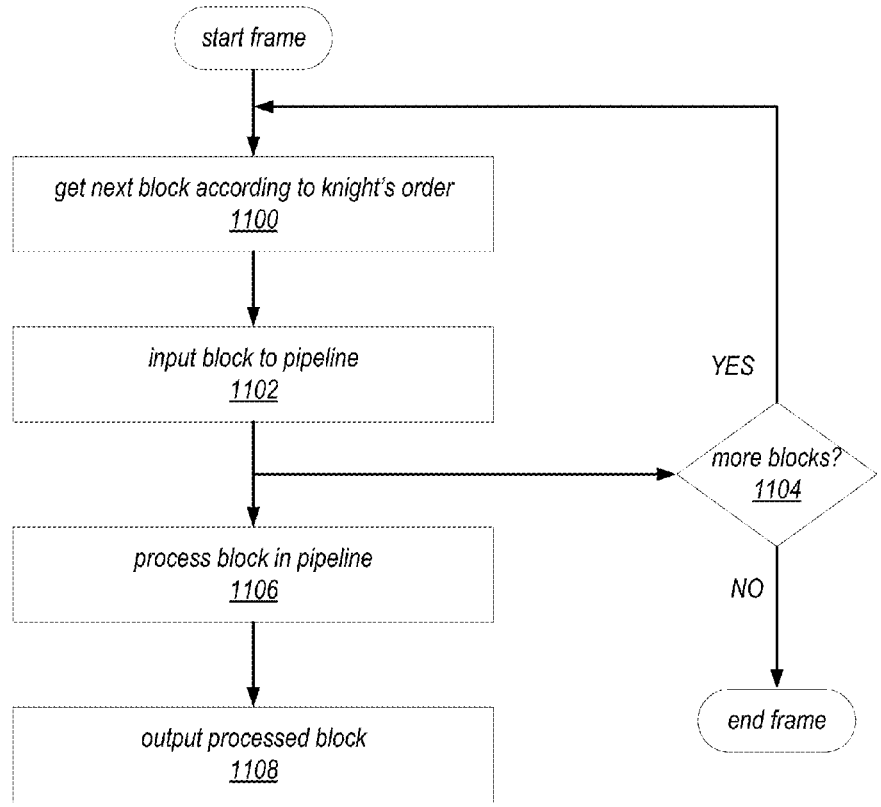
FIGS. 11A and 11B are high-level flow diagrams illustrating a knight's order processing method for a block processing pipeline, according to at least some embodiments.
Figure 11B:
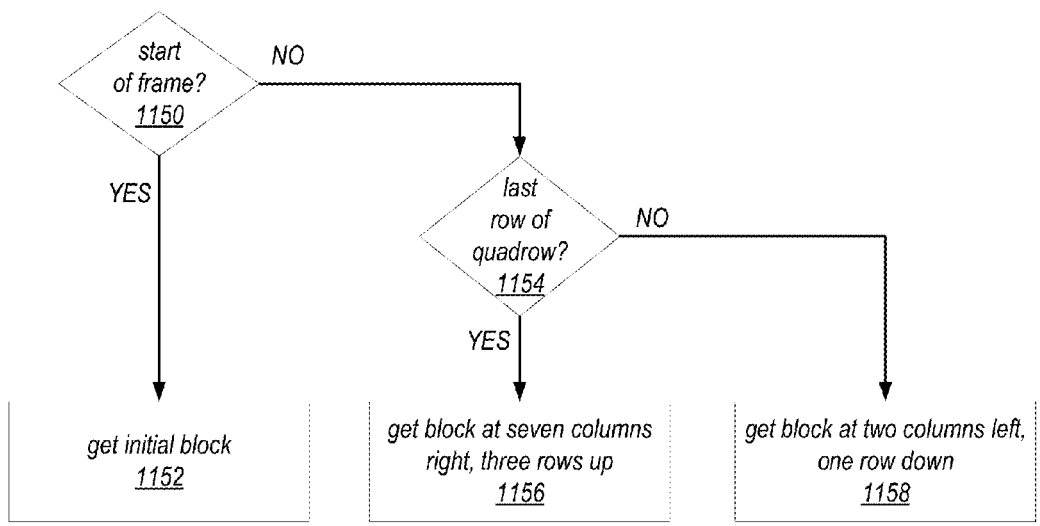

FIGS. 11A and 11B are high-level flowcharts of a knight's order processing method for a block processing pipeline, according to at least some embodiments. In FIG. 11A, as indicated at 1100, a next block is determined according to the algorithm for determining a next input block that is implemented by the knight's order processing method. As indicated at 1102, the block is input to the pipeline, for example from a memory via direct memory access (DMA). As shown by 1104, the input process of elements 1100 and 1102 continues as long as there are blocks to be processed. Each block that is input to the pipeline by elements 1100 and 1102 is processed in the pipeline, as indicated at 1106. Each block is initially input to a first stage of the pipeline, processed, output to a second stage, processed, and so on. When a block moves from a stage to a next stage of the pipeline, the stage can begin processing the next block in the pipeline. Thus, the input blocks move through the stages of the pipeline, with each stage processing one block at a time. As indicated at 1108, once a block has been processed by a last stage of the pipeline, the processed block is output, for example to a memory via direct memory access (DMA).

FIG. 11B is a flowchart of an example algorithm for determining a next input block that that may be implemented by the knight's order processing method, and expands on element 1100 of FIG. 11A. FIG. 11B assumes that the frame is divided into quadrows, and that the algorithm used to determine the next frame is two columns left, one row down (−2,+1) if not on the bottom row of a quadrow, seven columns right, three rows up (+7,−3) if on the bottom row. However, other row groupings and/or spacing algorithms may be used. At 1150, if at the start of the frame, the method gets an initial block as indicated at 1152. If this is not the start of the frame, then at 1154, if this is the last row of the quadrow, the next block is seven columns right, three rows up, as indicated at 1156. If this is not the last row of the quadrow, the next block is two columns left, one row down, as indicated at 1158.

Caching Neighbor Data

One or more operations performed at stages of a block processing pipeline may depend on one or more of the neighbor blocks from the previous (or above) row of blocks such as the top neighbor, top-left neighbor, top-right neighbor, and top-right-right neighbor blocks, as well as on the left neighbor, as shown in FIG. 3. The knight's order processing method with quadrow constraints provides locality of neighbor information that may be leveraged to provide local caching of neighbor data at each stage of the pipeline in relatively small local buffers. For example, in some embodiments, the cached neighbor data may include source transform coefficients (e.g., DC transform coefficients), modified transform coefficients, previously computed quantization errors, and/or weighting coefficient values for one or more neighbor pixels. In at least some embodiments, the local buffers may be implemented using SRAM (static random access memory) technology. However, the local buffers may be implemented using other memory technologies in some embodiments.

Note that blocks in the first column of a frame do not have a left or top-left neighbor, blocks in the last column do not have a top-right or top-right-right neighbor, and blocks in the next-to-last column do not have a top-right-right neighbor. Thus, for block processing methods that use information from these neighbor positions, the information in the local buffers for these neighbor positions relative to blocks in those columns is not valid and is not used in processing the blocks in those columns in the stages of the pipeline. In addition, there are no rows above the top row of the first quadrow, so the blocks in this row do not have top, top-left, top-right, and top-right-right neighbors.

In at least some embodiments of a block processing pipeline that implements the knight's order processing method, a first buffer of sufficient size to cache the C most recently processed blocks on the current quadrow may be implemented at each of one or more stages of the pipeline. This buffer may be referred to as the current quadrow buffer, and may, for example, be implemented as a circular FIFO buffer. In at least some embodiments, C may be determined such that the buffer includes an entry corresponding to the top-left neighbor of the current block at the stage according to the algorithm for determining a next block and the row group size used to constrain the knight's order method. The buffer may also include entries corresponding the top-right-right, left, top-right, and top neighbors for the current block according to the algorithm. When processing a block, a stage may access the current quadrow buffer to obtain neighbor information for the block if that block's neighbor information is valid in the current quadrow buffer. Note that some block processing methods may not require top-left neighbor information, and the current quadrow buffer may be smaller in these implementations.

When a stage completes processing of a block, the block's information is written to the last position in the current quadrow buffer, overwriting the entry at the position of the block's top-left neighbor, thus preparing the buffer for the next block to be processed at the stage. Note that, initially, at the beginning of a frame, there is no information in the current quadrow buffer as no blocks in the frame have been processed, so no block information will be overwritten in the buffer until the buffer is filled. When the next block is at the stage, the previous block's information in the buffer is the block's top-right-right neighbor information.

Figure 12:
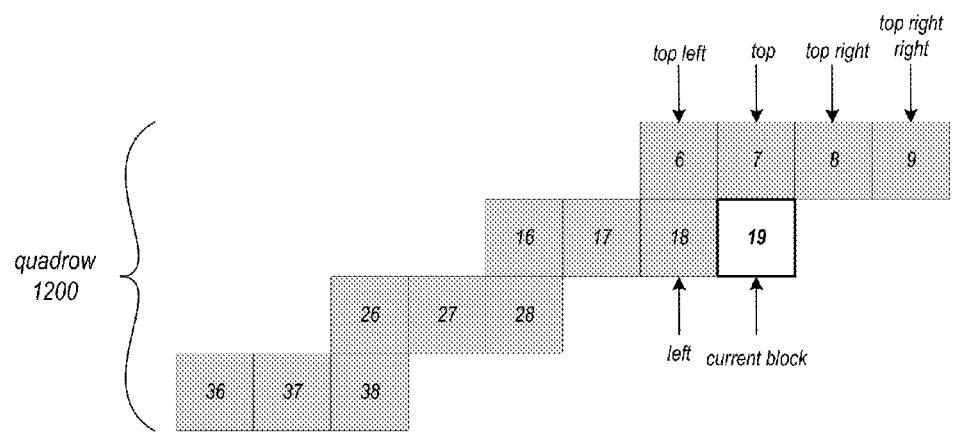
FIG. 12 illustrates a portion of a quadrow as processed in a pipeline according to the knight's order processing method that may be cached in the current quadrow buffer, according to at least some embodiments FIG. 13 graphically illustrates blocks in a current quadrow being processed according to the knight's order processing method, as well as neighbor blocks in the last row of the previous quadrow that may be cached in a previous quadrow buffer, according to at least some embodiments.

For example, using quadrow boundaries and the algorithm for determining a next block where the next block is two columns left, one row down if not on the bottom row of a quadrow, C=13 would be sufficient to include the top-left neighbor of the current block, as the spacing between the current block and its top-left neighbor is 13. FIG. 12 shows a portion of a quadrow 1200 as processed in a pipeline according to the knight's order processing method that may be cached in the current quadrow buffer, according to at least some embodiments. Block 19 represents a current block at a stage. The shaded blocks represent the 13 most recently processed blocks by the stage. Note that the farthest block from block 19 in time is its top-left neighbor (block 6), and the nearest block in time is its top-right-right neighbor (block 9).

For the blocks in the top row of a quadrow, information for neighbors in the row above is not in the current quadrow buffer. There are no rows above the top row of the first quadrow, and for all other quadrows the row above the top row is the bottom row of the previous quadrow. Thus, the current quadrow buffer includes the left neighbor information for all blocks in the top row of a quadrow (except for the first block, which has no left neighbor), but does not include the top-left, top, top-right, and top-right-right neighbor information for the blocks in the top row of the quadrow. To provide this neighbor information for blocks on the top rows of the quadrows, a second buffer of sufficient size to hold information for the required neighbor blocks from the last row of the previous quadrow may be implemented at one or more stages of the pipeline. This buffer may be referred to as the previous quadrow buffer, and may, for example, be implemented as a circular FIFO buffer. The number of entries in the previous quadrow buffer, as well as the particular neighbor blocks that are cached in the previous quadrow buffer, may be dependent on the requirements of the particular block processing method that is implemented by the block processing pipeline. In at least some embodiments, when processing a quadrow according to the knight's order processing method, information for each block on the bottom row of the quadrow may be written to an external memory, for example when the block is at a last stage of the pipeline. For each block in the top row of a quadrow, neighbor (e.g., top-right-right neighbor) data may be read from the external memory, for example at a first stage of the pipeline. This neighbor information may be passed down the pipeline to the other stages along with the corresponding block from the top row.

Figure 13:
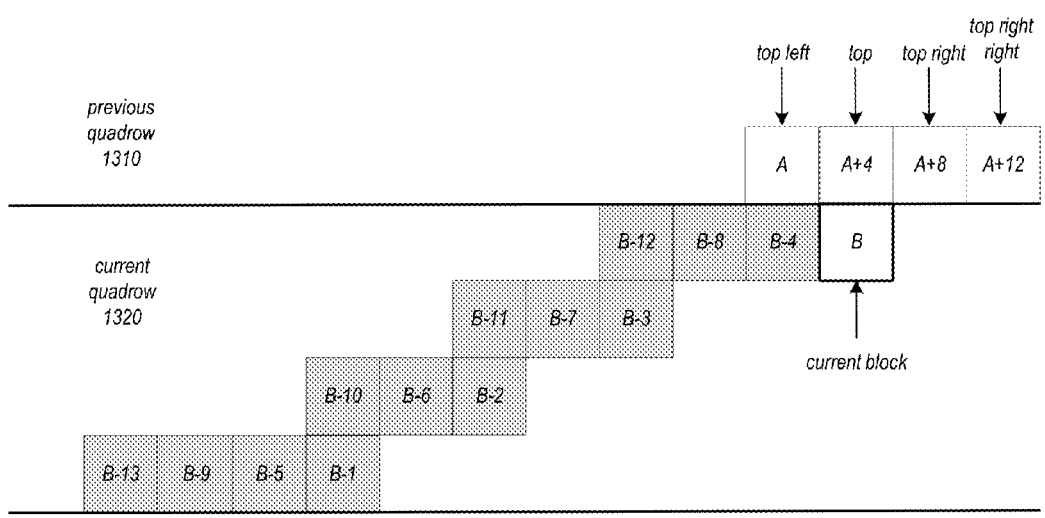

FIG. 13 graphically illustrates blocks in a current quadrow 1320 being processed according to the knight's order processing method, as well as neighbor blocks in the last row of the previous quadrow 1310, according to at least some embodiments. Blocks A, A+4, A+8, and A+12 were processed on the previous quadrow according to the knight's order processing method. Block A was processed first, block A+4 was processed four cycles later, and so on. Block B represents a block on the current quadrow that is currently at a particular stage of the pipeline. Blocks B-1 (B minus 1) through B-13 (B minus 13) represent the thirteen blocks that were most recently processed at the stage in the current quadrow. Information from these blocks may be presently cached in the stage's current quadrow buffer, with B-1 as the most recent entry and B-13 as the oldest entry. B-4 is current block B's left neighbor. However, block B's top-left (block A), top (block A+4), top-right (block A+8), and top-right-right (block A+12) neighbors are on the bottom row of the previous quadrow, and are not included in the current quadrow buffer for block B. In at least some embodiments, to provide neighbor information for blocks on the top row of the current quadrow (e.g., top-left, top, top-right, and top-right-right neighbor information), a previous quadrow buffer may be implemented at each of one or more stages of the pipeline. When processing a quadrow, information for each block on the bottom row of the quadrow is written to a neighbor data structure in external memory, for example by a last stage of the pipeline. When processing blocks from the top row of a next quadrow, information for neighbor blocks in the bottom row of the previous quadrow is read from the external memory, for example by a first stage of the pipeline, and passed down the pipeline to other stages with the top row blocks. In at least some embodiments, information for the top-right-right neighbor block of a block in the top row is read from the external memory. In at least some embodiments, the previous quadrow buffer is a circular buffer, and an oldest entry in the previous quadrow buffer is replaced with the neighbor information that is read from the external memory. In various embodiments, the external memory to which blocks in the bottom row are written and from which neighbor block information is read may be a memory of the pipeline component that is external to the last stage, a memory of a video encoder that implements the pipeline, or a memory external to the video encoder. In some embodiments, however, the memory may be a local memory of the last stage of the pipeline. At least some embodiments may include an interlock mechanism to control the reads and writes to the external memory between rows to avoid overwriting the data in external memory.

Figure 14:
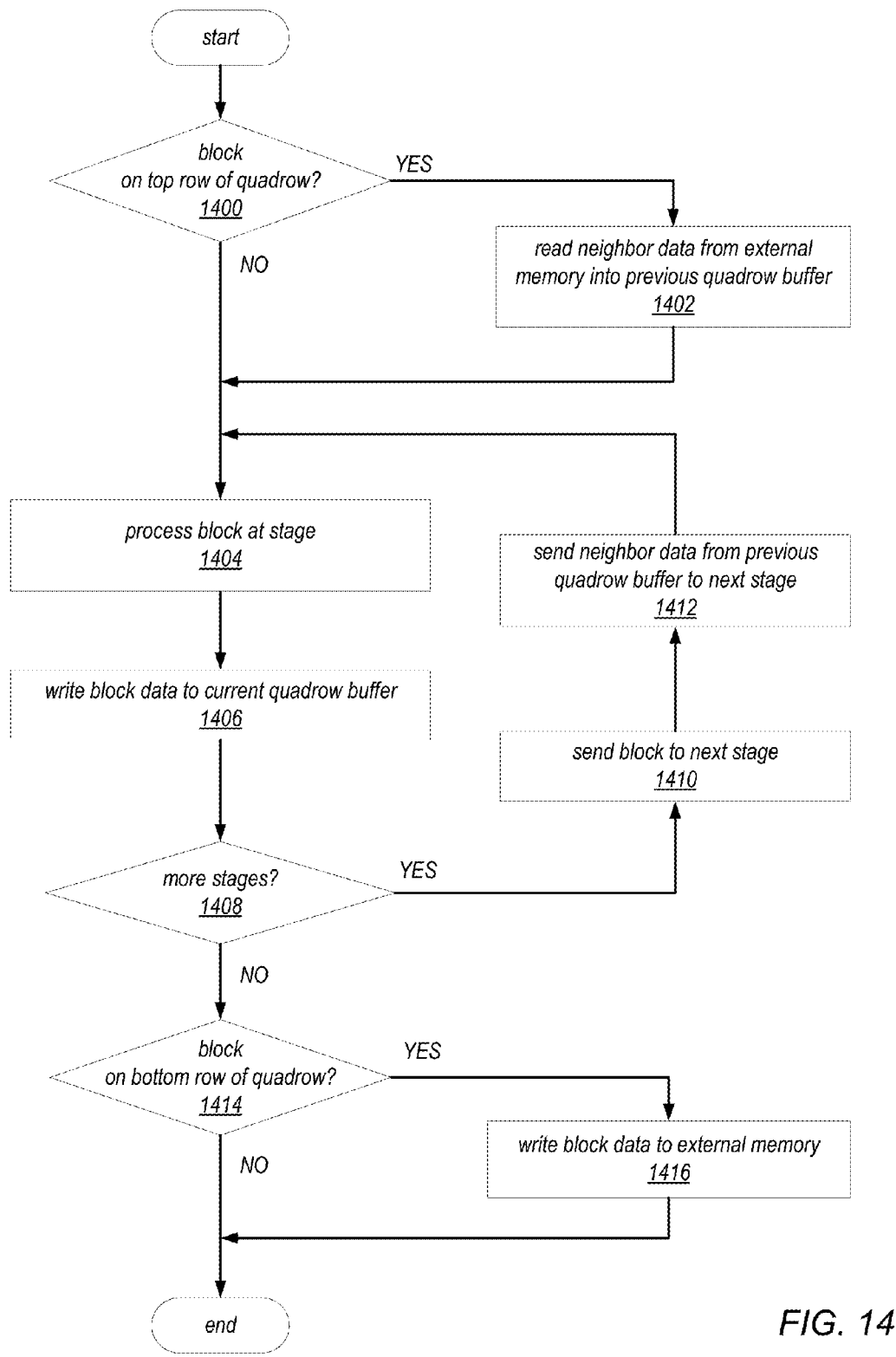
FIG. 14 is a flow diagram illustrating a method for processing blocks in a block processing pipeline in which neighbor data is cached in local buffers at the stages of the pipeline, according to at least some embodiments.

FIG. 14 is a flow diagram illustrating a method for processing blocks in a block processing pipeline in which neighbor data is cached in local buffers at the stages of the pipeline, according to at least some embodiments. For example, the method of FIG. 14 may be used at element 1106 of FIG. 11A to process blocks input to the pipeline according to the knight's order processing method as shown at elements 1100, 1102, and 1104 of FIG. 11A. In FIG. 14, a block is input to the pipeline. At 1400, at a first stage of the pipeline, if the block is on the top row of a quadrow, then neighbor data for the block may be read from external memory (for example, via DMA) into a previous quadrow buffer as indicated at 1402. In at least some embodiments, the neighbor data corresponds to the top-right-right neighbor of the current block on the bottom row of the previous quadrow. As indicated at 1404, the block is then processed at the current stage. If an operation at the stage requires neighbor information to process the block, the stage may use the neighbor information in the current quadrow buffer and/or in the previous quadrow buffer to perform the operation. If the block is on the top row of a quadrow, then at least some of the neighbor information is obtained from the previous quadrow buffer; otherwise, neighbor information may be obtained from the current quadrow buffer. As indicated at 1406, information about the current block may be written to the current quadrow buffer at the stage for use on subsequent blocks. The information may overwrite an oldest entry in the current quadrow buffer.

At 1408, if there are more stages, then the block may be sent to a next stage, as indicated at 1410. At 1412, neighbor information from the previous quadrow buffer may also be sent to the next stage. In at least some embodiments, this neighbor information is only sent to the next stage if the current block is on the top row of a quadrow. Elements 1404 through 1412 may be repeated until the block reaches and is processed by a last stage of the pipeline. At 1408, if there are no more stages, then processing of the block in the pipeline is done. At 1414, if the block is on the bottom row of a quadrow, then information for the block is written to an external memory (for example, via DMA) to be read as neighbor data for blocks in the top row of a next quadrow. In addition, all of the processed valid blocks are output as shown by element 1108 of FIG. 11A.

Example Pipeline Units

Figure 15A:
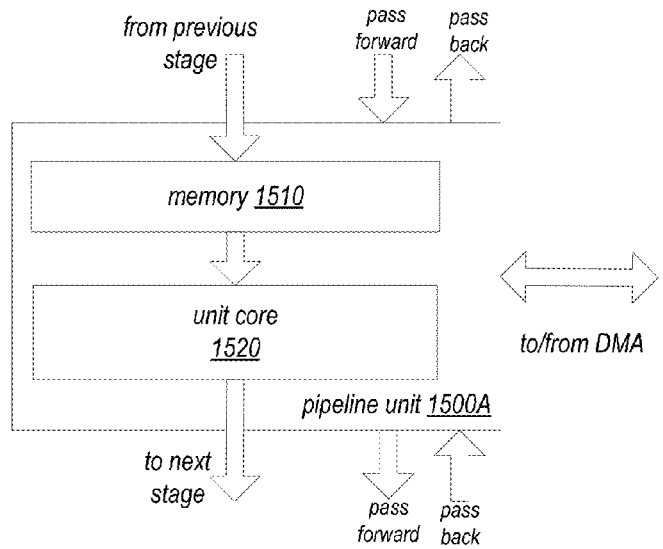
FIGS. 15A and 15B are block diagrams of example pipeline processing units that may be used at the stages of a block processing pipeline that implements one or more of the block processing methods and apparatus as described herein, according to at least some embodiments.
Figure 15B:
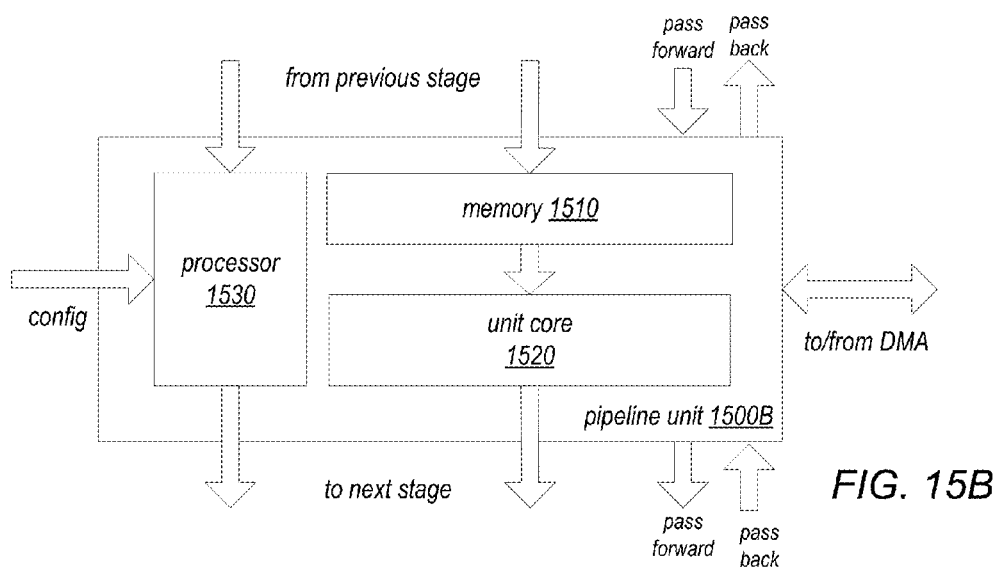
Figure 15C:
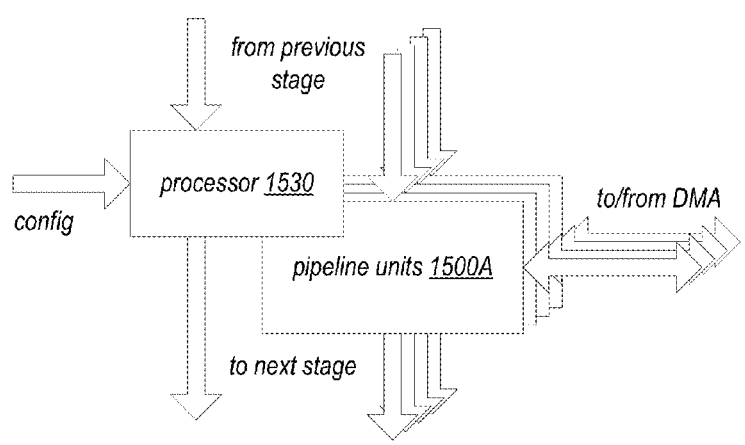
FIG. 15C illustrates that a single processor may be associated with a group of two or more pipeline units, according to at least some embodiments.

FIGS. 15A through 15C are block diagrams of example pipeline processing units that may be used at the stages of a block processing pipeline that implements one or more of the block processing methods and apparatus as described herein, according to at least some embodiments. For example, one or more of pipeline units 1500A and/or 1500B as shown in FIGS. 15A and 15B may be used at each stage of the example block processing pipeline shown in FIG. 16. Note that FIGS. 15A through 15C are not intended to be limiting; a pipeline processing unit may include more or fewer components and features than those shown in the Figures.

As shown in FIG. 15A, a pipeline unit 1500A may include at least a memory 1510 and a unit core 1520. Unit core 1520 may be a component (e.g., a circuit) that is configured to perform a particular operation on or for a block, or a portion of a block, at a particular stage of the block processing pipeline. Memory 1510 may, for example, be a double-buffered memory that allows the unit core 1520 to read and process data for a block from the memory 1510 while data for a next block is being written to the memory 1510 from a previous pipeline unit.

As shown in FIG. 15B, a pipeline unit 1500B, in addition to a memory 1510 and unit core 1520 as shown in FIG. 15A, may also include a processor 1530. Processor 1530 may, for example, be a mobile or M-class processor. The processors 1530 in pipeline units 1500B of a block processing pipeline may, for example, be used to control the block processing pipeline at block boundaries. The processors 1530 in pipeline units 1500B may be configurable, for example with low-level firmware microcode, to allow flexibility in algorithms that are implemented by the block processing pipeline for various applications. In at least some embodiments, a processor 1530 of a pipeline unit 1500B in the pipeline may be configured to receive data from a processor 1530 of a previous (upstream) pipeline unit 1500B and send data to a processor 1530 of a subsequent (downstream) pipeline unit 1500B. In addition, a processor 1530 of a pipeline unit 1500B at a last stage of the pipeline may be configured to send feedback data to a processor 1530 of a pipeline unit 1500B at a first stage of the pipeline.

As shown in FIGS. 15A and 15B, a pipeline unit 1500A or 1500B may be configured to access external memory, for example according to direct memory access (DMA). In addition, a pipeline unit 1500A or 1500B may be configured to pass information back to one or more previous (upstream) stages of the pipeline and/or to receive information passed back from one or more subsequent (downstream) stages of the pipeline. In addition, a pipeline unit 1500A or 1500B may be configured to pass information forward to one or more subsequent (downstream) stages of the pipeline and/or to receive information passed forward from one or more previous (upstream) stages of the pipeline.

As shown in FIG. 15C, two or more units 1500A as shown in FIG. 15A may be grouped together and configured to perform an operation in the pipeline. A single processor 1530 may be used to control and/or configure the pipeline units 1500A.

Example Block Processing Pipeline

FIG. 16 is a high-level block diagram of general operations in an example block processing method 1600 for H.264 encoding that may be implemented in stages by a block processing pipeline that may implement one or more of the block processing methods and apparatus as described herein, according to at least some embodiments. A block processing pipeline that implements the block processing method 1600 may, for example, be implemented as a component of an H.264 video encoder apparatus that is configured to convert input video frames from an input format into H.264/Advanced Video Coding (AVC) format as described in the H.264/AVC standard. The H.264/AVC standard is published by ITU-T in a document titled "ITU-T Recommendation H.264: Advanced video coding for generic audiovisual services", which may be referred to as the H.264 Recommendation, the H.264 standard, or the AVC standard. An example input video format is 1080p (1920×1080 pixels, 2.1 megapixels) encoded in YCbCr color space. However, other input video formats may be encoded into H.264 using embodiments of the pipeline in a video encoder apparatus.

Figure 24:
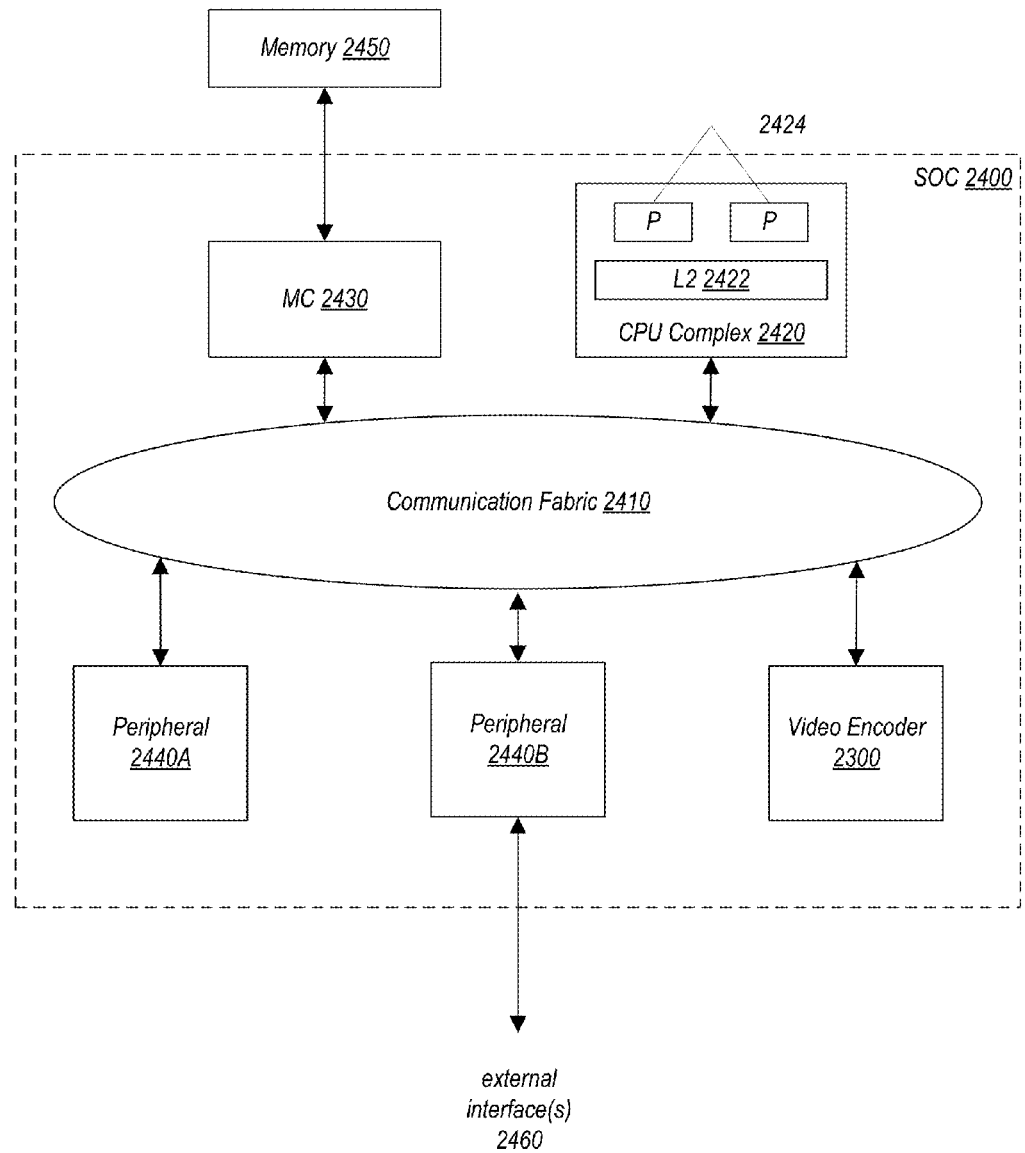
FIG. 24 is a block diagram illustrating one embodiment of a system on a chip (SOC) that includes a video encoder.

The video encoder apparatus may, for example, be implemented as an integrated circuit (IC) or as a subsystem on an IC such as a system-on-a-chip (SOC). In at least some embodiments, the video encoder apparatus may include at least a pipeline component, a processor component (e.g., a low-power multicore processor), and a bus subsystem or fabric that interconnects the functional components of the apparatus. The processor component of the video encoder apparatus may, for example, perform frame-level control of the pipeline such as rate control, perform pipeline configuration, and interface with application software via a driver. The pipeline component may implement multiple processing stages each configured to perform a portion or all of one or more of the operations as shown in FIG. 16, each stage including one or more processing units. At least one of the processing units in the pipeline may include a processor component (e.g., an M-class processor) that may, for example, configure parameters of the processing unit at the respective stage at the macroblock level. The video encoder apparatus may include other functional components or units such as memory components, as well as external interfaces to, for example, one or more video input sources and external memory. Example video input sources to the video encoder apparatus may include one or more of, but are not limited to, a video camera for raw video input processing, a decoder apparatus for re-encoding/transcoding, a flash or other memory, and a JPEG decoder. An example video encoder apparatus is illustrated in FIG. 26. An example SOC that includes a video encoder apparatus is illustrated in FIG. 24. While embodiments are generally described in relation to hardware implementations of a block processing pipeline that implements the block processing method 1600 with knight's order processing, note that the block processing method 1600 with knight's order processing may be implemented by a block processing pipeline implemented in software.

A pipeline that implements the method 1600 as shown in FIG. 16 may process 16×16 pixel macroblocks from input video frames according to the H.264 standard, each macroblock including two or more blocks or partitions that may be processed separately at stages of the pipeline. The input video frames may, for example, be encoded in YCbCr color space; each macroblock may be composed of separate blocks of chroma and luma elements that may be processed separately at the stages of the pipeline. A pipeline that implements the block processing method 1600 may receive input macroblocks from and output processed macroblocks to a memory. The memory may include memory of the video encoder apparatus and/or memory external to the video encoder apparatus. In at least some embodiments, the memory may be accessed by the pipeline as necessary, for example via direct memory access (DMA). In at least some embodiments, the memory may be implemented as a multi-level memory with a cache memory implemented between the pipeline and an external memory. For example, in some implementations, one or more quadrows may be read from an external memory and cached to the cache memory for access by the pipeline to reduce the number of reads to an external memory.

The general operations of the example H.264 video encoder method 1600 as shown in FIG. 16 that may be performed in stages by a pipeline, as well as general data flow through the pipeline, are briefly described below. Each of the general operations of the method 1600 may be implemented by one or more pipeline units at one or more stages of the pipeline. Example pipeline units are illustrated in FIGS. 9A through 9C. Also note that each general operation shown in FIG. 16 may be subdivided into two or more operations that may be implemented by pipeline units at one, two, or more stages of the pipeline. However, two or more of the operations shown in FIG. 16 may be performed at the same stage of the pipeline. Each stage in the pipeline processes one macroblock at a time, and thus two or more of the operations may simultaneously operate on the same macroblock that is currently at the respective stage. Note that a pipeline may perform more, fewer, or other operations than those shown in FIG. 16 and described below.

Macroblock Input

In at least some embodiments, macroblock input 1602 may be performed by an initial stage of the pipeline. In at least some embodiments, macroblock input 1602 receives luma and chroma pixels from a memory, for example via DMA, computes statistics on input pixels that are used by firmware in downstream stages of the pipeline, and buffers input macroblocks to enable firmware look ahead. The input macroblock pixel data and corresponding statistics are buffered and sent to one or more downstream stages of the pipeline that implement intra-frame and inter-frame estimation 1610 operations. In at least some embodiments, an input buffer of up to 16 macroblocks is maintained for input pixels and statistics. In at least some embodiments, the macroblock pixel data and corresponding statistics may be input to downstream stages of the pipeline according to a knight's order input algorithm as previously described in the section titled Knight's order processing.

In at least some embodiments, macroblock input 1602 reads neighbor data from the bottom row of a previous quadrow from memory at quadrow boundaries and passes the neighbor data to at least one downstream stage.

Intra-Frame and Inter-Frame Estimation

Intra-frame and inter-frame estimation 1610 operations may determine blocks of previously encoded pixels to be used in encoding macroblocks input to the pipeline. In H.264 video encoding, each macroblock can be encoded using blocks of pixels that are already encoded within the current frame. The process of determining these blocks may be referred to as intra-frame estimation, or simply intra-estimation. However, macroblocks may also be encoded using blocks of pixels from one or more previously encoded frames (referred to as reference frames). The process of finding matching pixel blocks in reference frames may be referred to as inter-frame estimation, or more generally as motion estimation. Intra-frame and inter-frame estimation 1610 operations may be subdivided into two or more sub-operations that may be performed at one, two, or more stages of the pipeline, with one or more components or pipeline units at each stage configured to perform a particular sub-operation.

In at least some embodiments, macroblock input 1602 reads neighbor data from the bottom row of a previous quadrow from memory at quadrow boundaries and passes the neighbor data to intra-frame and inter-frame estimation 1610, for example to an intra-frame estimation component. In addition, motion compensation and reconstruction 1630, for example a luma reconstruction component, may pass neighbor data as feedback to intra-frame and inter-frame estimation 1610, for example to the intra-frame estimation component.

Motion Estimation

In at least some embodiments, to perform motion estimation, the pipeline may include one instance of a motion estimation engine for each reference frame to be searched. Each motion estimation engine searches only one reference frame. In at least some embodiments, each motion estimation engine may include a low resolution motion estimation component, a full pixel motion estimation component, and a subpixel motion estimation component. In at least some embodiments, the three components of each of the motion estimation engines may be implemented at different stages of the pipeline. In at least some embodiments, each motion estimation engine may also include a memory component that reads and stores reference frame data from a memory as needed. In at least some embodiments, a single instance of a processor manages all instances of the motion estimation engine. In at least some embodiments, the processor may determine one or more candidates using predicted and co-located motion vectors and input the candidates to the full pixel motion estimation components of the motion estimation engines.

In at least some embodiments, the low resolution motion estimation component of each motion estimation engine performs an exhaustive search on a scaled-down, low resolution version of a respective reference frame to generate candidates. In at least some embodiments, the full pixel motion estimation component performs a search on full size pixels using candidates from the low resolution motion estimation component. In at least some embodiments, the subpixel motion estimation component performs a search on half and quarter pixels using best candidates received from the full pixel motion estimation component. In some embodiments, full pixel motion estimation and subpixel motion estimation may be disabled based on results of a direct mode estimation performed at an upstream stage of the pipeline. In at least some embodiments, each motion estimation engine outputs results data to mode decision 1620.

In at least some embodiments, motion estimation may also include a direct mode estimation component that receives co-located and spatial motion vector data and computes a direct/skip mode cost, which it provides to mode decision 1620. Based on the results, the direct mode estimation component may disable full pixel motion estimation and subpixel motion estimation.

Intra Estimation

In at least some embodiments, an intra estimation component of the pipeline performs intra mode selection to determine blocks of pixels already encoded within the current frame that may be used in encoding a current macroblock. In at least some embodiments, the intra estimation component performs intra mode selection only for luma. In these embodiments, chroma intra estimation is performed by a chroma reconstruction component at a downstream stage of the pipeline. In at least some embodiments, the intra estimation component may perform intra estimation independently for each of two or more blocks or partitions (e.g., 4×4, 8×8, 4×8, 8×4, 16×8, and/or 8×16 blocks) in a macroblock. For each block, prediction pixels are first extracted from neighbor blocks (neighbor blocks can be outside the current macroblock in the frame or within the current macroblock). For each prediction mode in the current block, the cost of the current mode is evaluated by creating a prediction block from neighbor pixels, computing a mode cost, and comparing the mode cost to a minimum cost for that block. Once all prediction modes are evaluated and the best mode is determined, reconstruction may be performed for the best mode so that reconstructed pixels can be used to predict future blocks within the macroblock. The intra estimation component may pass best intra mode information to mode decision 1620.

In at least some embodiments, macroblock input 1602 reads neighbor data from the bottom row of a previous quadrow from memory at quadrow boundaries and passes the neighbor data to the intra estimation component. In at least some embodiments, at least one downstream stage (e.g., a luma reconstruction component at a downstream stage) may pass neighbor data back to the intra estimation component.

Mode Decision

In at least some embodiments, mode decision 1620 may be implemented by a mode decision component at a stage of the pipeline that is downstream of the stage(s) that implement intra-frame and inter-frame estimation 1610 operations. However, in some embodiments, mode decision 1620 operations may be subdivided into two or more sub-operations that may be performed at one, two, or more stages of the pipeline, with one or more components or pipeline units at each stage configured to perform a particular sub-operation. In at least some embodiments, the mode decision 1620 component receives the best intra mode from intra estimation, direct/skip mode cost from direct mode estimation, and motion vector candidates from the motion estimation engines. In at least some embodiments, the mode decision component computes additional costs for bi-directional modes and determines the best macroblock type, including macroblock partitions, sub-partitions, prediction direction and reference frame indices. In at least some embodiments, the mode decision 1620 component also performs all motion vector prediction. The motion vector prediction results may be used when estimating motion vector rate during mode decision. Note that the motion vector rate may represent an amount of data needed for encoding the macroblock (or various syntax elements thereof) in a particular mode or when a particular motion vector has been selected. In at least some embodiments, the motion vector prediction results may also be fed back from the mode decision 1620 component to motion estimation, for example for use in direct mode estimation and motion vector rate estimation.

Motion Compensation and Reconstruction

In at least some embodiments, motion compensation and reconstruction 1630 operations may be subdivided into two or more sub-operations that may be performed at one, two, or more stages of the pipeline, with one or more components or pipeline units at each stage configured to perform a particular sub-operation. For example, in some embodiments, motion compensation and reconstruction 1630 may be subdivided into luma motion compensation and reconstruction and chroma motion compensation and reconstruction. In at least some embodiments, each of these sub-operations of motion compensation and reconstruction 1630 may be performed by one or more components or pipeline units at one or more stages of the pipeline.

Luma Motion Compensation and Reconstruction

In at least some embodiments, a luma motion compensation component of the pipeline receives the best mode and corresponding motion vectors from mode decision 1620. As previously noted, each motion estimation engine may include a memory component that reads and stores reference frame data from a memory. If the best mode is inter-predicted, the luma motion compensation component requests reference frame macroblocks from the motion estimation engine corresponding to the motion vectors. The motion estimation engine returns subpixel interpolated 4×4 or 8×8 blocks depending on the request size. The luma motion compensation component then combines the blocks into prediction macroblocks. The luma motion compensation component then applies a weighted prediction to the prediction macroblocks to create the final macroblock predictor that is then passed to the luma reconstruction component.

In at least some embodiments, a luma reconstruction component of the pipeline performs macroblock reconstruction for luma, including intra prediction (in at least some embodiments, the luma motion compensation component performs inter prediction), forward transform and quantization (FTQ), and inverse transform and quantization (ITQ).

In at least some embodiments, based on the best mode from mode decision 1620, either an inter prediction macroblock is passed from the luma motion compensation component or intra prediction is performed by the luma reconstruction component to generate a prediction block. In intra mode, the prediction is performed in block (scan) order since reconstructed pixels from neighbor blocks are needed for prediction of future blocks. The input block is subtracted from the prediction block to generate a residual block. This residual pixel data is transformed and quantized by an FTQ technique implemented by the luma reconstruction component (or an FTQ block thereof). The coefficient data is sent to an ITQ technique implemented by the luma reconstruction component (or an ITQ block thereof), and may also be sent downstream to CAVLC encoding. The ITQ technique generates a reconstructed residual pixel block. The prediction block is added to the residual block to generate the reconstructed block. Reconstructed pixels may be passed downstream to a deblocking filter. In at least some embodiments, reconstructed pixels may also be passed back to an intra-frame estimation component of intra-frame and inter-frame estimation 1610 as feedback for use as neighbor data when processing subsequent macroblocks. In at least some embodiments, reconstructed pixels may also be passed back to an intra prediction neighbor pixel memory at the stage for use as neighbor pixels when predicting subsequent blocks inside the current macroblock at the stage.

Chroma Motion Compensation and Reconstruction

In at least some embodiments, chroma reconstruction is performed in two stages. In the first stage, chroma reference blocks needed for inter prediction are read from memory based on input macroblock type, motion vectors, and reference frame index. Subpixel interpolation and weighted prediction is then applied to generate a prediction macroblock. In the second stage, chroma intra prediction and chroma intra/inter FTQ/ITQ is performed. This allows one additional pipeline stage to load chroma prediction pixel data. Since chroma pixels are not searched by motion estimation, the chroma prediction data is read from external memory and may have large latency. In at least some embodiments, a chroma motion compensation component performs the first stage, while a chroma reconstruction component performs the second stage.

In at least some embodiments, the chroma motion compensation component generates a prediction block including subpixel interpolation for Cb and Cr chroma blocks; the size is based on the partition size and chroma formats. A full size chroma block is 8×8, 8×16, or 16×16 pixels for chroma formats 4:2:0, 4:2:2 and 4:4:4, respectively. In at least some embodiments, the chroma motion compensation component may prefetch and cache chroma prediction pixels from an external (to the pipeline) memory. In at least some embodiments, reference data may be read based on mode decision 1620 results. The chroma motion compensation component performs subpixel interpolation to generate a prediction block. Mode decision 1620 provides the macroblock type and sub-types, reference frame index per partition, and corresponding motion vectors. The prediction is output to the chroma reconstruction component.

In at least some embodiments, the chroma reconstruction component performs chroma prediction, chroma intra estimation and chroma reconstruction for inter and intra modes. For chroma formats 4:2:0 and 4:2:2, intra chroma estimation and prediction is performed. In at least some embodiments, chroma intra estimation is performed at this stage rather than at intra-frame and inter-frame estimation 1610 so that reconstructed pixels can be used during the estimation process. In at least some embodiments, if the best mode is an intra mode, intra chroma estimation may be performed based on the best intra chroma mode, and intra prediction may be performed using one of four intra chroma modes. For inter macroblocks, inter chroma prediction pixels are received from chroma motion compensation. For chroma format 4:4:4, the luma intra prediction modes are used to generate the chroma block prediction, and inter chroma prediction is performed in the same manner as for luma. Therefore, chroma reconstruction conceptually includes 4:2:0 and 4:2:2 chroma reconstruction and luma reconstruction used to reconstruct chroma in 4:4:4 chroma format.

CAVLC Encode and Deblocking

In at least some embodiments, CAVLC encoding and deblocking may be performed by one or more components at a last stage of the pipeline, as shown in 1640 of FIG. 16. In at least some embodiments, a deblocking filter component of the pipeline receives reconstructed luma and chroma pixels from the chroma reconstruction component and performs deblocking filtering according to the H.264 Recommendation. Results may be output to a memory.

In at least some embodiments, a CAVLC encode component of the pipeline receives at least luma and chroma quantized coefficients, neighbor data, and chroma reconstruction results from the chroma reconstruction component and generates a CAVLC (context-adaptive variable-length coding) encoded output stream to a memory. Note that in other embodiments, an encode component of the pipeline may generate an output stream other than a CAVLC encoded bit stream, for example an output stream in a proprietary format or in a format defined by another compression standard, such as the HEVC standard.

In at least some embodiments, the deblocking filter component and the CAVLC encode component write neighbor data for the bottom row of a quadrow to a memory at quadrow boundaries. Referring again to FIG. 16, for the top row of a next quadrow, macroblock input 1602 may then read this neighbor data from the memory at quadrow boundaries and pass the neighbor data to at least one downstream stage of the pipeline.

Transcoder

In at least some embodiments, a transcoding operation may be performed by a transcoder 1650. The transcoder may be implemented as a functional component of the pipeline or as a functional component that is external to the pipeline. In at least some embodiments, the transcoder 1650 may perform a memory-to-memory conversion of a CAVLC (context-adaptive variable-length coding) encoded stream output by the pipeline to a CABAC (context-adaptive binary arithmetic coding) encoded stream. Note that in other embodiments, the transcoder 1650 may perform a memory-to-memory conversion of data in a format other than a CAVLC encoded bit stream (e.g., data in a proprietary format or in a format defined by another compression standard, such as the HEVC standard) to a CABAC encoded bit stream.

In at least some embodiments, the pipeline may encode in an order other than scan order, for example knight's order as previously described herein. However, ultimately, the H.264 video encoder's encoded bit stream should be transmitted in conventional macroblock scan order. In at least some embodiments, re-ordering the macroblock output from knight's order to scan order is accomplished by the CAVLC encode component writing encoded data to four different output buffers, each output buffer corresponding to a macroblock row. At the end of a quadrow, each row buffer will contain a scan order stream of encoded macroblocks for a respective row. Transcoder 1650 handles stitching the start and end of each row to generate a continuous stream at macroblock row boundaries. In at least some embodiments, the pipeline may embed metadata in the CAVLC output stream to facilitate stitching of the rows by the transcoder 1650.

The mechanisms described herein for estimating rate costs in video encoding operations using entropy encoding statistics may be implemented in block processing pipelines that implement the H.264 standard and/or the H.265 standard, and an apparatus for performing video encoding may implement either or both types of block processing pipelines. However, there are several differences in the components and functionality for the two pipelines (or for a pipeline that is configured to operate in an H.264 mode and in an H.265 mode). For example, a motion estimation component, such as the one described above, may be used in both pipelines. However, the search parameters may be different between the pipelines and there may be other differences when the motion estimation module operates in H.264 mode (which may be referred to as "AVC mode") rather than in H.265 mode (which may be referred to as "HEVC mode").

In some embodiments, in AVC mode, the motion estimation component receives predicted motion vectors from the mode decision stage for the current macroblock. These motion vectors may be used to compute the cost function to determine the best motion vector. The following predicted motion vectors may be passed to the motion estimation component (from a source as determined at the mode decision stage):

1. 16×16
2. 16×8 partition 0
3. 8×16 partition 0
4. 8×4 partition 0, sub-partition 0
5. 4×8 partition 0, sub-partition 0

In some embodiments, in HEVC mode, the motion estimation component may receive top neighbor motion vectors in addition to collocated motion vectors, and a motion vector predictor estimate may be calculated from the neighbor motion vectors and the collocated motion vectors.

In some embodiments, the mode decision component of a block processing pipeline that is operating in HEVC mode may perform intra estimation for luma, motion compensation for luma, and luma Reconstruction. The function of the mode decision component in HEVC mode may be to make some or all of the following decisions, as appropriate:

coding unit (CU) split decision: decide whether 64×64, 32×32, and 16×16 blocks are to be quad-split into smaller CUs;

CU inter or intra mode decision: decide whether a CU is to be intra or inter predicted;

prediction unit (PU) partition mode and prediction decision: perform bi-prediction and a motion vector merge mode search, then decide whether a CU is to be partitioned into smaller prediction units, and select an inter or intra prediction mode;

transform unit (TU) partition and transform bypass decision: perform motion compensation for inter mode, then decide whether a CU is to be partitioned into smaller transform units (e.g., making up to two splits for inter modes and one split for intra modes), and whether a 4×4 transform is to be bypassed. Note that each transform unit may include three transform blocks (TBs), one for each color component.

In some embodiments, a block processing pipeline that is operating in HEVC mode may include the following additional components: a chroma motion compensation (MCC) component, a chroma reconstruction (RCR) component, a back-end filter (BEF) component, a transcode component (which is described in more detail below), and a syntax element binarization (SEB) component (which is described in more detail below).

In some embodiments, the quantized Cb and Cr chroma transform coefficients may be sent to the SEB component from the RCR stage, and the quantized luma coefficients may be sent to the SEB component from the mode decision stage, where the binarization of each syntax element will be performed according to the H.265 recommendation. Note that the SEB will not encode any header data (e.g., slice headers, sequence parameter sets, or picture parameter sets). Instead, firmware may provide the encoded header data, and the SEB component may send the header data to the transcoder as part of the payload. In some embodiments, the header data may be prepended by synchronization markers and may always start and end on a byte boundary.

In some embodiments, the SEB component may be configured to generate statistics for each syntax element bin that is not a bypass bin to reflect the encoding of the bin using symbols having one of two values (e.g., a symbol A or a symbol B). These statistics may include the following three count values (which may be implemented in respective 32-bit counters):

totalCount: the counter is incremented each time a bin corresponding to a particular context is encoded;

countA: the counter is incremented each time a symbol A (e.g., a value of 0) is encoded for a particular context.

countB: the counter is incremented each time a symbol B (e.g., a value of 1) is encoded for the particular context.

As described in more detail below, in some embodiments, the macroblock input component at the front of the block processing pipeline (or a component of another pipeline stage that precedes the transcode stage) may calculate a probability of encoding symbol A (e.g., a 0) and a probability of encoding symbol B (e.g., 1) for each context. In some embodiments, these probabilities may be used to calculate the entropy for the given context, which may then be used to estimate the number of bits needed to encode the corresponding bin. In various embodiments, these statistics may be passed back to the macroblock input component through a hardware data FIFO, or may be written to a shared memory from which they may be accessed by components of other pipeline stages.

Figure 17A:
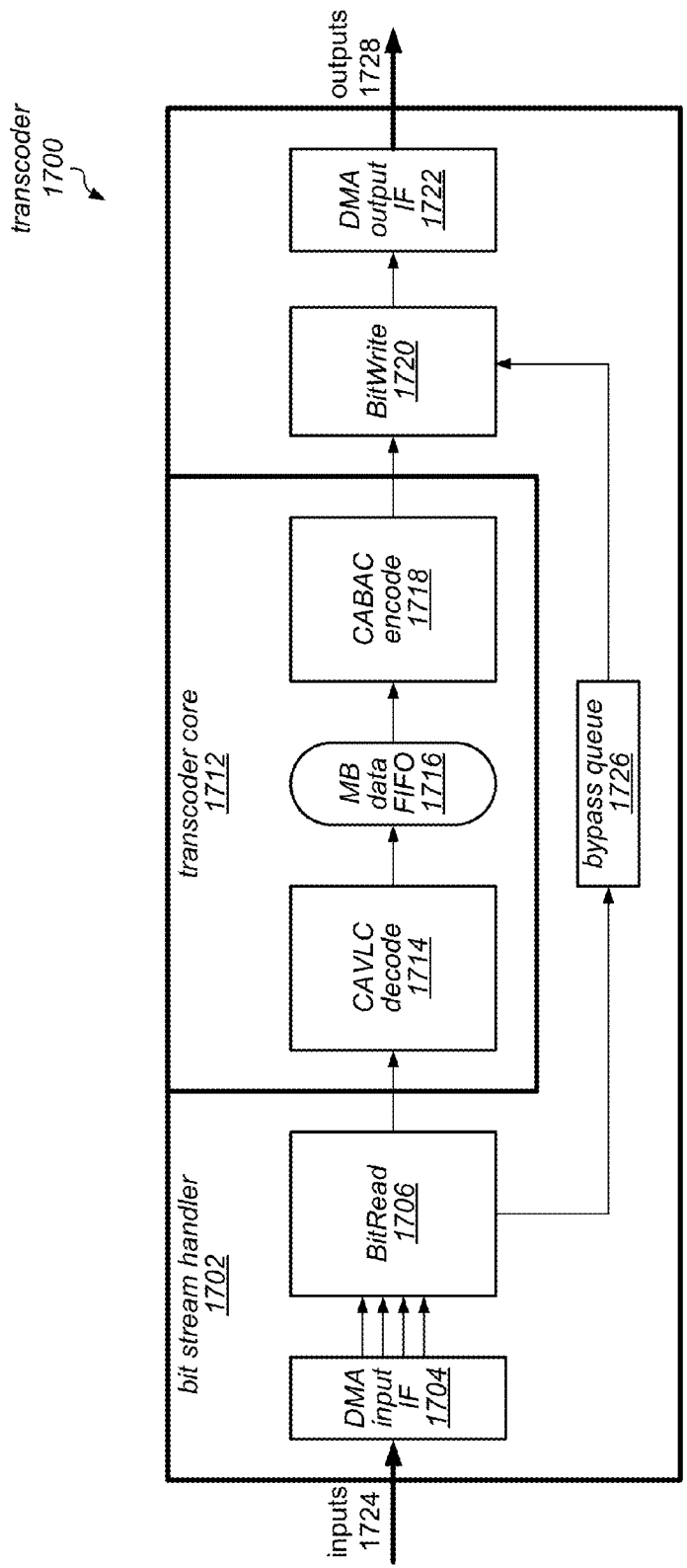
FIGS. 17A and 17B are block diagrams illustrating example transcoders, according to different embodiments.

One embodiment of a transcode component (sometimes referred to as an entropy transcode block) in a block processing pipeline that operates in AVC mode is illustrated by the block diagram in FIG. 17A. As illustrated in FIG. 17A, the transcode component (shown as transcoder 1700) may include a bit stream handler 1702 (which may include a DMA input interface 1704, a bit reader component 1706, a bit writer component 1720, and a DMA output interface 1722), a transcoder core 1712 (which may include a CAVLC decode component 1714, a macroblock data FIFO 1716, and a CABAC encode component 1718), and a bypass queue 1726.

The inputs to transcoder 1700 (shown as inputs 1724) may include the CAVLC encoded bits for multiple macroblocks (which may be written to different channels of DMA input interface 1704), neighbor information (e.g., CAVLC encoded information representing neighbor data, received over one DMA channel), co-located data for use in direct mode estimation (e.g., received over one DMA channel), and/or firmware data (which may be received from a processor of the CAVLC component over one DMA channel), in various embodiments. In at least some embodiments, the outputs of transcoder 1700 (shown as outputs 1728) may include a single encoded bit stream (e.g., a CAVLC encoded bit stream or a CABAC encoded bit stream), as described herein.

In some embodiments, the DMA input interface of the transcode component may share a single data bus with four push/credit interfaces. In some such embodiments, the inputs to the bit reader component (shown as BitRead 1706) from DMA input interface 1704 may include a push input and data, and the outputs from BitRead 1706 back to DMA input interface 1704 may include a multiple-bit credit output. In such embodiments, the outputs from the bit writer component (shown as BitWrite 1720) to DMA output interface 1722 may include push and data outputs, and the inputs to BitWrite 1720 from DMA output interface 1722 may include the multiple-bit credit output from DMA output interface 1722. In the example transcode component illustrated in FIG. 17A, bypass queue 1726 is illustrated as a component on the path within bit stream handler 1702 from the bit reader component (BitRead 1706) to the bit writer component (BitWrite 1720).

As described herein, if the desired output of the video encoding exercise is CAVLC encoded data for the blocks of a video frame, the operations of the transcoder core (such as transcoder core 1712) may be elided. In this case, the CAVLC encoded data may pass through a bypass queue (such as bypass queue 1726), rather than through the transcoder core. However, if the desired output of the video encoding exercise is CABAC encoded data, the transcode component (or, more specifically, the transcoder core 1712) may also be configured to convert the CAVLC encoded data to CABAC encoded data prior to writing the output bit stream to memory. In this case, the main block processing pipeline may be configured to begin processing another quadrow of blocks (e.g., performing CAVLC encoding of the blocks in knight's order and then writing them out to multiple DMA buffers) while the transcode component performs the operations to convert the CAVLC encoded data to CABAC encoded data.

Bit Stream Handler

As previously noted, the bit stream handler (such as bit stream handler 1702) of a transcode component (such as transcoder 1700) may merge CAVLC encoded data from four DMA buffers (which may be in external memory) into a single contiguous CAVLC bit stream, or into a transcoded CABAC stream, and may output the final bit stream to memory. For example, in CAVLC mode, the DMA buffers (sometimes referred to as CAVLC intermediate buffers) may be read in macroblock scan order and the bit streams read from these buffers may be written as a single contiguous bit stream to an output buffer. In CABAC mode, the DMA buffers (or CAVLC intermediate buffers) may be read in scan order and transcoded into a CABAC encoded bit stream, which may then be written in a continuous output buffer in memory.

Bit Reader

In some embodiments, a bit reader component of the bit stream handler (such as BitRead 1706) receives CAVLC encoded data from four DMA channels, reads bits from the channel corresponding to the current macroblock row, detects start codes or other synchronization information, and provides a contiguous bit stream to a CAVLC decode component (such as CAVLC decode 1714) or to a bypass queue (such as bypass queue 1726). The bit reader may also optionally remove start codes or other information from the input bit stream, in some embodiments.

Input DMA

As noted above, the transcoder DMA input interface (such as DMA input interface 1704) may share a single data bus with four push/credit interfaces. In some embodiments, each interface may independently control a single DMA buffer, but only one buffer can be written to at a time. Under the push/credit protocol, a credit may indicate a free entry within a buffer. In some embodiments, each buffer can be written to at any time, i.e., there may be no restriction on the order of the input data.

Output DMA

The transcoder DMA output interface (such as DMA output interface 1722) may also follow the push/credit protocol. Additionally, an idle signal may indicate to the write DMA engine that the transcode component has finished operating on the current block data, and it should flush any pending data to memory.

CAVLC Decode

In some embodiments, a CAVLC decode component (such as CAVLC decode 1714) may be configured to extract macroblock header data and quantized coefficients for the CABAC encode component (such as CABAC encode 1718) to encode. In some embodiments, the data may be sent from the CAVLC decode component to the CABAC encode component using a macroblock data FIFO (such as MB data FIFO 1716) that contains three sections, in the following order: macroblock header information, significance map information, and quantized coefficient data. The output of the CABAC encode component (e.g., a single contiguous CABAC encoded bit stream) may be sent to the bit writer (such as BitWrite 1720). Note that significance maps may not be required for CAVLC decode but may be generated by it to reduce the complexity of CABAC encode. In some embodiments, the significance map may include a last significant coefficient index and one or more significant coefficient flags (e.g., one flag per coefficient, organized in block order). The quantized coefficients may be extracted in zig-zag order (e.g., either 8×8 zig-zag or 4×4 zig-zag order, depending on the transform size. In some embodiments, quantized coefficients may be signed 16-bit values.

Bit Writer

In some embodiments, the bit writer (such as BitWrite 1720) may receive encoded block data from the CABAC encoder 1718 or the bypass queue 1726, insert start codes into the bit stream (e.g., before inserting header data) and provide a contiguous bit stream to the DMA output interface (such as DMA output interface 1722). For example, when header data is sent through the bypass queue, the bit writer may insert a start code into the bit stream before inserting the header data received from the bypass queue. In some embodiments, the bit writer may need to finish writing any macroblock data from the CABAC encode component before inserting the header.

In some embodiments, when transcoding a macroblock, neighbor data from the macroblock above may be used in predicting syntax elements in the current macroblock. In some embodiments, left neighbor data may be maintained by the transcode component (such as transcoder 1700), and top neighbor data may be maintained in a buffer in external memory. In some such embodiments, before transcoding a macroblock, top neighbor data may be read from DMA. After transcoding the macroblock, neighbor data may be written to DMA for use in processing macroblocks on the next row.

Transcoder Modes of Operation

As previously noted, the transcode component (sometimes referred to as the transcode engine) may operates in two different modes, a CAVLC mode (which may also be referred to as bypass mode) or a CABAC mode. In CAVLC mode, the operations of the transcoder core may be elided. In this mode, the bit reader may be configured to merge four CAVLC encoded input bit streams (one for each row of a quadrow) into a single bit stream, remove start codes and/or other header information, parse and remove synchronization markers or other messages, and send all other data through the bypass queue to the bit writer. As previously noted, a new start code may be inserted by the bit writer before the header. In this mode, the bit writer may receive an input bit stream from the bypass queue, insert start codes and/or other information into the bit stream, and then write the final output bit stream to DMA.

In CABAC mode (which may also be referred to as transcode mode), the bit reader may again be configured to merge four CAVLC encoded input bit streams (one for each row of a quadrow) into a single bit stream, remove start codes and/or other header information, and parse and remove synchronization markers or other messages. However, in this mode, the bit reader may be configured to send header data through the bypass queue to the bit writer, and to send encoded block data (e.g., CAVLC block data) to the transcoder core (more specifically, the CAVLC decode component of the transcoder core). In this mode, the CAVLC decode component may be configured to decode those inputs and to send the decoded syntax elements to the CABAC encode, which may encode them using CABAC encoding and then forward the CABAC encoded bits to the bit writer. In this mode, the bit writer may receive CABAC encoded block data from the CABAC encode component, and may be configured to re-insert the header codes that were removed by the bit reader (e.g., start codes and/or other header codes that were received from the bypass queue), and synchronize the insertion of this header information into the output bit stream. The bit writer may then write the final output bit stream to DMA.

CABAC Encode

In some embodiments, the CABAC encode (CBE) component (sometimes referred to as a CBE engine) is part of the transcode component (or transcode engine). This component may be configured to consume macroblock data that has been decoded by the CAVLC Decode component and to produce a CABAC encoded bit stream. In at least some embodiments, the CABAC encode component may take the following inputs: global parameters of the video encoder in which it is implemented, and macroblock header and coefficient data, as decoded by the CAVLC decode engine. For regular bin encoding, the CABAC encode component may perform context-adaptive binary arithmetic coding as specified by the H.264 recommendation. As described in more detail below, for each context-adaptive binary arithmetic coding operation, the CABAC encode component may receive a syntax element and (if it is not a binary representation) binarize the received syntax element. The binarized syntax element may include (and/or be combined with) control information and/or neighbor information that determines the context to use for coding the syntax element. Given the determined context, the CABAC encode component may access a context lookup table, which may output a probability associated with the context. This probability may be input to a binary arithmetic coding engine within the CABAC component, which may mathematically code the syntax element and output bits of a CABAC encoded bit stream.

In general, a binary arithmetic coding operation divides a unit interval (from 0 to 1) into increasingly smaller portions of the interval (e.g., through repeated sub-dividing), each of which is represented by one of two symbols. For each division of the interval (or sub-interval) each of the symbols has an associated probability. For example, if the probability of coding symbol A is 0.6 and the probability of coding symbol B is 0.4, a first symbol for the encoded result of A may indicate a value between 0 and 0.6, while a first symbol for the encoded result of B may indicate a value between 0.6 and 1. The A portion of the unit interval may be further sub-divided according to the A and B probabilities. In this example, the A sub-portion of the A portion of the unit interval (which may indicate a value between 0 and 0.36) may have a probability of 0.6×0.6 (or 0.36), the B sub-portion of the A portion of the unit interval (which may indicate a value between 0.36 and 0.6) may have a probability of 0.6×0.4 (or 0.24), the A sub-portion of the B portion of the unit interval (which may indicate a value between 0.6 and 0.84) may have a probability of 0.4×0.6 (or 0.24), the B sub-portion of the B portion of the unit interval (which may indicate a value between 0.84 and 1.0) may have a probability of 0.4×0.4 (or 0.16), and so on. In some embodiments, the outputs of the binary arithmetic coding may be represented by a bit stream of 1's and 0's (e.g., with a bit value of 0 representing a symbol A, and a bit value of 1 representing a symbol B), and this bit stream is a compressed representation of the input syntax element.

In some embodiments, a context-adaptive binary arithmetic coding operation may be dependent on the context of the input. For example, when coding a coefficient of a particular macroblock (e.g., a coefficient representing a motion vector difference), the CABAC encode component may look at one or more coefficients of one or more neighbors (e.g., a macroblock above or to the left of the macroblock currently being coded), and the calculated probability of coding A or B may be dependent on the results of coding the coefficients of the neighbors. In other words, there may be one set of probabilities for A and B given certain coding results for the neighbors, and a different set of probabilities for A and B given different coding results for the neighbors. In some embodiments, by conditioning the context of the syntax elements being coded, the entropy limit may be reduced (e.g., the bit rate required to represent those syntax elements may be reduced), leading to better compression.

As described in more detail below, in some embodiments, the binary arithmetic coding engine may operate on binarized syntax elements (and bits thereof) in one of three bin coding modes. In the regular bin coding mode, the binary arithmetic coding engine may perform a context-adaptive binary arithmetic coding operation such as that described above. However, when the probability of a bin being coded with one of the two possible symbols is roughly one-half (e.g., when the probability of coding a symbol A and the probability of coding a symbol B is roughly equal), at least some of the computations of the regular bin coding mode of the CABAC encode component may be elided, and the bin may be coded in a bypass bin coding mode instead. In this case, performing the arithmetic coding computations described above may not be a good use of resources, since it will not lead to much compression (given the random nature of the syntax element). In some embodiments, the coding engine (or another component of the block processing pipeline) may be configured to make decisions about whether to code a given binarized syntax element (and bits thereof) in the bypass bin coding mode or in the regular bin coding mode based, at least in part, on a trade-off between computation effort and quality. For example, in one such embodiment a decision may be made to code a particular bin in the bypass bin coding mode if the difference or ratio between the delta improvement in throughput (due to a reduction in computation complexity) that would be gained by coding the bin in the bypass bin coding mode rather than in the regular bin coding mode (by any suitable measure of throughput) and the delta degradation in quality that would result from coding the bin in the bypass bin coding mode rather than in the regular bin coding mode (by any suitable measure of compression quality) is greater than a predetermined threshold value.

Note that in at least some embodiments, the context lookup table may be dynamic. In such embodiments, once the context for a binarized syntax element has been determined and the coding for the binarized syntax element has been performed, the probability stored in the context lookup table for that context may be updated based on the coding results. For example, if the initial probability associated with content 10 (e.g., the value that was stored in the context lookup table at a context index of 10) was 0.5, each time an element in that context is encoded, the probability may be updated in the context lookup table. In this example, each time the output of the encoding is a 1, the probability associated with context 10 may be increased (e.g., to 0.52, then 0.54, etc.). Conversely, each time the output of the encoding is a 0, the probability associated with context 10 may be decreased (e.g., to 0.48, then 0.46, etc.). In some embodiments, after some number of syntax elements with the same context have been encoded, the context lookup table may store a rough estimate of the actual probability for that context. Note that there may be a variety of approaches taken for initializing the probabilities for each context, in different embodiments. For example, the H.264 standard specifies three different initialization tables, any of which may be used to initialize the probabilities. These and other initialization approaches may attempt to optimize the initial probabilities based on observed behavior for different types of video encoding applications and/or video encoding workloads.

In some embodiments, the CABAC encode (CBE) engine may include (or utilize) the following functional blocks: a macroblock FIFO (which contains macroblock data generate and written by the CAVLC decode component), a syntax element process (SEP) block (which sequences through syntax elements defined by the H.264 standard, reading them from the macroblock FIFO, and generating syntax commands for various downstream blocks), a binary arithmetic coding (BAC) process block (which processes one syntax command a time, converts the syntax element value into a binary code, serializes the binary code into a single bin, codes the bin mathematically with its corresponding probability model, and outputs the bit stream), and a context model process block (which stores the intermediate state of the probability model in context memory, reads a probability for a particular context out to the bin coder, and updates the probability for the context in memory after the bin is coded).

In some embodiments, the CBE engine may receive a CAVLC encoded bit stream from an upstream macroblock FIFO and may generate CABAC syntax element commands. For example, in some embodiments, a syntax element process block of the CBE engine (or, e.g., a syntax element pipeline thereof) may be configured to process CABAC syntax elements, which are defined by the H.264 standard, and to generate syntax element (SE) command packets. In some embodiments, to generate the syntax element command packets, the CBE engine may be configured to generate binary code (SE code) for each syntax element and to generate context information for any binary codes whose coding functions are context-dependent. For example, in some embodiments, a binarization and neighbor process (BNP) block of the CBE engine (or, e.g., a coding pipeline thereof) may be configured to generate a binary code for each syntax element. In some embodiments, the binary codes whose bin coding functions are dependent on a context model may be referred to as regular bins.

In some embodiments, the CBE engine (or, e.g., a coding pipeline thereof) may be configured to process the SE command packets and perform a CABAC coding function (as defined by the H.264 standard), in several steps. For example, the coding pipeline may be configured to serialize the SE code into single binary symbol elements (bins) and the context indexes for the bins, and to output the corresponding bin command(s). In various embodiments, the CBE engine may also be configured to generate put bit information (including confirmed/resolved output bits and the number of outstanding bits) as outputs of the of arithmetic coder, expand the outstanding bits, byte align the coded bits, aggregate the byte data, and/or provide a merge path for uncompressed coefficients, where needed.

As described in more detail herein, a block processing pipeline (e.g., a video encoding pipeline) may be configured to support encoding operations in accordance with the H.264 standard, the H.265 standard, or both, in different embodiments. Note that the H.265 standard does not include a CAVLC mode (i.e., a mode in which blocks of pixels are encoded using CAVLC encoding), but supports only CABAC encoding. Therefore, the transcode component of a pipeline configured in accordance with H.265 standard may include different elements than one configured in accordance with the H.264 standard and/or may implement different functionally than one configured in accordance with the H.264 standard.

For example, in the H.265 standard, a syntax element binarization stage of the transcoder may be configured to generate a bin stream along with SEI markers that contain header data and to write the resulting stream to DRAM via DMA. As described in more detail below, the transcoder may be configured to read from DRAM via DMA the bin stream that was encoded, after which it may write header data directly to the output stream and may encode the bins to be appended after the headers using Binary Arithmetic Encoding (BAC).

Figure 17B:
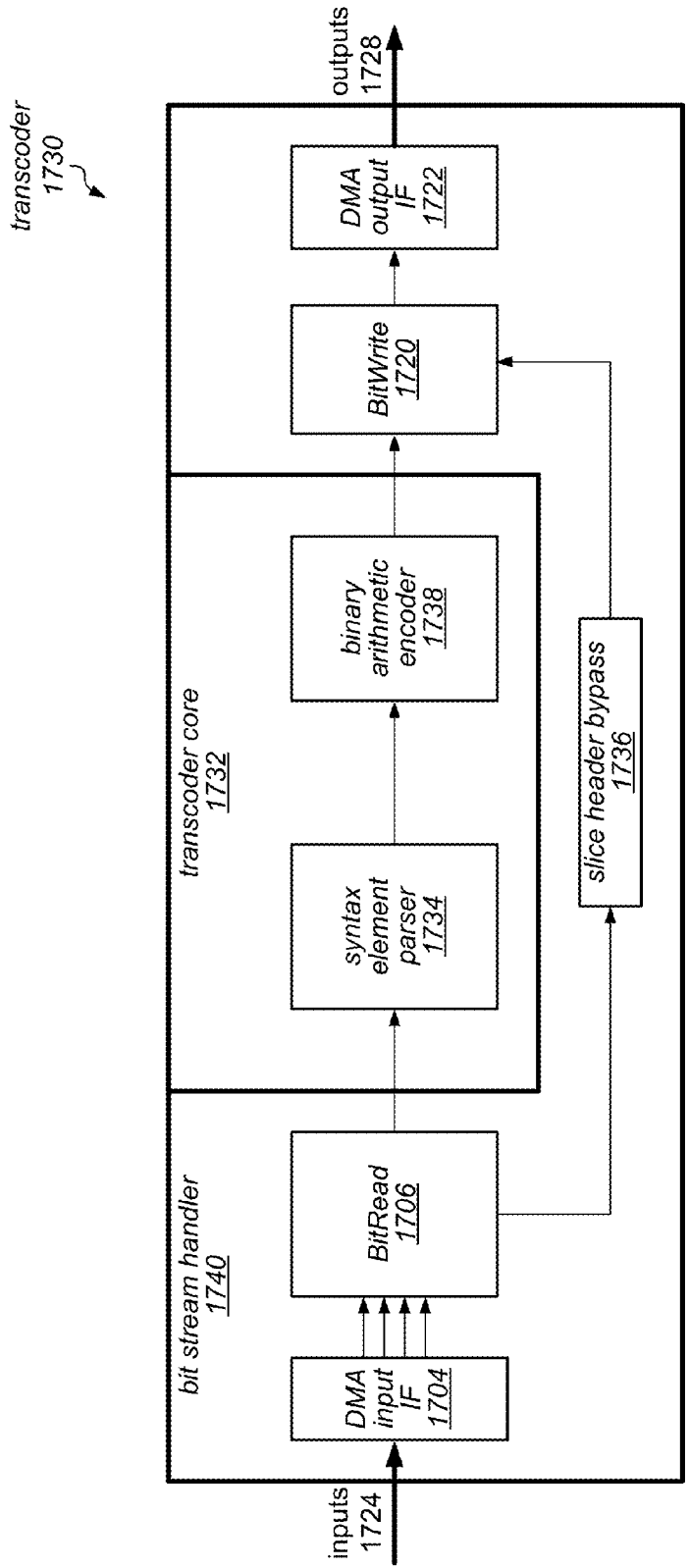

One embodiment of a transcode component of a block processing pipeline that performs a CABAC coding function (as defined by the H.265 standard) is illustrated by the block diagram in FIG. 17B. Note that some of the components of the transcode component (transcoder 1730) may be similar in structure and/or in functionality to those of transcoder 1700 illustrated in FIG. 17A. For example, bit stream handler 1740 and its sub-components (which may include a DMA input interface 1704, a bit reader component 1706, a bit writer component 1720, and a DMA output interface 1722) may be substantially similar to the corresponding components and sub-components illustrated in FIG. 17A and described above. In addition, bit stream handler 1740 may also include a slice header bypass element 1736, which may be similar to bypass queue 1726 illustrated in FIG. 17A.

As illustrated in this example, transcoder core 1732 of transcoder 1730 may include different elements and/or functionality than transcoder core 1712 of transcoder 1700 illustrated in FIG. 17A. For example, transcoder core 1732 of transcoder 1730 may include a syntax element parser component 1734 and a binary arithmetic encoder (BAC) component 1738, both of which are described in more detail below.

In some embodiments, the syntax element parser component 1734 receives the raw bin stream from the bit reader component 1706 (e.g., with the SEI markers and headers removed) and determines the bins that belong to a single syntax element, so that they can be passed to the binary arithmetic encoder (BAC) component 1738 to be encoded. The syntax elements may be organized according to the format defined in the H.265 recommendation, with a few exceptions (e.g., the additional of an extra syntax element to convey the scan index for a residual block). In various embodiments, the syntax elements may be binarized using one of the following methods:
Fixed Length Code
Truncated Rice Code
Exponential Golomb-k Code
Look-up Table For each of the above binarization methods, only the length of the code may need to be determined for the binarization method. After determining the length, the determined number of bins may be read from the bin stream and may be associated with the corresponding syntax element to be encoded by the BAC component 1738. In some cases, the syntax element may need to be reconstructed, as it is used in the parsing process defined in the H.265 recommendation.

In some embodiments, the binary arithmetic encoder (BAC) component 1738 may be configured to encode the bins that the SEP generates and to write the output to the bit stream. The BAC may encode two of the following in parallel:
up to four bypass bins
a regular bin In other words, the BAC component 1738 may encode up to four bypass bins at once or up to two regular bins at once, depending upon the ordering of the bins.

In embodiments of a block processing pipeline that implement the H.264 standard, the entropy encoding stage performs lossless compression. As described above, the H.264 standard may support two encoding modes: CAVLC (which may be thought of as being similar to Huffman coding) and CABAC (context-adaptive arithmetic coding).

As described above, the primary function of a motion estimation engine may be to find the best partition of a macroblock such that the motion vectors that are chosen for the partition will provide the best trade-off of rate and distortion for a given quantization parameter (where the rate is the number of bits required to encode the syntax element bins for the motion vector difference, in this case). In order to determine the best motion vector in addition to the best partition, the motion estimation engine may apply a cost function to each candidate (e.g., one that includes a term that measures the rate cost for encoding the motion vector) and may select the candidate for which the cost function is minimized.

In a block processing pipeline that operates in H.264 mode, a rate cost determined by the CAVLC component may provide an estimate that can be used within the motion estimation stage and/or in other pipeline stages, which may result in a loss of a few percent in rate. In some cases, this approach may result in the selection of a mode that is not the best available mode, which may lead to some degradation. In the case of CABAC encoding, it may be more difficult to measure the rate. This is because the actual encoding is dependent upon previous encodings, and it may be cost prohibitive to maintain an entire CABAC encoder within the motion estimation engine for this purpose. Note that the H.265 standard does not include a CAVLC encoding mode, but only includes a CABAC encoding mode. For both of these reasons, it may be beneficial to generate a good estimate for the rate for use in earlier pipeline stages (such as in the motion estimation stage). In some embodiments, the block processing pipelines described herein may provide a low complexity method for estimating rates by maintaining CABAC statistics that can be analyzed by one or more early pipeline stages (e.g., by the motion estimation engine) to generate the estimated rates.

In various embodiments, the front end of a block processing pipeline (e.g., one that operates in H.264 mode) may be where various encoding decisions are made. For example, within various stages that precede the transcoder stage, there may be decisions being made about the best motion vector to use for motion estimation, the best intra mode to use for intra estimation, etc. The mode decision stage may then compare the costs from the best motion vector and intra mode and decide whether to do perform motion estimation using the best motion vector or to perform intra estimation using the best intra mode.

In motion estimation, searches are made in a search window within previous reference frames. The cost function that is typically formed within a motion estimation engine for a given mode may include a linear combination of a distortion metric between the source frame and the reference frame (e.g., a sum of absolute differences, SAD, or a sum of absolute transform differences, SATD) and the rate cost of encoding the macroblock, which will include the rate cost of the motion vector difference (e.g., the mvd rate), where the motion vector difference is equal to the difference between the motion vector being evaluating and the motion vector predictor. For example, in some embodiments, the cost function to be optimized in order to find the optimal motion vector may be as follows:

cost=SATD+λ(mvd rate)

Note that in this example, lambda represents a motion regulation parameter that is used to convert the units of rate into units of distortion. For CAVLC encoding, an estimate of the rate (i.e., the number of bits that will be needed to encode the motion vector difference, in this case) may be determined relatively easily. For example, in CAVLC encoding, there is a table of variable length codes. For a given motion vector difference, the table may be consulted to find the corresponding variable length code to use (and, thus, the exact cost of the rate for sending that motion vector difference).

For CABAC encoding, it may be more complicated to determine the mvd rate, and may require the use of the arithmetic coding engine of the CABAC encoder itself. This is because the arithmetic coding engine maintains state across macroblocks that is used in the encoding. In other words, the rate is not simply dependent on the mvd, but may also be dependent on the current state, as maintained in the arithmetic coding engine. Since the arithmetic coding is not performed until the late stages of the block processing pipeline (and because it uses information not available earlier), the earlier stages of the pipeline will not (and cannot) know the actual rate.

A described in detail above, for CABAC encoding, an adaptive encoder is used to encode binary symbols for each syntax element and the state of the encoder is adapted to the statistics of the syntax element (or a bin thereof). One way of thinking about the encoding is as if a unit interval (i.e., an interval from 0 to 1) is divided between the two possible symbols, according to their probabilities. For example, if symbol A has a probability of p (which corresponds to a percentage of the unit interval allocated to symbol A), then symbol B has a probability of 1−p (and corresponds to the rest of the unit interval, which is allocated to symbol B). In this example, when the first symbol for a syntax element bin is coded, the portion of the unit interval allocated to that symbol is further subdivided according to the probabilities p and 1−p. The next symbol that is coded for the syntax element bin will indicate which of these sub-intervals should be further subdivided (i.e., the portion allocated to symbol A or the portion allocated to symbol B), and so on. The output of the encoder is a bit stream that includes a sequence of bits representing the symbols used in encoding the syntax element (or bin), which may specify the exact location within the unit interval at which that sequence would occur.

Typically, the number of bits that would need to be sent (output) in order to specify the location within the interval corresponding to the encoded syntax element (or bin) may be equal to:

−log$_2$(interval length)

Here, the interval length may be represented by the multiplication of the probabilities for the symbols in the sequence. For example, for a sequence of symbols BBAB, the location may be equal to:

−log$_2$((1−p)(1−p)p(1−p))

Here, since this is the multiplication of these probabilities, it may be specified as:

−log$_2$(1−p)−log$_2$(1−p)−log$_2$(p)−log$_2$(1−p)

Note that as the sequence gets longer, the coding length (e.g., the average or expected encoding length, shown below as E[length]) may approach the entropy (H, which is the fundamental limit of compression), as follow:

$$E[\text{length}] = \sum_{i=0}^{1} p_i \log p_i = H$$

As previously noted, in a block processing pipeline (e.g., one that processes blocks of pixels in accordance with the H.264 standard and/or the H.265 standard), many different syntax elements may be coded in the entropy encoding stage (including, e.g., transform coefficients, motion vector difference, header bits, etc.) by the binary arithmetic coding engine. In some embodiments of the block processing pipelines described herein, rather than duplicating the binary arithmetic coding engine in earlier pipeline stages in order to compute the rates for encoding these syntax elements (or bins thereof), the rate may be estimated based on CABAC statistics that were accumulated by the binary arithmetic coding engine in the entropy encoding stage for previous macroblocks (e.g., one or more macroblocks in the same video frame or slice thereof). These rate estimates may, in turn, be used in various cost functions applied in earlier pipeline stages, in order to select the best encoding modes and/or motion vectors to be used in encoding the syntax elements (or bins thereof) for a particular macroblock, for example.

Figure 18:
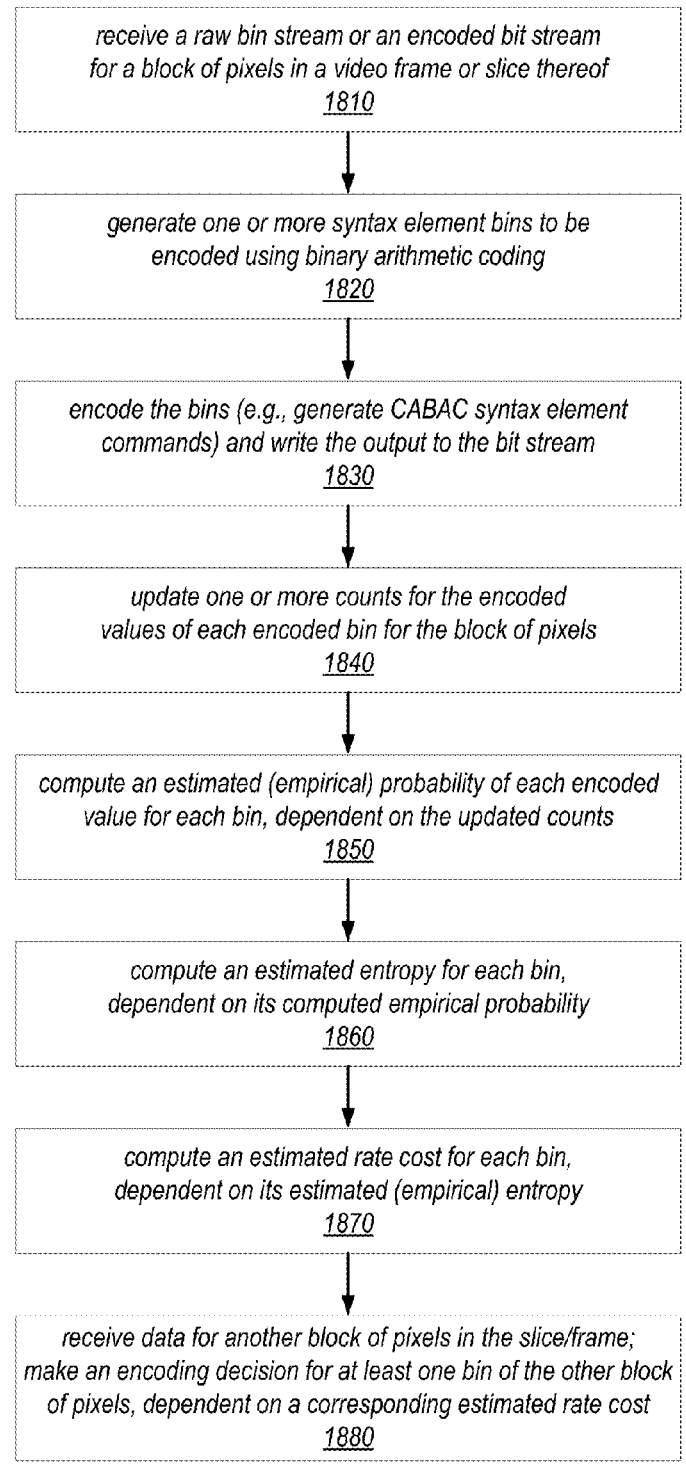
FIG. 18 is a flow diagram illustrating one embodiment of a method for estimating rate costs for encoding syntax element bins using CABAC statistics collected during processing of an earlier block of pixels.

One embodiment of a method for estimating rate costs for encoding syntax element bins using CABAC statistics collected during processing of an earlier block of pixels is illustrated by the flow diagram in FIG. 18. As illustrated at 1810, in this example, the method may include receiving a raw bin stream or an encoded bit stream for a block of pixels in a video frame or slice thereof. For example, a transcoder core such as transcoder core 1712 of FIG. 17A or transcoder core 1740 of FIG. 17B may receive (e.g., from a bit reader component such as bit reader component 1706) a CAVLC encoded bit stream or a raw bit stream, respectively. The method may also include generating syntax element bins to be encoded using binary arithmetic coding, as in 1820. For example, in embodiments in which the block processing pipeline implements a transcoder that performs a process in accordance with the H.264 standard, the transcoder core may receive a CAVLC encoded bit stream and may (in a CAVLC decode component 1714 and/or macroblock data FIFO component 1716) generate syntax element bins to be encoded using binary arithmetic coding. In embodiments in which the block processing pipeline implements a transcoder that performs a process in accordance with the H.265 standard, the transcoder core may receive a raw bit stream from the bit reader component and may (e.g., in a syntax element parser component such as 1734 in FIG. 17B) generate syntax element bins to be encoded using binary arithmetic coding.

As illustrated in this example, the method may include encoding the bins (e.g., generating CABAC syntax element commands) and writing the output to the bit stream, as in 1830. For example, the encoding may be performed by a binary arithmetic encoder (such as CABAC encoder 1718 of transcoder 1700 in FIG. 17A or BAC component 1738 of transcoder 1730 in FIG. 17B). The method may also include updating one or more counts that reflect the encoded values of each encoded bin for the block of pixels, as in 1840. For example, as the data representing each block of pixels in the slice or frame is processed, hardware in the CABAC or BAC component of the transcoder may be configured to accumulate (for each bin) a respective count of the number of times each of two possible symbols is used in the encoding of the bin, or may be configured to accumulate a count of the number of times one of the two possible symbols is used in the encoding of the bin and a count of the total number of bits resulting from the encoding of the syntax element, in different embodiments. These count values may be accumulated in a data structure maintained locally (e.g., in memory within the CABAC or BAC) and/or in a data structure maintained in shared memory (e.g., one that is accessible by components in other stages of the pipeline), in different embodiments.

As illustrated in FIG. 18, the method may include computing an estimated probability (e.g., an empirical probability) of each the possible encoded symbol values for each bin, dependent on the updated counts (as in 1850). In some embodiments, computing the empirical probabilities may include updating previously stored empirical probabilities (e.g., refining them based on the additional data accumulated when encoding the current block of pixels). In some embodiments, the method may also include storing the updated probability locally (e.g., within the component of the pipeline that computed the estimated probability) and/or in shared memory (e.g., in a data structure that is separate from a data structure that stores the accumulated count values). The method may also include computing an estimated entropy for each bin, dependent on its computed empirical probability, as in 1860. In some embodiments, the method may also include storing the estimated entropy locally (e.g., within the component of the pipeline that computed the estimated entropy) and/or in shared memory (e.g., in a data structure that is separate from data structures that store accumulated count values and/or probabilities.

As illustrated in this example, the method may include computing an estimated rate cost for each bin (e.g., an estimated rate cost for encoding the bin) dependent on its estimated entropy, as in 1870. In some embodiments, the method may also include storing the estimated rate cost locally (e.g., within the component of the pipeline that computed the estimated rate cost) and/or in shared memory (e.g., in a data structure that is separate from data structures that store accumulated count values, probabilities, and/or estimated entropies). Note that, in various embodiments, the accumulated count values, probabilities, estimated entropies and/or estimated rate costs may be stored locally and/or in the shared memory as they are collected or computed (e.g., by one or more hardware or software pipeline components at various pipeline stages) or at any other time, and then may be retrieved from memory (e.g., by one or more software pipeline components at various pipeline stages) for use in performing other operations in the block processing pipeline. As illustrated in FIG. 18, the method may include receiving data for another block of pixels in the slice/frame, and making an encoding decision for at least one bin of the other block of pixels, dependent on a corresponding estimated rate cost (e.g., a rate cost that was computed based on the encoding of the previous block of pixels), as in 1880. Several examples of such encoding decisions are described below.

Figure 19:
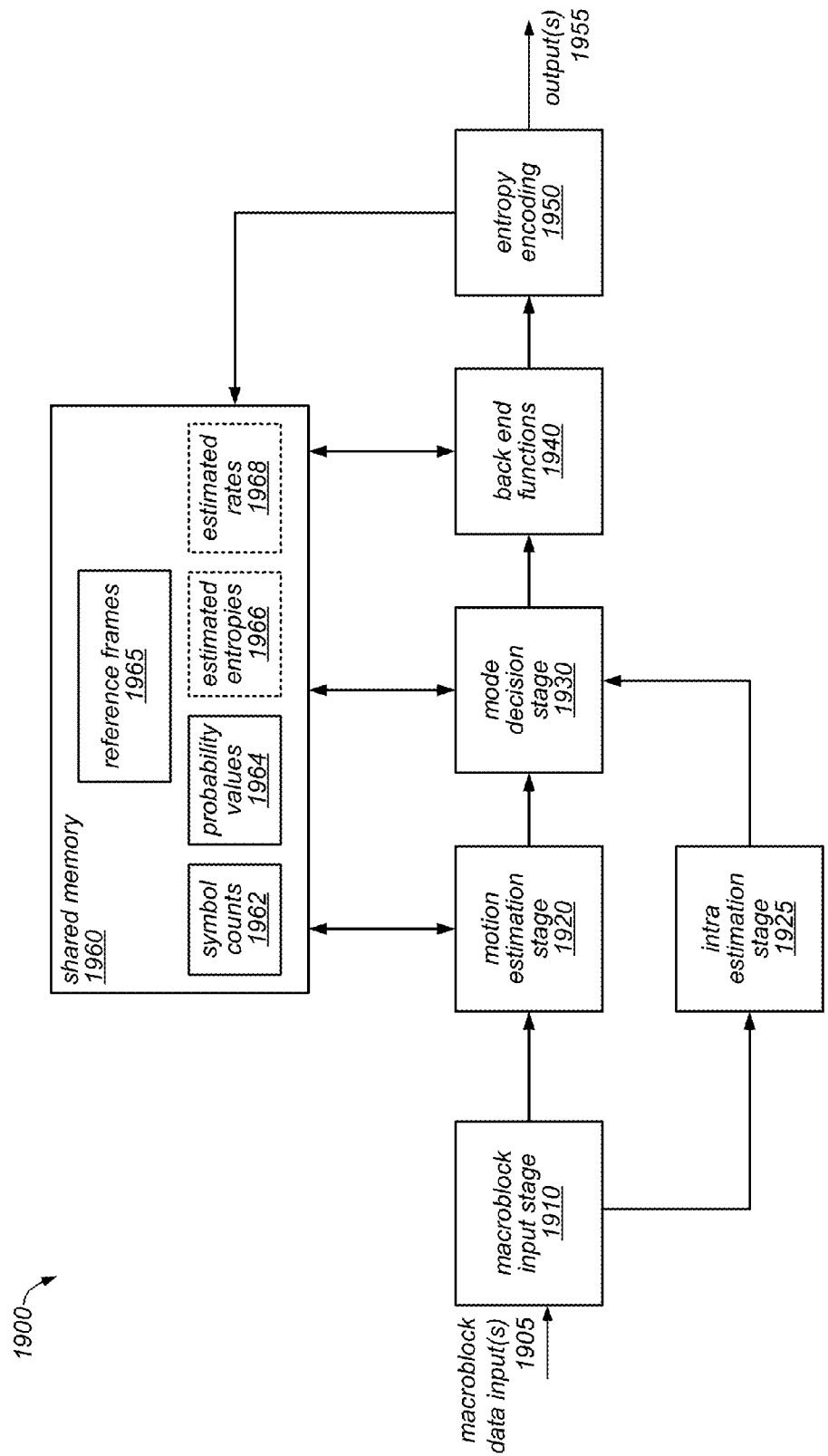
FIG. 19 is a block diagram illustrating a portion of a block processing pipeline that is configured to compute estimated rate costs using statistics previously collected by an entropy encoding component, according to one embodiment.

As described above, a block processing pipeline may include, at each of various stages, hardware pipeline components and/or software pipeline components that may pass information to each other directly or through data structures in a shared memory. FIG. 19 is a block diagram illustrating a portion of one such block processing pipeline (e.g., a video encoding pipeline) that is configured to compute estimated rate costs using statistics previously collected by an entropy encoding component, according to one embodiment. In this example, pipeline 1900 may process blocks of pixels in accordance with the H.264 standard and/or in accordance with the H.265 standard. Pipeline 1900 includes a macroblock input stage 1910, which is configured to receive macroblock data input(s) 1905 representing blocks of pixels (e.g., from video frames or slices thereof) that are to be processed in pipeline 1900.

In this example, pipeline 1900 includes a motion estimation stage 1902 (which may be configured to perform inter estimation, as described above), a mode decision stage 1930 (as described above), and a back end functions stage 1940 (which may implement filtering and/or reconstruction operations). Pipeline 1900 includes, in parallel with motion estimation stage 1920, an intra estimation stage, which may be configured to perform intra estimation, as described herein. As illustrated in FIG. 19, pipeline 1900 also includes an entropy encoding stage 1950, which may encode binarized syntax elements representing the input macroblock using binary arithmetic coding and generate outputs 1955 (e.g., an output bit stream).

In this example, block processing pipeline 1900 includes a memory 1960 that is shared by (and accessible by) all of the other elements of the pipeline, and which may be configured to store data usable in estimating rate costs in video encoding operations using entropy encoding statistics in one or more data structures. For example, in various embodiments, shared memory 1960 may be configured to store one or more of: entropy encoding statistics (shown as symbol counts 1962), empirical probability values 1964, estimated entropy values 1966, and/or estimated rates 1968. In some embodiments, shared memory 1960 may also store motion estimation reference frames 1965, while in other embodiments motion estimation reference frames may be stored in a different memory (e.g., a memory that is local to motion estimation stage 1920).

In various embodiments, the data stored as symbol counts 1962 and/or probability values 1964 may be collected and/or computed by hardware and/or software components of entropy encoding stage 1950. In some embodiments, this data may be written to shared memory 1960 (e.g., once per macroblock) to update the values maintained in the memory as additional macroblock data inputs are processed in the pipeline, and it may be retrieved by software components in other pipeline stages. In other embodiments, this data may be passed to another component (e.g., a component in another one of the pipeline stages) through a hardware data FIFO. Similarly, one or more of the computations of empirical probability values, estimated entropy values, and/or estimated rates (or rate costs) may be performed by a software pipeline component in any of the pipeline stages, and the results may be passed to another component (e.g., a component in another one of the pipeline stages) through a hardware data FIFO or stored in the shared memory for subsequent retrieval. As illustrated by the dashed outline lines in FIG. 19, in other embodiments, some of the data illustrated as being stored in shared memory 1960 (e.g., estimated entropies 1966 and/or estimated rates 1968) may not be maintained in a shared memory, but may be computed by one of the pipeline stages on as as-needed basis, dependent on data retrieved from symbol counts 1962 and/or probability values 1964. Note that, as described in detail below, in some embodiments, any or all of the values stored as symbol counts 1962, empirical probability values 1964, estimated entropy values 1966, and/or estimated rates 1968 may be reset to initial or default values at particular points in the processing of a video stream (e.g., between video frames and/or slices thereof).

In general, the computations and calculations described herein for estimating rate costs in video encoding operations using entropy encoding statistics may be divided up so that different portions of the work are performed by components in different stages (e.g., components that have sufficient computational capacity for performing computations within the time constraints of those stages). In general, the use of both a software pipeline and a hardware pipeline in block processing pipeline 1900 may provide flexibility in how entropy encoding statistics and/or other data may be collected, computed and used in the block processing pipeline to estimate various rates and/or costs (e.g., rates and/or costs associated with the selection of a particular prediction mode, encoding mode, or motion vector).

As noted above, in some embodiments, a hardware pipeline component of an entropy encoding stage (e.g., a BAC or CABAC component) may be configured to accumulate a count of the number of times that each of two possible symbols is used in encoding a syntax element bin of a given macroblock (or multiple macroblock in a video frame or slice thereof) and/or a count of the total number of bits used in encoding the syntax element bin. Subsequently, a software pipeline component may access the count values and compute empirical probability data for each bin. In some embodiments, a processor may read the number of times that the symbol A has been used and the number of times that the symbol B has been used, so far. The processor may then estimate the probability of encoding another A as:

$$p_A = \frac{countA}{countA + countB}$$

and may estimate the probability of encoding another B as:

$$p_B = \frac{countB}{countA + countB}$$

or as:

$p_B = 1 - p_A$

For example, if the number of times that the symbol A has been observed in the encoding of a syntax element bin (countA) is 20, and the number of times that the symbol B has been observed in the encoding of the syntax element bin (countB) is 400, the processor may estimate the probability of encoding another A as 20/420 (or about 4.8%), and may estimate the probability of encoding another B as 400/420 (or about 95.2%).

In some embodiments, a processor having access to these estimated (empirical) probability values may compute an estimate entropy value H from these probability values as follows:

$H = -p_A \log p_A - p_B \log p_B$ where $0 \le H \le 1$

In some embodiments, this current estimate of the entropy H (where the entropy indicates how far the syntax element bin can be compressed) may be used as an estimate of the current number of bits that are being spent to encode the given bin. Note that, as the sequence gets longer, the CABAC encoder approaches this ideal compression rate (entropy). In some embodiments, a processor that computes an estimated entropy based on accumulated symbol counts and empirical probabilities, as described above, may multiply the computed value for the entropy by a factor alpha (where alpha is an empirical inefficiency factor of entropy that can be adjusted as needed), and the result may be used as the rate estimate for that bin. In other words, an estimated entropy value that is computed as follows:

rate estimate for bin=$\alpha H$

This rate estimate may, in some embodiments, serve as a reasonable estimate of the number of bits that are actually being spent for the given syntax element (e.g., without having to replicate an entropy encoder in any earlier pipeline stages). For example, in some embodiments, a processor in a motion estimation stage may use a rate estimate computed in this manner as the actual rate for encoding the corresponding syntax element during that earlier stage in the pipeline (e.g., in a computation of the cost of making a particular motion vector selection) without having to implement a CABAC encoder in that stage.

Figure 20:
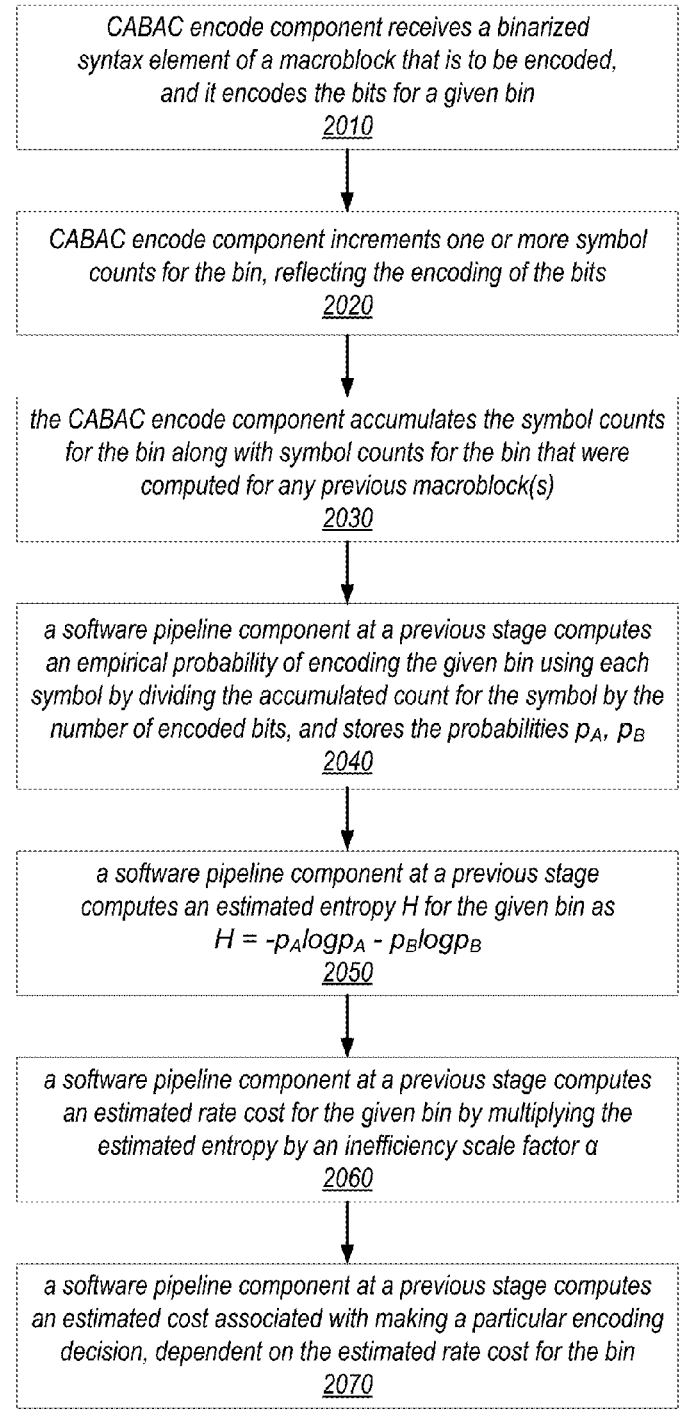
FIG. 20 is a flow diagram illustrating one embodiment of a method for computing an estimated rate cost for encoding a syntax element bin using previously collected CABAC statistics.

In some embodiments, the estimated entropy H, as computed above, may provide an average rate estimate for a given syntax element. In some embodiments, it may be useful to use an instantaneous rate estimate for various bins. This rate estimate may be computed as follows:

instantaneous rate estimate for symbol $A = -\log p_A$ instantaneous rate estimate for symbol $B = -\log p_B$ In some embodiments, these estimates may be useful in assessing the cost of a symbol stream when deciding between one of several modes to use for encoding a given macroblock, where each mode may correspond to a different symbol stream to be output, as in the following example:
  bit stream in mode0: A B B B A
  bit stream in mode1: B B B
In this example, an estimate for the cost of each mode may be computed as follows:

cost estimate for mode0=$-\log p_A^2 - \log p_B^3$ cost estimate for mode1=$-\log p_B^3$ One embodiment of a method for computing an estimated rate cost for encoding a syntax element bin using previously collected CABAC statistics is illustrated by the flow diagram in FIG. 20. As illustrated at 2010, in this example, the method may include a CABAC encode component receiving a binarized syntax element of a macroblock that is to be encoded, and the CABAC encode component encoding the bits for a given bin. For example, this encoding operation may be performed by a hardware pipeline component or a software pipeline component at an entropy encoding stage of the block processing pipeline (e.g., a CABAC stage), in different embodiments. The method may include the CABAC encode component (e.g., a hardware or software component at the entropy encoding stage) incrementing one or more symbol counts for the bin, reflecting the encoding of the bits, as in 2020. For example, the CABAC encode component may increment a local count for symbol A or symbol B and/or a local count for the total number of bits. The method may also include the CABAC encode component e.g., a hardware or software component at the entropy encoding stage) accumulating the symbol counts for the bin along with symbol counts for the bin that were computed for any previous macroblock(s), as in 2030. In some embodiments, the CABAC encode component may pass (or write) these accumulated values to a shared data structure in a shared memory.

As illustrated in this example, the method may include a software pipeline component at a previous pipeline stage computing an empirical probability of encoding the given bin using each of the two possible symbols by dividing the accumulated count for the symbol by the total number of encoded bits for the bin, and storing the probabilities as $p_A$, and $p_B$, as in 2040. For example, the empirical probabilities may be computed by a processor in the entropy encoding stage or in any previous stage that needs the estimated rate or that has the capacity to compute it (or to compute at least the empirical probability values). As illustrated at 2050, the method may also include a software pipeline component at a previous pipeline stage (e.g., the pipeline stage at which the empirical probabilities were computed or another pipeline stage) computing an estimated entropy H for the given bin as: $H=-p_A \log p_A - p_B \log p_B$. For example, the estimated entropy may be computed by a processor in the entropy encoding stage or in any previous stage that needs the estimated rate or that has the capacity to compute it (or to compute at least the empirical probability values and/or the estimated entropy).

As illustrated at 2060, in this example, the method may include a software pipeline component at a previous pipeline stage (e.g., the pipeline stage at which the empirical probabilities and/or estimated entropies were computed or another pipeline stage) computing an estimated rate cost for the given bin by multiplying the estimated entropy by an inefficiency scale factor $\alpha$. For example, the estimated rate may be computed by a processor in the entropy encoding stage or in any previous stage that needs the estimated rate or that has the capacity to compute it. The method may also include a software pipeline component at a previous pipeline stage (e.g., the pipeline stage at which the empirical probabilities, estimated entropies, and/or estimated rate costs were computed or another pipeline stage) computing an estimated cost associated with making a particular encoding decision, dependent on the estimated rate cost for the bin, as in 2070. For example, a processor in the pipeline stage may compute a cost associated with selection of a prediction mode, an encoding mode, or a motion vector, dependent on the estimated rate cost for the bin.

Example data structures that may, in some embodiments, be used to store data for use in estimating rate costs in video encoding operations using entropy encoding statistics are illustrated in FIGS. 21A and 21B. For example, FIG. 21A illustrates an example data structure 2100 (e.g., a lookup table) that is configured to store, for each supported context (and/or bin thereof), a respective count value indicating the number of times that the bin was encoded using each of two possible symbols (represented as symbols A and B). Note that each of these lookup tables may store symbol counts or probability values for a respective bin in each of the entries of the table, and these entries may be accessed using index/address values [0:n], where the number of entries is n+1.

In the example illustrated in FIG. 21A, each entry in data structure 2100 may correspond to a particular bin and may include two elements: a count value indicating the number of times that the bin was encoded using symbol A, and a count value indicating the number of times that the bin was encoded using symbol B. More specifically, the count value indicating the number of times that bin 0 (e.g., a bin corresponding to a supported context and having an index/address value of 0) was encoded using symbol A is illustrated as element 2101, the count value indicating the number of times that bin 0 was encoded using symbol B is illustrated as element 2102, the count value indicating the number of times that bin 10 was encoded using symbol A is illustrated as element 2103, and the count value indicating the number of times that bin 10 was encoded using symbol B is illustrated as element 2104. In this example, the count value indicating the number of times that the last bin (e.g., a bin corresponding to a supported context and having the highest index/address value of the supported contexts/bins) was encoded using symbol A is illustrated as element 2105 and the count value indicating the number of times that the last bin was encoded using symbol B is illustrated as element 2106.

Note that other embodiments, each entry of a data structure similar to that shown in FIG. 21A may store a total count of the number of times a respective bin has been encoded and a count of the number of times the bin was encoded using a particular one of the two possible binary symbols (e.g., symbol A), rather than storing count values indicating the number of times that each of the binary symbols was used in the encoding. In such embodiments, a count of the number of times the bin was encoded using the other one of the two possible binary symbols (e.g., symbol B) may be computed by subtracting the count of the number of times the bin was encoded using symbol A from the total count.

FIG. 21B illustrates an example data structure 2150 (e.g., a lookup table) that is configured to store, for each supported context (and/or bin thereof), a respective probability value indicating an empirical probability that the bin will be encoded using each of two possible symbols (represented as symbols A and B). In this example, each entry in data structure 2150 may correspond to a particular bin and may include two elements: a value indicating the probability that the bin will be encoded using symbol A, and a value indicating the probability that the bin will be encoded using symbol B. More specifically, the value indicating the probability that bin 0 (e.g., a bin corresponding to a supported context and having an index/address value of 0) will be encoded using symbol A is illustrated as element 2151, the value indicating the probability that bin 0 will be encoded using symbol B is illustrated as element 2152, the value indicating the probability that bin 10 will be encoded using symbol A is illustrated as element 2153, and the value indicating the probability that bin 10 will be encoded using symbol B is illustrated as element 2154. In this example, the value indicating the probability that the last bin (e.g., a bin corresponding to a supported context and having the highest index/address value of the supported contexts/bins) will be encoded using symbol A is illustrated as element 2155 and the value indicating the probability that the last bin will be encoded using symbol B is illustrated as element 2156.

Note that other embodiments, each entry of a data structure similar to that shown in FIG. 21B may store a value indicating an empirical probability that the bin will be encoded using one of the two possible binary symbols (e.g., symbol A), rather than storing values indicating an empirical probability that the bin will be encoded using each of two possible symbols. For example, in an embodiment in which each entry in a data structure similar to that shown in FIG. 21A stores a total count of the number of times a respective bin has been encoded and a count of the number of times the bin was encoded using a particular one of the two possible binary symbols (e.g., symbol A), the empirical probability that the bin will be encoded using symbol A may be computed by dividing the second element of the corresponding entry (i.e., the total count) by the first element of the entry (i.e., the count of the number of times the bin was encoded using symbol A). In such embodiments, a value indicating an empirical probability that the bin will be encoded using the other one of the two possible binary symbols (e.g., symbol B) may be computed by subtracting the value indicating the empirical probability that the bin will be encoded using symbol A from a value of 1.

Note that, in some embodiments, a block processing pipeline may maintain estimated entropy values and/or estimated rate costs for each syntax element bin in additional data structures in local memory (e.g., in memory within a particular pipeline stage that generated and/or will use the information) and/or in a shared memory. In other embodiments, this information may be computed on an as-needed basis from symbol counts and/or empirical probabilities that are stored in data structures (such as those illustrated in FIGS. 21A and 21B) in memory, and may not be stored in the shared memory at all. In general, any number of data structures having any of a variety of configurations may be used to store any or all of the information described herein for use in estimating rate costs in video encoding operations using entropy encoding statistics, in different embodiments.

Note that, in some embodiments, there may be on the order of 600-1000 bins supported in the CABAC engine for a video encoding pipeline that implements the H.264 standard, and on the order of 150-200 bins supported in the CABAC engine for a video encoding pipeline that implements the H.265 standard. Note also that various syntax elements may be represented by multiple bins, and the block processing pipeline may be configured to maintain some state (e.g., accumulated symbol counts and/or empirical probability values) for each one. For example, a syntax element bin for a motion vector difference may be divided into seven or ten bins. As blocks of pixels are processed, the accumulated symbol counts for each bin will change. Therefore, the empirical probabilities will also change (e.g., they will continuously adapt based on the encodings performed by the CABAC engine).

In some embodiments of the block processing pipelines described herein, the CABAC engine may be configured to be reset at particular points during the processing of a video stream. In embodiments in which each video frame is divided into macroblocks (as the fundamental unit for performing block processing), the CABAC engine may be reset after processing a pre-determined number of macroblocks. For example, in embodiments in which the fundamental unit for network transmission is a slice (which includes multiple macroblocks), the CABAC engine may be reset on slice boundaries. In some embodiments, the block processing pipeline may support mid-frame context switches in the pipeline, which may also correspond slice boundaries, and may be configured to reset the CABAC engine and/or state maintained therein following these mid-frame context switches. Note that a slice may include multiple rows of macroblocks (e.g., two rows) or may include an entire frame, but cannot be larger than a frame. In some embodiments, when the CABAC engine is reset, the state maintained for each syntax element bin may also be reset. For example, in some such embodiments, at beginning of each slice, the CABAC engine may be reset and any accumulated symbol counts, empirical probabilities values, and/or other stored information used in estimating rate costs in video encoding operations using entropy encoding statistics may also be reset (e.g., to pre-determined initial, default, or null values). In some embodiments, the initial or default values for the empirical probabilities may represent an equal probability for each of the two possible symbol values (e.g., a 50% probability for each), and these initial estimates may be refined using empirical data as blocks of pixels are processed in the pipeline.

Figure 22:
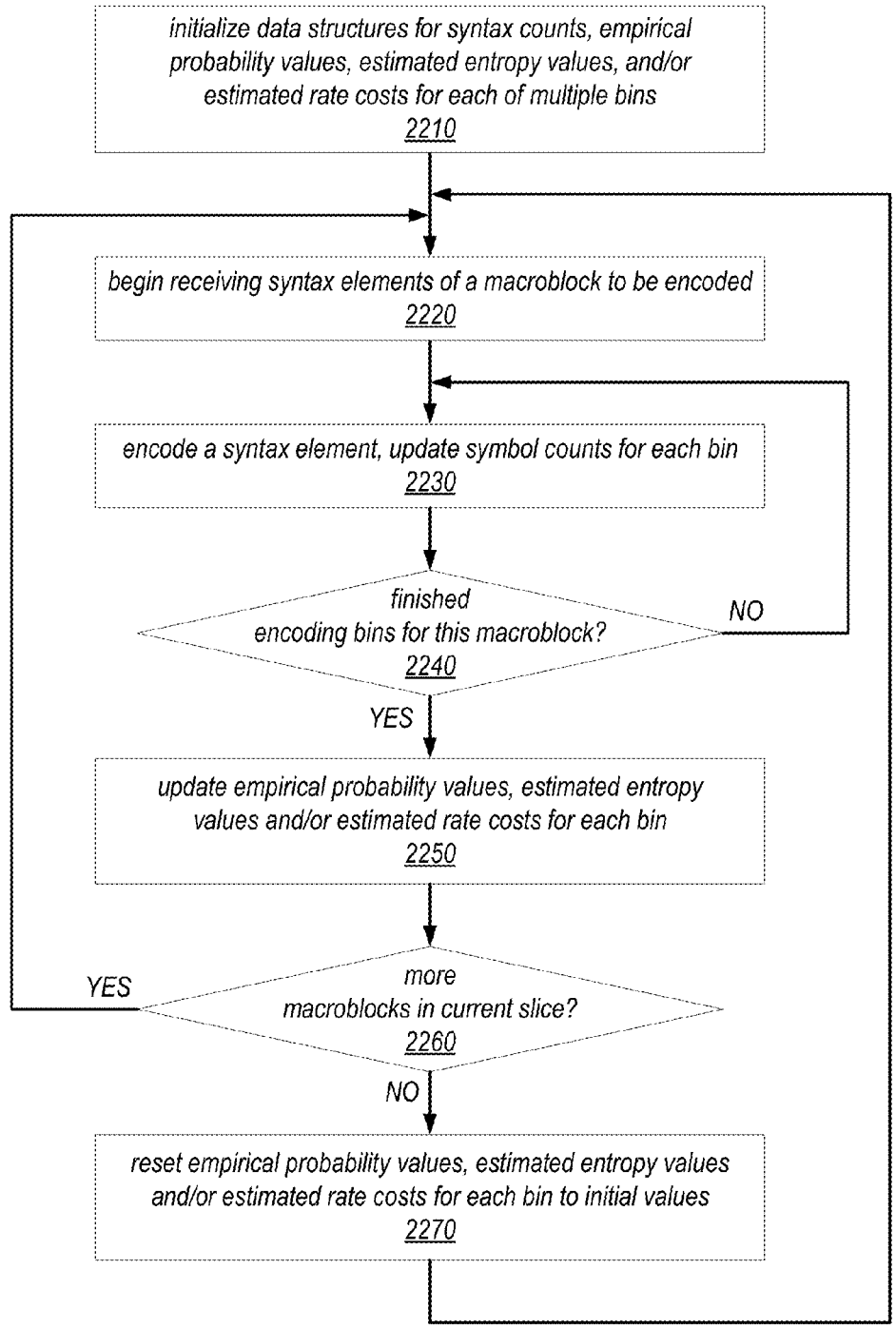
FIG. 22 is a flow diagram illustrating one embodiment of a method for performing rate cost estimation operations during the processing of multiple block of pixels in a video frame or in a slice of a video frame.

One embodiment of a method for performing rate cost estimation operations during the processing of multiple block of pixels in a video frame or in a slice of a video frame is illustrated by the flow diagram in FIG. 22. As illustrated at 2210, in this example, the method may include initializing one or more data structures that are configured to store syntax counts, empirical probability values, estimated entropy values, and/or estimated rate costs for each of multiple syntax element bins (e.g., using pre-determined default values or null values). The method may include beginning to receive syntax elements of a macroblock to be encoded (as in 2220), then encoding one of the syntax elements, and updating the corresponding symbol counts for each bin (as in 2230). Until all of the bins have been encoded for this macroblock, the method may include repeating the operations illustrated in 2230 for each addition bins. This is illustrated in FIG. 22 by the feedback from the negative exit of 2240 to 2230.

Once all of the bins have been encoded for this macroblock (shown as the positive exit from 2240), the method may include updating the empirical probability values, estimated entropy values and/or estimated rate costs for each bin (as in 2250). If there are more macroblocks in the current slice to be processed, the method may include repeating the operations illustrated at 2220-2250 for each additional macroblock in the current slice. This is illustrated in FIG. 22 by the feedback from the positive exit of 2260 to 2220. Once all of the macroblocks in the current slice have been processed (shown as the negative exit from 2260), the method may include resetting the empirical probability values, estimated entropy values and/or estimated rate costs for each bin to their initial values, as in 2270. The method may then include repeating the operations illustrated in 2220-2270 for the macroblocks in each additional slice. This is illustrated in FIG. 22 by the path from 2270 to 2220. Note that, in other embodiments, the method may include resetting the empirical probability values, estimated entropy values and/or estimated rate costs for each bin to their initial values after processing a single macroblock, after processing an entire video frame, or at some other boundary within an input stream.

In a more specific example, for motion vector differences, seven bins are maintained per list to measure the statistics of the binary symbols (e.g., symbols whose values are either 0 or 1) that comprise a motion vector difference. As described above, a CABAC encoder of the block processing pipeline may be configured to attempt to achieve the entropy limit for each bin, which can be expressed as:

$$H = -p_0 \log p_0 - p_1 \log p_1$$

In some embodiments, an array of seven counts may be maintained that measure the frequency of encoding a 0 or a 1. As noted above, this frequency count may be maintained (e.g., measured and accumulated) either in the CABAC engine or in the motion estimation engine, in different embodiments, and may also be written to a shared memory. If the count is measured in the CABAC engine, it may lead to a better estimate of the rate cost because it corresponds to exactly what is encoded. On the other hand, if the count is to be maintained in the motion estimation engine, then it may serve as an expectation of the relative frequencies of the symbols across the possible vectors that may be encoded. In this example, the count for 0 and 1 are incremented each time a 0 or 1 is encoded, respectively, and the empirical probabilities may be calculated as:

$$p_0 = \frac{count0}{count0 + count1}$$
$$p_1 = \frac{count1}{count0 + count1}$$

In this example, an estimated (empirical) entropy may be computed using the formula above, and the estimated rate cost may then be computed by multiplying the result by a scale factor alpha, as described above. In this example, alpha may represent the inefficiency of the CABAC engine and may be estimated directly within the CABAC engine as the factor from which entropy may be achieved. In embodiments in which the frequency counts are maintained in the motion estimation engine, the probability estimates may be calculated as:

$$p_0 = E[p_0, \text{mode}] \text{ and } p_1 = E[p_1, \text{mode}]$$

where the expectation is applied across all of the possible modes that the motion estimation engine may choose.

Note that while several examples included herein describe the use of CABAC statistics to determine or adjust rate estimates for motion estimation in a block processing pipeline that encodes blocks of pixels according to the H.264 or H.265 standards, the techniques described herein may be more generally applied in any of a variety of situations in which the rates of encoding various syntax element bins are used for cost estimation or other purposes. For example, these techniques may also be applied to provide estimated rates for use in computing costs associated with various encoding decisions made in an intra estimation stage and/or in a mode decision stage of a block processing pipeline. In various embodiments, these techniques may be applied in any block processing pipeline (e.g., any video encoding pipeline) that uses arithmetic coding and in which at least some pipeline stages include software components and/or processors they can make use of accumulated symbol counts (and/or empirical probability values derived therefrom) to estimate rate costs. Note also that while many of the examples included herein describe the use of entropy encoding statistics that are generated based on the output of a binary arithmetic encoder (which codes syntax elements using two symbols) to determine or adjust rate estimates for motion estimation, the techniques described herein may be more generally applied in embodiments in which the entropy encoding stage of the block processing pipeline includes arithmetic encoders that code syntax elements using more than two symbols (e.g., nary arithmetic encoders, which code syntax elements using n symbols).

Example Video Encoder Apparatus

Figure 23:
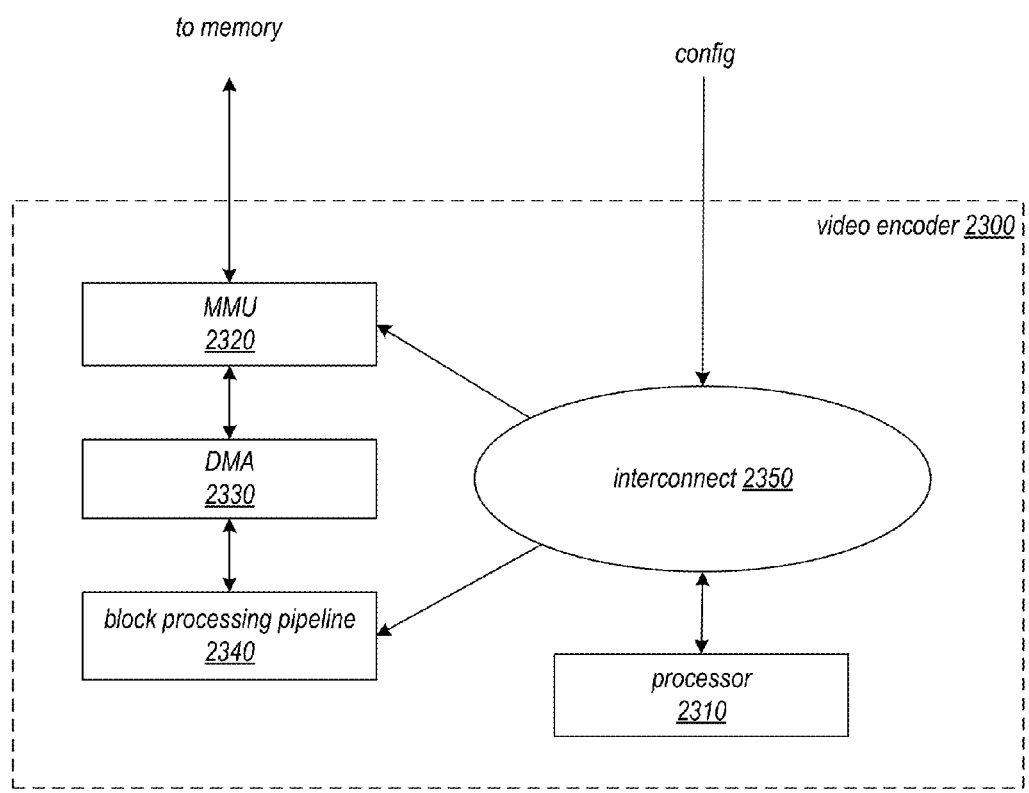
FIG. 23 is a block diagram illustrating an example video encoder apparatus, according to at least some embodiments.

FIG. 23 is a block diagram of an example video encoder apparatus 2300, according to at least some embodiments. The video encoder apparatus 2300 may, for example, be implemented as an integrated circuit (IC) or as a subsystem on an IC such as a system-on-a-chip (SOC). In at least some embodiments, the video encoder apparatus 2300 may include a pipeline 2340 component, a processor 2310 component (e.g., a low-power multicore processor), a memory management unit (MMU) 2320, DMA 2330, and an interconnect 2350 such as a bus subsystem or fabric that interconnects the functional components of the apparatus. The processor 2310 component of the video encoder apparatus 2300 may, for example, perform frame-level control of the pipeline 2340 such as rate control, perform pipeline 2340 configuration including configuration of individual pipeline units within the pipeline 2340, and interface with application software via a driver, for example for video encoder 2300 configuration. The MMU 2320 may serve as an interface to external memory, for example for streaming video input and/or output. Pipeline 2340 component may access memory through MMU 2320 via DMA 2330. In some embodiments, the video encoder apparatus 2300 may include other functional components or units not shown in FIG. 23, or fewer functional components than those shown in FIG. 23. An example block processing method that may be implemented by pipeline 2340 component is shown in FIG. 16. An example a system-on-a-chip (SOC) that may include at least one video encoder apparatus 2300 is illustrated in FIG. 24.

Example System on a Chip (SOC)

Turning now to FIG. 24, a block diagram of one embodiment of a system-on-a-chip (SOC) 2400 that may include at least one instance of a video encoder apparatus including a block processing pipeline that may implement one or more of the block processing methods and apparatus as illustrated in the preceding figures. SOC 2400 is shown coupled to a memory 2450. As implied by the name, the components of the SOC 2400 may be integrated onto a single semiconductor substrate as an integrated circuit "chip." In some embodiments, the components may be implemented on two or more discrete chips in a system. However, the SOC 2400 will be used as an example herein. In the illustrated embodiment, the components of the SOC 2400 include a central processing unit (CPU) complex 2420, on-chip peripheral components 2440A-2440B (more briefly, "peripherals"), a memory controller (MC) 2430, a video encoder 2400 (which may itself be considered a peripheral component), and a communication fabric 2410. The components 2420, 2430, 2440A-2440B, and 2400 may all be coupled to the communication fabric 2410. The memory controller 2430 may be coupled to the memory 2450 during use, and the peripheral 2440B may be coupled to an external interface 2460 during use. In the illustrated embodiment, the CPU complex 2420 includes one or more processors (P) 2424 and a level two (L2) cache 2422. In some embodiments, the CPU complex may be configured to cache neighbor data, which may include source transform coefficients (e.g., DC transform coefficients), modified transform coefficients, previously computed quantization errors, and/or weighting coefficient values for one or more neighbor pixels, among other information used in the video encoding operations described herein.

The peripherals 2440A-2440B may be any set of additional hardware functionality included in the SOC 2400. For example, the peripherals 2440A-2440B may include video peripherals such as an image signal processor configured to process image capture data from a camera or other image sensor, display controllers configured to display video data on one or more display devices, graphics processing units (GPUs), video encoder/decoders, scalers, rotators, blenders, etc. The peripherals may include audio peripherals such as microphones, speakers, interfaces to microphones and speakers, audio processors, digital signal processors, mixers, etc. The peripherals may include peripheral interface controllers for various interfaces 2460 external to the SOC 2400 (e.g. the peripheral 2440B) including interfaces such as Universal Serial Bus (USB), peripheral component interconnect (PCI) including PCI Express (PCIe), serial and parallel ports, etc. The peripherals may include networking peripherals such as media access controllers (MACs). Any set of hardware may be included.

More particularly in FIG. 24, SOC 2400 may include at least one instance of a video encoder 2400 component, for example a video encoder 2400 as illustrated in FIG. 24 that includes a block processing pipeline 2440 component that implements a block processing method 1600 as illustrated in FIG. 16. Video encoder 2400 may be an H.264 video encoder apparatus that may be configured to convert input video frames from an input format into H.264/Advanced Video Coding (AVC) format as described in the H.264/AVC standard. The block processing pipeline 2440 may implement one or more of the block processing methods and apparatus as described herein.

The CPU complex 2420 may include one or more CPU processors 2424 that serve as the CPU of the SOC 2400. The CPU of the system includes the processor(s) that execute the main control software of the system, such as an operating system. Generally, software executed by the CPU during use may control the other components of the system to realize the desired functionality of the system. The processors 2424 may also execute other software, such as application programs. The application programs may provide user functionality, and may rely on the operating system for lower level device control. Accordingly, the processors 2424 may also be referred to as application processors. The CPU complex 2420 may further include other hardware such as the L2 cache 2422 and/or and interface to the other components of the system (e.g. an interface to the communication fabric 2410). Generally, a processor may include any circuitry and/or microcode configured to execute instructions defined in an instruction set architecture implemented by the processor. The instructions and data operated on by the processors in response to executing the instructions may generally be stored in the memory 2450, although certain instructions may be defined for direct processor access to peripherals as well. In some embodiments, the data stored in memory 2450 may include weighting coefficient values to be applied for one or more neighbor pixels in a neighbor-data-based dithering operation. Processors may encompass processor cores implemented on an integrated circuit with other components as a system on a chip (SOC 2400) or other levels of integration. Processors may further encompass discrete microprocessors, processor cores and/or microprocessors integrated into multichip module implementations, processors implemented as multiple integrated circuits, etc.

The memory controller 2430 may generally include the circuitry for receiving memory operations from the other components of the SOC 2400 and for accessing the memory 2450 to complete the memory operations. The memory controller 2430 may be configured to access any type of memory 2450. For example, the memory 2450 may be static random access memory (SRAM), dynamic RAM (DRAM) such as synchronous DRAM (SDRAM) including double data rate (DDR, DDR2, DDR3, etc.) DRAM. Low power/mobile versions of the DDR DRAM may be supported (e.g. LPDDR, mDDR, etc.). The memory controller 2430 may include queues for memory operations, for ordering (and potentially reordering) the operations and presenting the operations to the memory 2450. The memory controller 2430 may further include data buffers to store write data awaiting write to memory and read data awaiting return to the source of the memory operation. In some embodiments, the memory controller 2430 may include a memory cache to store recently accessed memory data. In SOC implementations, for example, the memory cache may reduce power consumption in the SOC by avoiding reaccess of data from the memory 2450 if it is expected to be accessed again soon. In some cases, the memory cache may also be referred to as a system cache, as opposed to private caches such as the L2 cache 2422 or caches in the processors 2424, which serve only certain components. Additionally, in some embodiments, a system cache need not be located within the memory controller 2430.

In an embodiment, the memory 2450 may be packaged with the SOC 2400 in a chip-on-chip or package-on-package configuration. A multichip module configuration of the SOC 2400 and the memory 2450 may be used as well. Such configurations may be relatively more secure (in terms of data observability) than transmissions to other components in the system. Accordingly, protected data may reside in the memory 2450 unencrypted, whereas the protected data may be encrypted for exchange between the SOC 2400 and external endpoints.

The communication fabric 2410 may be any communication interconnect and protocol for communicating among the components of the SOC 2400. The communication fabric 2410 may be bus-based, including shared bus configurations, cross bar configurations, and hierarchical buses with bridges. The communication fabric 2410 may also be packet-based, and may be hierarchical with bridges, cross bar, point-to-point, or other interconnects.

It is noted that the number of components of the SOC 2400 (and the number of subcomponents for those shown in FIG. 24, such as within the CPU complex 2420) may vary from embodiment to embodiment. There may be more or fewer of each component/subcomponent than the number shown in FIG. 24.

Example System

Figure 25:
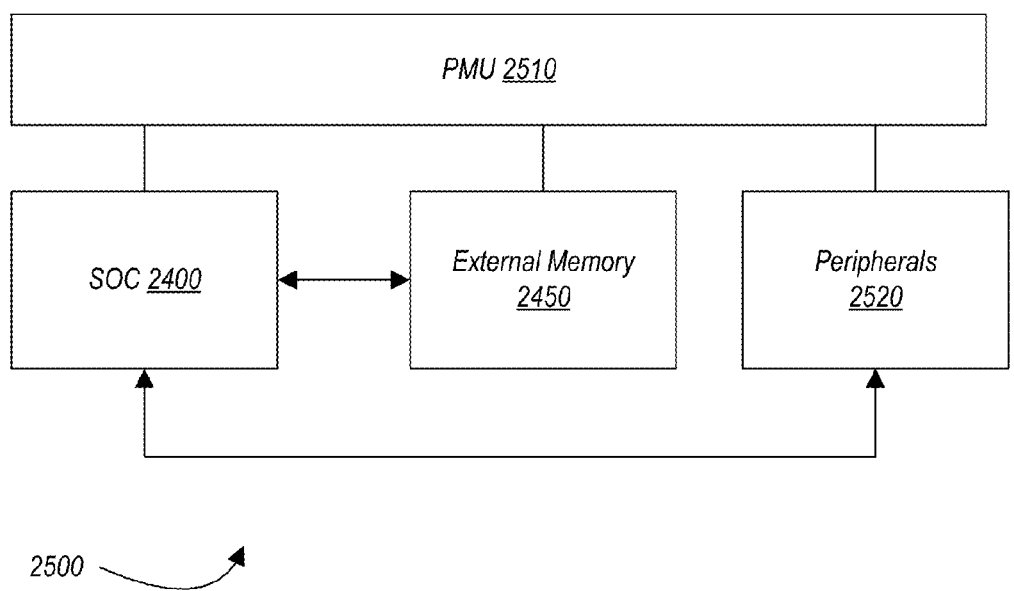
FIG. 25 is a block diagram illustrating one embodiment of a system that includes at least one instance of an SOC.

FIG. 25 a block diagram of one embodiment of a system 2500. In the illustrated embodiment, the system 2500 includes at least one instance of the SOC 2400 coupled to one or more external peripherals 2520 and the external memory 2450. A power management unit (PMU) 2510 is provided which supplies the supply voltages to the SOC 2400 as well as one or more supply voltages to the memory 2450 and/or the peripherals 2520. In some embodiments, more than one instance of the SOC 2400 may be included (and more than one memory 2450 may be included as well).

The peripherals 2520 may include any desired circuitry, depending on the type of system 2500. For example, in one embodiment, the system 2500 may be a mobile device (e.g. personal digital assistant (PDA), smart phone, etc.) and the peripherals 2520 may include devices for various types of wireless communication, such as wifi, Bluetooth, cellular, global positioning system, etc. The peripherals 2520 may also include additional storage, including RAM storage, solid state storage, or disk storage. The peripherals 2520 may include user interface devices such as a display screen, including touch display screens or multitouch display screens, keyboard or other input devices, microphones, speakers, etc. In other embodiments, the system 2500 may be any type of computing system (e.g. desktop personal computer, laptop, workstation, net top etc.).

The external memory 2450 may include any type of memory. For example, the external memory 2450 may be SRAM, dynamic RAM (DRAM) such as synchronous DRAM (SDRAM), double data rate (DDR, DDR2, DDR3, etc.) SDRAM, RAMBUS DRAM, low power versions of the DDR DRAM (e.g. LPDDR, mDDR, etc.), etc. The external memory 2450 may include one or more memory modules to which the memory devices are mounted, such as single inline memory modules (SIMMs), dual inline memory modules (DIMMs), etc. Alternatively, the external memory 2450 may include one or more memory devices that are mounted on the SOC 2400 in a chip-on-chip or package-on-package implementation.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. An apparatus, comprising:
    a block processing pipeline configured to process blocks of pixels from a video frame; and
    a memory accessible by respective processors in components at each of two or more stages of the block processing pipeline;
    wherein an entropy encoding stage of the block processing pipeline comprises a binary arithmetic coding component configured to encode syntax element bins that represent the blocks of pixels;
    wherein, for each of one or more of a plurality of syntax element bins for a given block of pixels, the binary arithmetic coding component is configured to:
        code the syntax element bin using one or more symbols, each of which has one of two possible values;
        update, in the memory, at least one of: a count of symbols used in coding the syntax element bin having one of the two possible values or a count of symbols used in coding the syntax element bin having the other one of the two possible values; and
    wherein, when processing another block of pixels, a processor in a component at a stage of the block processing pipeline that precedes the entropy encoding stage is configured to:
        access the count of symbols used in coding a given syntax element bin having the one of the two possible values and the count of symbols used in coding the given syntax element bin having the other one of the two possible values;
        compute, for the given syntax element bin, a current probability for each of the two possible values of the symbols used to encode the given syntax element bin, dependent on the accessed counts;
        compute an estimate of entropy for the given syntax element bin, dependent on the computed current probability for each of the two possible values; and
        calculate an estimated rate cost for encoding the given syntax element bin for the other block of pixels, wherein the estimated rate cost is dependent on the computed estimate of entropy, and wherein the estimated rate cost represents an estimate of the amount of data needed to encode the given syntax element bin of the other block of pixels.

2. The apparatus of claim 1, wherein the binary arithmetic coding component is configured to perform context-adaptive binary arithmetic coding.

3. The apparatus of claim 1,
    wherein the stage of the block processing pipeline that precedes the entropy encoding stage is a motion estimation stage; and
    wherein the given syntax element bin is one of a plurality of syntax element bins that represent a difference between a motion vector candidate that is being evaluated and a motion vector predictor.

4. The apparatus of claim 3, wherein, when processing the other block of pixels, the processor in the component at the motion estimation stage is further configured to:
    calculate an estimated cost associated with encoding the given syntax element bin when the motion vector candidate being evaluated is selected, dependent on the estimated rate cost; and
    select one of a plurality of candidate motion vectors that comprises the motion vector candidate being evaluated, dependent on the estimated cost associated with encoding the given syntax element bin when the motion vector candidate being evaluated is selected.

5. The apparatus of claim 1,
    wherein, when processing the other block of pixels, the processor in the component at the stage of the block processing pipeline that precedes the entropy encoding stage is further configured to calculate an estimated cost associated with encoding the given syntax element bin under particular conditions, dependent on the estimated rate cost; and
    wherein to calculate the estimated cost associated with encoding the given syntax element bin under the particular conditions, the processor is configured to apply a cost function that is dependent on the estimated rate cost and a distortion term.

6. The apparatus of claim 1,
    wherein the stage of the block processing pipeline that precedes the entropy encoding stage is an intra estimation stage; and
    wherein, when processing the other block of pixels, the processor in the component at the intra estimation stage is further configured to:
        calculate an estimated cost associated with encoding the given syntax element bin in a particular intra estimation mode, dependent on the estimated rate cost; and
        select one of a plurality of candidate intra estimation modes that comprises the particular intra estimation mode, dependent on the estimated cost associated with encoding the given syntax element bin in the particular intra estimation mode.

7. The apparatus of claim 1,
    wherein the stage of the block processing pipeline that precedes the entropy encoding stage is a mode decision stage; and
    wherein, when processing the other block of pixels, the processor in the component at the mode decision stage is further configured to:
        calculate an estimated cost associated with encoding the given syntax element bin in a particular encoding mode, dependent on the estimated rate cost; and select one of a plurality of candidate encoding modes that comprises the particular encoding mode, dependent on the estimated cost associated with encoding the given syntax element bin in the particular encoding mode.

8. The apparatus of claim 1,
wherein the estimated rate cost is further dependent on an inefficiency parameter; and
wherein to calculate the estimated rate cost, the processor in the component at the stage of the block processing pipeline that precedes the entropy encoding stage is configured to multiply the computed estimate of entropy by the inefficiency parameter.

9. A method, comprising:
inputting data representing a block of pixels from a video frame to a video encoding pipeline comprising a plurality of stages, wherein each stage of the pipeline is configured to perform at least one operation on blocks of pixels passing through the pipeline, and wherein the input data comprises a plurality of syntax element bins for the block of pixels; and
performing, by one or more stages of the pipeline:
coding a given one of the plurality of syntax element bins using one or more symbols, each of which has one of two possible values;
incrementing at least one count value associated with the encoding of the given syntax element bin to reflect the values of the one or more symbols used in encoding the given syntax element bin;
receiving input data representing a second block of pixels from the video frame, wherein the input data comprises a plurality of syntax element bins for the second block of pixels, wherein the plurality of syntax element bins for the second block of pixels comprises the given syntax element bin; and
prior to coding the given syntax element bin for the second block of pixels:
accessing the at least one count value; and
calculating an estimated rate cost for encoding the given syntax element bin, wherein the estimated rate cost is dependent on the at least one count value, and wherein the estimated rate cost represents an estimate of the amount of data needed to encode the given syntax element bin for the second block of pixels.

10. The method of claim 9, wherein said calculating comprises:
computing, for the given syntax element bin, a current probability for each of the two possible values of the symbols used to encode the given syntax element bin, dependent on the at least one count value; and
computing an estimate of entropy for the given syntax element bin, dependent on the computed current probability for each of the two possible values.

11. The method of claim 9, further comprising:
calculating an estimated cost of encoding the given syntax element bin for the second block of pixels in a particular encoding mode, dependent on the estimated rate cost; and
selecting one of a plurality of candidate encoding modes in which to encode the given syntax element bin for the second block of pixels, wherein the plurality of candidate encoding modes comprises the particular encoding mode, and wherein said selecting is dependent on the estimated cost of encoding the given syntax element bin for the second block of pixels in the particular encoding mode.

12. The method of claim 11, wherein said selecting one of a plurality of candidate encoding modes comprises selecting one of a plurality of intra modes during intra estimation.

13. The method of claim 11, wherein said calculating an estimated cost comprises applying a cost function that is dependent on the estimated rate cost and a distortion term.

14. The method of claim 9,
wherein the given syntax element bin is one of a plurality of syntax element bins that represent a difference between a motion vector candidate that is being evaluated and a motion vector predictor; and
wherein the method further comprises:
calculating an estimated cost associated with encoding the given syntax element bin when the motion vector candidate being evaluated is selected, dependent on the estimated rate cost; and
selecting one of a plurality of candidate motion vectors that includes the motion vector candidate being evaluated, dependent on the estimated cost associated with encoding the given syntax element bin when the motion vector candidate being evaluated is selected.

15. The method of claim 9, further comprising:
coding the given syntax element bin for the second block of pixels using one or more symbols, each of which has one of two possible values;
updating the at least one count value to reflect the values of the one or more symbols used in encoding the given syntax element bin for the second block of pixels;
receiving input data representing a third block of pixels from the video frame, wherein the input data comprises a plurality of syntax element bins for the third block of pixels, wherein the plurality of syntax element bins for the third block of pixels comprises the given syntax element bin; and
prior to coding the given syntax element bin for the third block of pixels, and subsequent to said updating:
accessing the at least one count value; and
calculating an updated estimated rate cost for encoding the given syntax element bin, wherein the updated estimated rate cost is dependent on the at least one count value, and wherein the updated estimated rate cost represents an estimate of the amount of data needed to encode the given syntax element bin for the third block of pixels.

16. The method of claim 15, further comprising:
subsequent to coding the given syntax element for a last one of a pre-determined number of blocks of pixels in the video frame, resetting the at least one count value to an initial value.

17. The method of claim 9, wherein the given syntax element bin represents a quantized coefficient for the block of pixels that was generated in a stage of a block processing pipeline that precedes an entropy encoding stage that performs said coding.

18. A device, comprising:
a memory; and
an apparatus configured to process video frames and to store the processed video frames as frame data to the memory;
wherein the apparatus is configured to:
receive input data representing a given block of pixels from a video frame, wherein the input data comprises a plurality of syntax element bins for the given block of pixels;
access a data structure in the memory, wherein the data structure stores, for a given one of the plurality of syntax element bins for the given block of pixels, a current probability for each of two possible symbol values to be used in encoding the given syntax element bin;

compute an estimate of entropy for the given syntax element bin, dependent on the current probability for each of the two possible symbol values;

calculate an estimated rate cost for encoding the given syntax element bin for the given block of pixels, wherein the estimated rate cost is dependent on the computed estimate of entropy, and wherein the estimated rate cost represents an estimate of the amount of data needed to encode the given syntax element bin for the given block of pixels.

19. The device of claim 18, wherein the apparatus is further configured to:

calculate an estimated cost of encoding the given syntax element bin for the given block of pixels in a particular encoding mode, dependent on the estimated rate cost; and select one of a plurality of candidate encoding modes in which to encode the given syntax element bin for the given block of pixels, wherein the plurality of candidate encoding modes comprises the particular encoding mode, and wherein selection of the one of the plurality of candidate encoding modes is dependent on the estimated cost of encoding the given syntax element bin for the given block of pixels in the particular encoding mode.

20. The device of claim 18, wherein, prior to receiving the input data representing the given block of pixels, the apparatus is configured to:

accumulate a respective count value indicating a number of times that each of two possible symbols was used in encoding the given syntax element bin for one or more other block of pixels from the video frame when processing previously received input data representing the one or more other blocks of pixels from the video frame;

compute the current probability for each of the two possible symbol values to be used in encoding the given syntax element bin, dependent on the respective count values; and store the current probability for each of the two possible symbol values to be used in encoding the given syntax element bin in the data structure in the memory.

* * * * *